United States Patent [19]
Grasso et al.

[11] Patent Number: 5,892,909
[45] Date of Patent: Apr. 6, 1999

[54] INTRANET-BASED SYSTEM WITH METHODS FOR CO-ACTIVE DELIVERY OF INFORMATION TO MULTIPLE USERS

[75] Inventors: Charles A. Grasso, Scotts Valley; Richard Lee Schwartz, Los Altos Hills, both of Calif.

[73] Assignee: Diffusion, Inc., Mountain View, Calif.

[21] Appl. No.: 792,867

[22] Filed: Jan. 31, 1997

(List continued on next page.)

Related U.S. Application Data

[60] Provisional application No. 60/027,567, Sep. 27, 1996.
[51] Int. Cl.$^6$ .................................................. G06F 13/00
[52] U.S. Cl. .............................. 395/200.31; 395/200.3; 395/200.33
[58] Field of Search ...................... 395/200.3, 200.31, 395/200.33

[56] References Cited

U.S. PATENT DOCUMENTS

| | | |
|---|---|---|
| 4,754,428 | 6/1988 | Schultz et al. . |
| 4,811,207 | 3/1989 | Hikita et al. . |
| 5,210,824 | 5/1993 | Putz et al. . |
| 5,212,787 | 5/1993 | Baker et al. . |
| 5,226,161 | 7/1993 | Khoyi et al. . |
| 5,257,369 | 10/1993 | Skeen et al. . |
| 5,331,673 | 7/1994 | Elko et al. . |
| 5,339,392 | 8/1994 | Risberg et al. . |
| 5,421,015 | 5/1995 | Khoyi et al. . |
| 5,732,218 | 3/1998 | Bland et al. ........................ 395/200.54 |
| 5,761,416 | 6/1998 | Mandal et al. ........................ 395/200.8 |
| 5,774,660 | 6/1998 | Brendel et al. ..................... 395/200.31 |
| 5,790,790 | 8/1998 | Smith et al. ........................ 395/200.36 |

OTHER PUBLICATIONS

Miller, M., "*Applications Integration—Getting It Together*," PC Magazine, Feb. 8, 1994, pp. 111–112, 116–120, 136, 138.

Stevenson, T., "*Best of a New Breed—Groupware: Are We Ready?*," PC Magazine, Jun. 15, 1993, pp. 267–270, 272, 276, 278, 285, 287–288, 290–293, 296–297, 299.

Microsoft Corporation, "*The Microsoft Workgroup Computing Strategy*," 1993, pp. 1–27.

*Crystal Unveils Internet Strategy*, 4 pp., Apr. 3, 1996.

*Crystal Web Reporting Technology Fact Sheet*, 6 pp., Jul. 1996.

*MetaWeb: Client/Server Output Management Extends to the Web*, 12 pp., Aug. 1996.

(List continued on next page.)

*Primary Examiner*—Krisna Lim
*Attorney, Agent, or Firm*—John A. Smart

[57] ABSTRACT

An Intranet-based system with methods for co-active information delivery is described. The system allows users to manage the distribution and delivery of information across an enterprise Intranet, the Internet, and common communication channels (e.g., printers, fax, pager and e-mail). The system provides a wizard-like user interface which intuitively walks users through various tasks, including distribution of new documents, updating of existing documents, modifying profiles/policies of documents, groups, roles and individuals. The system provides "Adaptive Distribution" methodology so that, as organizational changes occur, the system ensures that the most current, relevant information is always made available to appropriate eligible subscribers; no additional effort is required from either the subscribers or the distributors. Subscriber lists of a distribution automatically respond to changes in group composition, accommodating new or departing individuals within the organization, as well as accommodating changing organizational roles. As an organization changes, newly eligible recipients are electronically contacted with their new profile. At the same time, newly ineligible people are automatically cut off from the information flow. In this manner, the adaptive methodology ensures that all of these profiles are contextually linked together and changed automatically as new information or context for any part of the profile is updated.

40 Claims, 38 Drawing Sheets

OTHER PUBLICATIONS

*Dazel Output Server Data Sheet*, 3 pp., Aug 1996.
*Dazel Goes beyond Printing to "Output Management"*, 1 p., Aug. 1996.
*Dazel Product Data Sheet*, 5 pp., Jul. 1996.
*grapeVINE Brochure*, 9 pp., Aug. 1996.
*PointCast 2.0 Eases Burden on Network*, 3 pp., Jun. 2, 1997.
*Are you lost in your intranet space?*, 4 pp., Oct. 8, 1996.
Strom, David, *Push Media*, 8 pp., Dec. 13, 1997.
Strom, David, *The Best of Push*, 7 pp., Apr. 1997.
*Push Publishing Technologies*, 6 pp., Jul. 2, 1998.
*When shove comes to push*, 7 pp., Feb. 10, 1997.

INTRANET-BASED SYSTEM WITH METHODS FOR CO-ACTIVE DELIVERY OF INFORMATION TO MULTIPLE USERS

The present application claims priority from commonly-owned provisional patent application Ser. No. 60/027,567, filed Sep. 27, 1996, and entitled INTRANET-BASED SYSTEM WITH METHODS FOR CO-ACTIVE DELIVERY OF INFORMATION TO MULTIPLE USERS, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of information processing and, more particularly, to system and methods for managing delivery of time-sensitive, business-critical information to multiple individuals located at various locations.

The Internet is a new common carrier for information which has already signaled major transformations in virtually all segments of society, in virtually every corner of the globe. At this early and fervent stage of development, Internet usage is in widespread corporate trial and deployment. There can be little doubt that the Internet, including its internal corporate version (i.e., "Intranets"), will fundamentally transform the nature of corporate communication.

New carriers for information do not happen often, and have historically fundamentally altered basic business and social processes. A "common carrier" is a conduit for information that is not specific to a particular task or kind of information and can carry that information independent of ultimate purpose. It is insightful to explore how the telephone, the last common carrier, evolved.

At the outset of its deployment as a communication carrier, telephone "applications" required significant manual control and intervention and carried rather simple interpersonal voice communication. While the handset and basic instrumentation have changed little, the "back office" requirement of a manual switchboard and operator patch panel needed to bring the telephone into a community was a very significant investment and ongoing resource commitment. All call origination and completion were manual activities.

In fact, the telephone network took many decades to evolve as a common carrier for all types of information, involving more applications than the literal use of a telephone handset held to the ear. Over this period, the telephone evolved into a carrier for voice and data and has been used for embedded communication and coordination with a vast array of applications, such as fax machines, burglar alarm systems, voice mail, and the like. As the uses and types of information carried on the telephone evolved, the telephone realized its more complete purpose as a common carrier of information.

The Internet is in its early, literal phase. Today, most activity is focused on the carrier-level development and deployment—in effect, basic plumbing and tools. This is very similar to the first literal phase for the telephone, concentrating on developing and deploying the community switchboards and its first application for interactive voice. TCP/IP (Transmission Control Protocol/Internet Protocol) lines, routers and firewalls are the equivalent of telephone wiring, while the Web Server and Mail Servers correspond to the telephone switchboard, with Web browsers and e-mail readers analogous to the first literal use of the telephone. As it matures, the Internet will begin to realize its full potential as a common carrier of information—carrying all kinds of data for different purposes, and for use within a variety of information-centric applications.

It is useful to review what the Internet actually constitutes. At its core, the Internet is an open standard for communicating and interconnecting packets of information represented digitally, regardless of the type or format of the information or originating source or destination. Every computing device on the Internet has a unique address, the IP (Internet Protocol) address, and can direct its flow of packets to a specific application or process at the destination (the port). The Internet too can server as a common carrier. It is platform independent, application independent, and format independent. Its strength lies in exactly this generality.

For fifteen years, the Internet was primarily used by academic researchers. Common applications employed with the Internet included: Electronic mail (SMTP application programs communicating with each other to exchange delivered mail); Client/Server terminal access to a remote application (Telnet); and File transfer between sites (FTP—File Transport Protocol). The majority of information flowing was textual information or proprietary data formats. Text was, in effect, the "lingua franca" of the Internet.

The World Wide Web has injected fundamental vibrancy and urgency to the Internet. In addition to adding multimedia richness, the World Wide Web breaks through the rather esoteric user interfaces formerly used by academics. The Web is a specific client and server Internet application that uses the capabilities of the Internet for cataloging, browsing, retrieving and displaying multimedia information. Specifically, it contributes a new application protocol—HTTP (HyerText Transport Protocol)—and a specific Web server application to use it, for information retrieval and processing. A new application, the "Web Browser," was introduced which understands how to interact using HTTP and how to interpret and richly display the content received via HTTP. A new "lingua franca" data format, HTML, arose—a format that is dramatically richer in layout and formatting capability than text. The Internet today overwhelmingly consists of Web servers, Web browsers, mail servers and mail reader applications tied together on the common carrier.

Virtually the only applications today that understand the HTTP protocol are Web servers and interactive Web browsers. There are few, if any, other types of applications that have built-in use of Internet and Web protocols other than the literal interactive application for which it was conceived. This is very similar to the early telephone usage described earlier where the telephone instrument is used solely by people for interactive voice communication. Control of the telephone common carrier for data communications and automated inter-application coordination and information flow came later.

The "Intranet," as popularly defined, is the usage of the Internet protocols, tools and applications within a corporate environment. The target purpose is as a common carrier of business-critical information for and between people and business systems. At a plumbing and tool level, the Intranet is essentially the same as the Internet. However, at an application level, the two differ substantially. Intranet applications, as they evolve, will be information-centric solutions to corporate business problems. Intranet application solutions will be different from general Internet solutions for the simple reason that corporate information needs are different from the needs of the general public.

Thus far, Internet applications and Intranet applications, as available from various Internet vendors, have not been distinguished. Applications have been underlying tools for customization and development by the corporate customer. The customer, or an outside consultant, must invest further to create Intranet applications for business critical needs.

Undoubtedly, the core elements of today's Internet applications and tools will survive, but the general Internet landscape of the future will barely resemble that of today. New applications will use common Internet protocols and formats but take the shape of business application solutions rather than that of the underlying technical platform. Web Servers, as known today, may disappear. Web browsers and e-mail readers will likely continue to evolve as universal clients, while new types of applications will build in Web-browser-like access within specialized application interfaces. The Internet and Intranet landscape in the future will consist of specialized business applications which are full participants on the Internet in providing information, participating in wide-area transactions, and seamlessly retrieving information from the Internet whenever needed for its processing.

The kind of specialized business application servers that will exist include, firstly, all or most of the current client/server business applications such as customer support systems, order entry systems, data warehousing and data mining, document management, configurators, inventory planners, sales lead tracking and opportunity management, and the like. All of these will be specialized application servers present and addressable on the Internet. All will make their data and transactions available from a Web browser. On the other hand, many new applications will be created that are either new specialized servers for outstanding business problems that cross departmental boundaries—applications that could not have easily been handled by previous dedicated client-server or groupware systems without massive coordination and changes in business structure and process. It is the common carrier status of the Internet and its ability to allow data and application communication to cross people, tasks, data formats, and vendor boundaries that empowers this change. This transformation of the nature of Internet applications will be equivalent of the telephone network reaching common carrier status.

It is useful to divide the types of information present within a corporate setting into "static information" and "dynamic information." Static information is information of general interest, that is, information that does not have a high time-value but is useful for general reference. Dynamic information, on the other hand, is information that has a high time value; here, changes or updates have immediate impact. In general, dynamic information is business-critical information for which communication on a timely basis can have business revenue and productivity impact. This is the information that runs the company and reflects the corporate response to changing events. Examples of this includes: Pricing updates or modifications that occur based on market pressure or competitive announcements; Emerging market or industry analyst reports that are competitive weapons for or against one's company and must be known by employees and partners in advance of the customers; Presentations of new products and update bulletins to be used by sales representatives and outside partners as a critical sales tool; and Reports and Flash Updates of sales forecasting and sell-through.

The Internet and the World Wide Web today are best suited for static information and as an archive for dynamic information. Business critical, dynamic information must be targeted to the right people for immediate impact. This is performed today, even in the most highly technologically advanced companies, by combinations of electronic inter-personal mail, fax blasters, Federal Express packages, and hastily dispatched voice mails. In most companies, all of the these methods are used in order to try to guarantee business critical information reaches the right parties at the right time. Unfortunately, such an approach is a significant burden which relies on mostly manual ad hoc practices to "get the word out." Specifically, the approach produces information overload for the recipients and causes the most critical information to be often overlooked. It is this business-critical target information flow that the Internet can provide a solution for. This is not addressed with present-day Internet tools and applications. What is needed are system and methods which provide for management and delivery of time-sensitive, business-critical information to multiple individuals located at various locations.

SUMMARY OF THE INVENTION

An Intranet-based system with methods for co-active information delivery is described. The system allows users to manage the distribution and delivery of information across an enterprise Intranet, the Internet, and common communication channels (e.g., printers, fax, pager and e-mail). The system provides a wizard-like user interface which intuitively walks users through various tasks, including distribution of new documents, updating of existing documents, modifying profiles of documents, groups, roles and individuals.

As organizational changes occur, the system of the present invention ensures that the most current, relevant information is always made available to the appropriate eligible subscribers. No additional effort is required from either the subscribers or the distributors. "Adaptive Distribution" support causes subscriber lists to automatically respond to changes in group composition, accommodating new or departing individuals within the organization, as well as accommodating changing organizational roles. As an organization changes, newly eligible recipients are electronically contacted with their new profile. At the same time, newly ineligible people are automatically cut off from the information flow. In this manner, the adaptive methodology of the present invention ensures that all of these profiles are contextually linked together and changed automatically as new information or context for any part of the profile is updated.

Using an Intranet architecture, the present invention provides a co-active information delivery system which provides a practical solution to information delivery and, at the same time, does not require an entire company or community to adopt the same work practices and software and communications standards. A department and its community of recipients can receive the productivity benefits of increased focused communication while leveraging the existing and emerging infrastructure.

DETAILED DESCRIPTION OF A PREFERRED EMBODIMENT

The following description will focus on the presently preferred embodiment of the present invention, which is operative in an end-user application running under the Microsoft® Windows 95/NT environment. The present invention, however, is not limited to any particular one application or any particular environment. Instead, those skilled in the art will find that the system and methods of the present invention may be advantageously applied to environments requiring access and management of time-sensitive, business-critical information, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
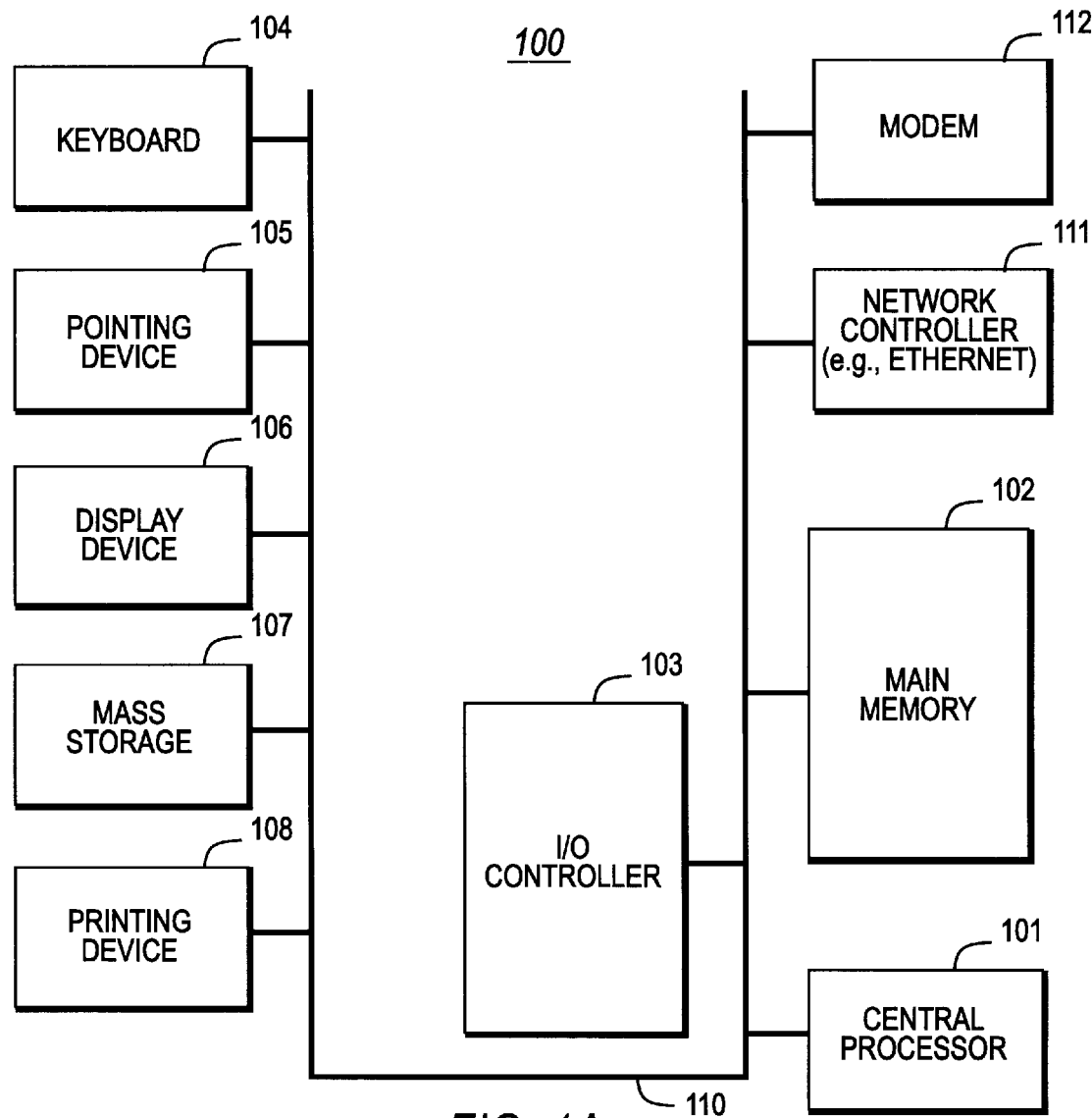
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display or screen device 106, a mass storage 107 (e.g., hard or fixed disk, removable floppy disk, optical disk, magneto-optical disk, or flash memory), a network interface card or controller 111 (e.g., Ethernet), and a modem 112 (e.g., 28.8k baud modem or ISDN modem). Although not shown separately, a real-time system clock is included with the system 100, in a conventional manner. Processor 101 includes or is coupled to a cache memory for storing frequently accessed information; memory 109 may be an on-chip cache or external cache. One or more input/output device(s) 108, such as a printing device or slide output device, are included in the system 100, as desired. As shown, the various components of the system 100 communicate through a system bus 110 or similar architecture. The system itself communicates with other systems via a network interface card 111 (e.g., available from 3Com) and/or modem 112 (e.g., available from U.S. Robotics). In a preferred embodiment, the system 100 includes an IBM PC-compatible personal computer, available from a variety of vendors (including IBM of Armonk, N.Y.). I/O device 108 may include a laser printer, such as an HP Laserjet printer, which is available from Hewlett-Packard of Palo Alto, Calif.

System Software

A. Overview

Figure 1B:
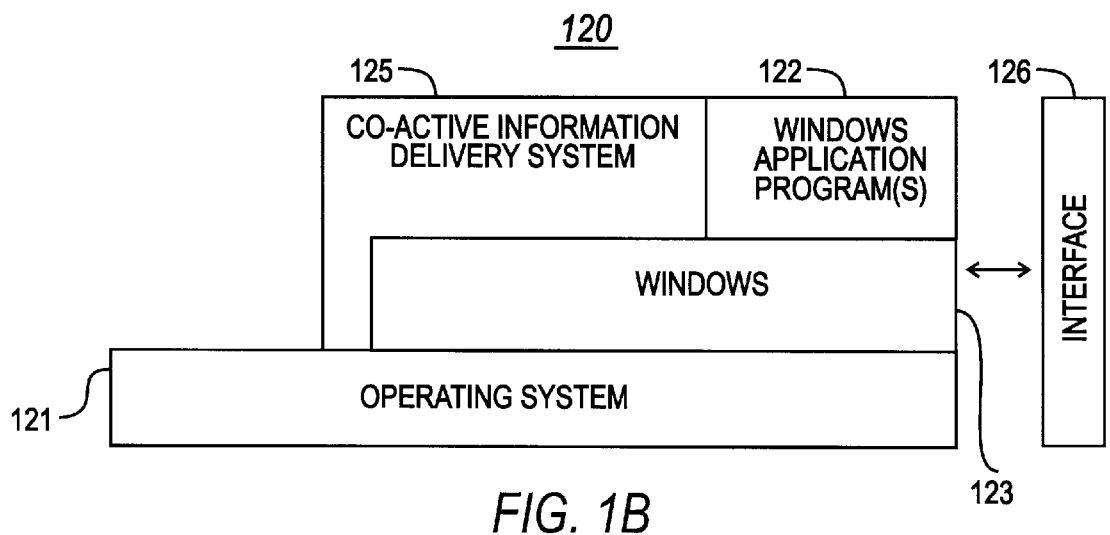
FIG. 1B is a block diagram of a software system of the present invention for controlling the operation of the system of FIG. 1A.

Illustrated in FIG. 1B, a computer software system 120 is provided for directing the operation of the computer system 100. Software system 120, which is stored in system memory 102 and on storage device (e.g., disk memory) 107, includes a kernel or operating system (OS) 121 and a windows shell 123. One or more application programs, such as client application software or "programs" 122 may be "loaded" (i.e., transferred from storage 107 into memory 102) for execution by the system 100.

System 120 includes a user interface (UI) 126, preferably a Graphical User Interface (GUI), for receiving user commands and data. These inputs, in turn, may be acted upon by the system 100 in accordance with instructions from operating module 121, windows 123, and/or client application module(s) 122. The UI 126 also serves to display the results of operation from the OS 121, windows 123, and application (s) 122, whereupon the user may supply additional inputs or terminate the session. OS 121 and windows 122 can be provided by Microsoft® Windows 95, by Microsoft® Windows NT, or by Microsoft® Windows 3.x (operating in conjunction with MS-DOS); these are available from Microsoft Corporation of Redmond, Wash. Although shown conceptually as a separate module, the UI is typically provided by interaction of the application modules with the windows shell, both operating under OS 121.

One application program comprises an Internet/Intranet-based co-active information delivery system 125 of the present invention. The co-active information delivery system 125 provides information management among multiple users connected to the Internet or to other commercial service providers (e.g., MCI Mail, CompuServe, and America On-line). In an exemplary embodiment, the system 125 comprises IntraExpress™, available from Diffusion, Inc. of Mountain View, Calif. Typically, IntraExpress™ would be deployed as separate IntraExpress™ server and client software components (i.e., running on separate computers), for implementing a "thin client/thick server" system. The construction and operation of the co-active information delivery system of the present invention, in the exemplary commercial embodiment of IntraExpressTM, will now be described in detail.

Co-active Intranet Applications

A. Introduction

Intranet applications today are typically employed for two fundamental purposes: exchanging interpersonal electronic mail and providing an electronic on-line reference library of documents and reports. Electronic mail applications consist of an Internet mail server and an interactive mail client. The Web serves as an electronic repository for documents; Web browsers are employed by corporate users to "surf" the internal web servers and hunt for valuable references.

Electronic mail is used today primarily for interpersonal communication. It provides an active "push" model, in that the sender of a message determines who should receive its content and "pushes" the message immediately into the electronic in-box of the recipient. In effect, the sender makes all of the decisions about who will receive the message and when. Web servers and Web browsers, on the other hand, provide a passive "pull" model. Content is placed within a Web server in anticipation of users later browsing the Web site to look for relevant content. The anticipated recipient decides whether and when to visit the Web site looking for new or recently updated content. Both "push" and "pull" Internet methods provide forms of information access and retrieval.

Today, though, a dilemma exists in deciding whether to "push" or "pull" information. If an information owner, perhaps the product marketing manager responsible for competitive analyses, prepares a critical evaluation of a threatening new product from a competitor, should he or she push the information, for instance, "blasting" the report to everyone by sending it via electronic mail. Certainly such an approach will ensure everyone has the information—but at the same time, not everyone critically needs it. Further, if everyone adopts a similar approach, "information overload" results, causing the right people to miss (in a sea of other material) what is truly critical for them. Thus, the following issue must be addressed. How can the information owner know exactly who to send the information to without overloading others? On the other hand, is it sufficient for the information owner to place the critical competitive analyses on a Web server? How will the right people know it is there? How will they know when it was placed there, or when it was newly updated?

Some Web applications include a form of recipient-defined "search and notify". This usually involves a recipient browsing a Web site and asking to be notified when Web pages are added or updated which match certain text search criteria. In effect, each recipient defines "push to me" instructions to the Web server based on unstructured occurrences of textual phrases within Web pages. Of course, this type of "hit or miss" searching can sometimes uncover gems of information. More often, however, the approach produces its own information overload, based on spurious hits. Practically all Internet users have seen this when using search engines to search the Internet as a giant electronic library. Certainly, public search engines will improve in this regard as search service providers use human editors and digital librarians to organize and structure general information into categories and meaningful summaries.

For a corporation to depend upon meaningful categories and keywords would require dedicated internal editors and librarians or a general community of authors following rigorously enforced cataloging and categorization standards. Clearly, this "Library of Congress" type approach is not a practical answer. Recipient-initiated search-and-notify techniques are best seen as a personal productivity boost to supplement general browsing of internal corporate archives for personal reference and not for business-critical targeted delivery.

B. Business-critical Information Delivery

For business critical information, it is highly desirable that the information be targeted to ensure that those that need it will see it in a timely and practical manner. Fundamental to a company's productivity and bottom-line is the value of business-critical information—information that receives the right attention in a timely manner. For instance, the value to a company of getting the latest positive review of a product into the hands of its sales representatives might be critical to the success of that company. Targeting the people who truly have a business critical need for the information benefits both the information distributor as well as the recipients. For information that is not timely and business-critical, on the other hand, it is reasonable to place the information on a centrally-available, publicized Web server. There, those that wish to look can look, at their leisure.

Most Web servers today are being used for information that is broadly available in an unrestricted fashion and is business useful, but not business critical and urgent. Unfortunately e-mail, fax, and Federal Express are being used today for business critical, timely, information distribution—"unfortunately" in this case because it leads to widespread information overload and a loss of business productivity and effectiveness.

There is no single answer for what information is timely and business critical to whom. A new update on a human resource hiring policy within a company may be business critical and urgent to active hiring managers and of only occasional interest to everyone else. Best-customer pricing changes may be critically interesting to those customers, but irrelevant or damaging to be seen or received by others. Criticality and urgency of information is, therefore, a shared responsibility. The distributor of the information has some constraints and knowledge of groups and individuals for whom the information may be (or, perhaps, should be)

critical. Individual recipients, then, must make their own decision as to how critical the information truly is to them. In effect, "business critical" is negotiated on an individual basis. Factors to consider include the exact type of information, the directives known by the information distributor, and the current attention and focus on the target of the intended target audience.

C. Negotiation to Target Information

Together, the information distributor and each intended recipient must negotiate whether to have each kind of report or document pushed by the distributor to the recipient, or posted to a reference site for the recipient to later decide to pull, or have recipients proactively notified of new or updated information. Both parties participate in cotargeting the level of business critical need for the information.

1. Eligible Groups, Roles and Individuals

The information distributor first decides which groups (e.g., Tier 1 Channel Partners or Eastern Regional Sales Representatives), organizational roles (such as VP Sales), and which specific individuals (e.g., Mary Jones) are allowed access to the information. These are the people for whom the distributor is targeting the information. It is within this targeted community that individuals can participate in the decision of whether to actually receive the information on an ongoing basis.

2. The Push/Pull Spectrum

One can visualize a spectrum of possible push/pull possibilities, based on how immediate and how critical the information—as negotiated by the distributor and each targeted recipient. This spectrum can be visualized along a push/pull spectrum where decisions can be made based on how business critical the information. The information distributor and each recipient together negotiate the level of business criticality to decide how much push versus pull. Both parties can participate in determining how much to push or pull—either party can modify any such decision at any time.

The spectrum or continuum can be divided into: Deliver, Notify, Offer, and Access. Deliver exists at the far left end of the Push spectrum where the decision is to have the actual information delivered to the recipient on an ongoing basis. This is the highest level commitment to the most business critical of information for that recipient. Notify, a slightly lower-level commitment, is to not receive the actual information, but rather to be notified each time new information of that kind is available. The recipient can then decide whether to take the further step of accessing the actual content. In this case, the notification is pushed each time that specific information is updated and the recipient decides whether to pull the content. Proceeding down the spectrum, an offer is sent on a one-time basis soliciting the recipient's approval to receive delivery or notification of the content. Only if the offer is accepted is there further communication about that information. Here, the offer itself is pushed to the targeted recipient—the result of this interaction leads to a subsequent decision about whether to push or pull the offered content. At the far pull end of the spectrum is Access, where nothing is pushed to the recipient on a pro-active basis; instead, the information is available for access whenever desired. In this case, the recipients can pull it, on demand.

3. Negotiating the Distribution Medium and Data Format

Different recipients who need critical information should be able to specify what distribution medium should be used to deliver the information. Media include, for instance, e-mail, fax, hard copy or Web browser. Typically, this requirement varies based on type of information, current work location for the recipient, level of confidentiality of the information, and the like. In addition to which distribution medium is to be used, the issue of which data format is appropriate for each recipient arises. This includes whether a given recipient is capable of reading a Microsoft Office Word for Windows file for Windows 95, or whether a file must be in Macintosh format, or simple text, or even HTML format.

For the foregoing reasons, the negotiation should proceed on an ongoing basis. It should be changeable by the information distributor, as he or she learns more about who might need the information the distributor provides. The negotiation should also be changeable by each recipient based on their current interests and job focus. It must also address changing organizational structure, including changes to people and positions for whom the information is newly business critical (or now irrelevant or inappropriate).

D. Co-active Information Delivery

The foregoing scenarios represent co-active negotiation between an information distributor and targeted potential recipient(s) to determine push versus pull access and an appropriate distribution medium and format. Using an Intranet architecture, the present invention provides a co-active information delivery system which provides a practical solution to information delivery and, at the same time, does not require an entire company or community to adopt the same work practices and software and communications standards. A department and its community of recipients can receive the productivity benefits of increased focused communication while leveraging the existing and emerging infrastructure. For realizing these benefits, the present invention provides five fundamental areas of functionality: Co-Active Push/Pull Negotiation, Adaptive Distribution, Multiple Delivery Media, Historical Access, and Tracking/Feedback. Each will be discussed in turn.

1. Co-Active Push/Pull Negotiation

For providing co-active push/pull negotiation, the system includes built-in support for the entire push/pull spectrum of Deliver, Notify, Offer, and Access. These are available and negotiable by both the information distributor and each eligible recipient. In this manner, two parties together decide how business critical each type of information is for them. This lets critical information through to the right people without overload. Both sides of the distribution equation—the distributor and the subscriber—can establish profiles that are then matched to ensure that the appropriate individuals receive and have access to, necessary business critical information in the form they need.

2. Adaptive Distribution

As organizational changes occur, the system of the present invention ensures that the most current, relevant information is always made available to the appropriate eligible subscribers. No additional effort is required from either the subscribers or the distributors. Adaptive Distribution support causes subscriber lists to automatically respond to changes in group composition, new or departing individuals within the organization, as well as changing organizational roles.

As an example, suppose an information distributor authorizes all First Tier Channel Partners, all Eastern Region Sales Representatives, and the CFO to receive best-customer pricing information. Once established, Adaptive Distribution ensure that Co-Active Negotiation will automatically occur as new channel partners join, sales representatives change geographic regions, and a new CFO assumes the position. Newly eligible recipients are electronically contacted with their new profile. At the same time, newly ineligible people are automatically cut off from the information flow.

3. Multiple Delivery Media

Multiple Delivery Media allows various modalities of distribution of information. This ensures that information is received or accessible in a usable manner. It also allows information to be distributed at the same time to individual recipients and general reference sites, such as Web sites. In this fashion, deliveries to all destinations occur in sync. All destinations carry the same version of the information.

4. Historical Access

Historical Access provides, at any time and at any place, access to information that has been distributed, regardless of where the information is posted, where the recipient is located, or how the recipient is connected. In certain cases, each recipient and distributor has full access to previously distributed, authorized information. Historical access allows individual items that have been previously released to be accessed or delivered on demand, as well as control the flow of certain types of information.

5. Tracking and Feedback

For the information distributor, Tracking and Feedback offers the capability to pro-actively track the success of the distribution, thereby providing details on usage that can help the distributor analyze the value of the information sent out. The recipient, on the other hand, can monitor and change assumptions about which information is sufficiently business critical to warrant delivery. Tracking and Feedback to the information distributor helps one judge the information effectiveness. Based on this, the information distributor can assess whether recipients find their information to be valuable.

Consider, for instance, a field sales engineer who has not requested ongoing delivery or notification. The field sales engineer might not be paying attention to job-critical information. If the problem is more widespread, however, the information being distributed might not itself be effective. Using the Tracking and Feedback provided by the system, one can make appropriate determinations, for increasing productivity of the entire process.

Co-active Information Delivery System

A. General System

In an exemplary embodiment, the system is constructed as a "thin client/thick server" application, which includes the previously-described five characteristics. More particular, the system is implement as a 32-bit multi-process and multi-threaded application, typically running under Microsoft Windows NT operating system (available from Microsoft Corp., Redmond, Wash.). As a native NT service, the system starts automatically as the operating system is booted, with all system communication using the native NT event log. The system includes an Internet IP connection and, optionally, access to an allocated Internet mail account or another MAPI (Microsoft Messaging API) mail system account.

The system employs embedded Web browser and client Internet protocols to integrate into an Internet and Intranet environment. From the NT environment, the system builds in communication with information distributors, recipients, and reference sites using Internet IP, HTTP, and mail protocols. Simultaneous live, real-time, connections are provided by IP and HTTP. Accepting and delivering store-and-forward communication are provided via SMTP/POP3 and MAPI-compliant mail systems. In typical operation, clients of the system communicate via IP networks, dial-up IP access, or off-line messaging (store and forward mail connections). Client software on the client side is capable of dynamically sensing the appropriate method of communication for a given session. In this way, the software can be used by those connected in the office, on the road, or traveling between without reconfiguration.

To achieve universal Web browser access as an information recipient, the Java language is employed. This implements an install-free cross-platform rich application interface to the system, providing communication from the Web browser directly to the system (which itself has built-in Java support for all recipient functionality). Additionally, for Windows 3.1, 95, and NT platforms, recipient functionality is supplemented by native Windows application Wizards that "snap" or plug into electronic mail clients and snap into the Windows desktop to provide integrated on- and off-line access to recipient profiles. In a corresponding manner, the information distributor includes a Windows 95/NT Wizard providing users with complete point-and-click definition, management, tracking and reporting. This Distributor Wizard utilizes OLE 2.0, ActiveX and other Windows technologies to integrate and automate electronic content distribution from the Windows environment.

Figure 1C:
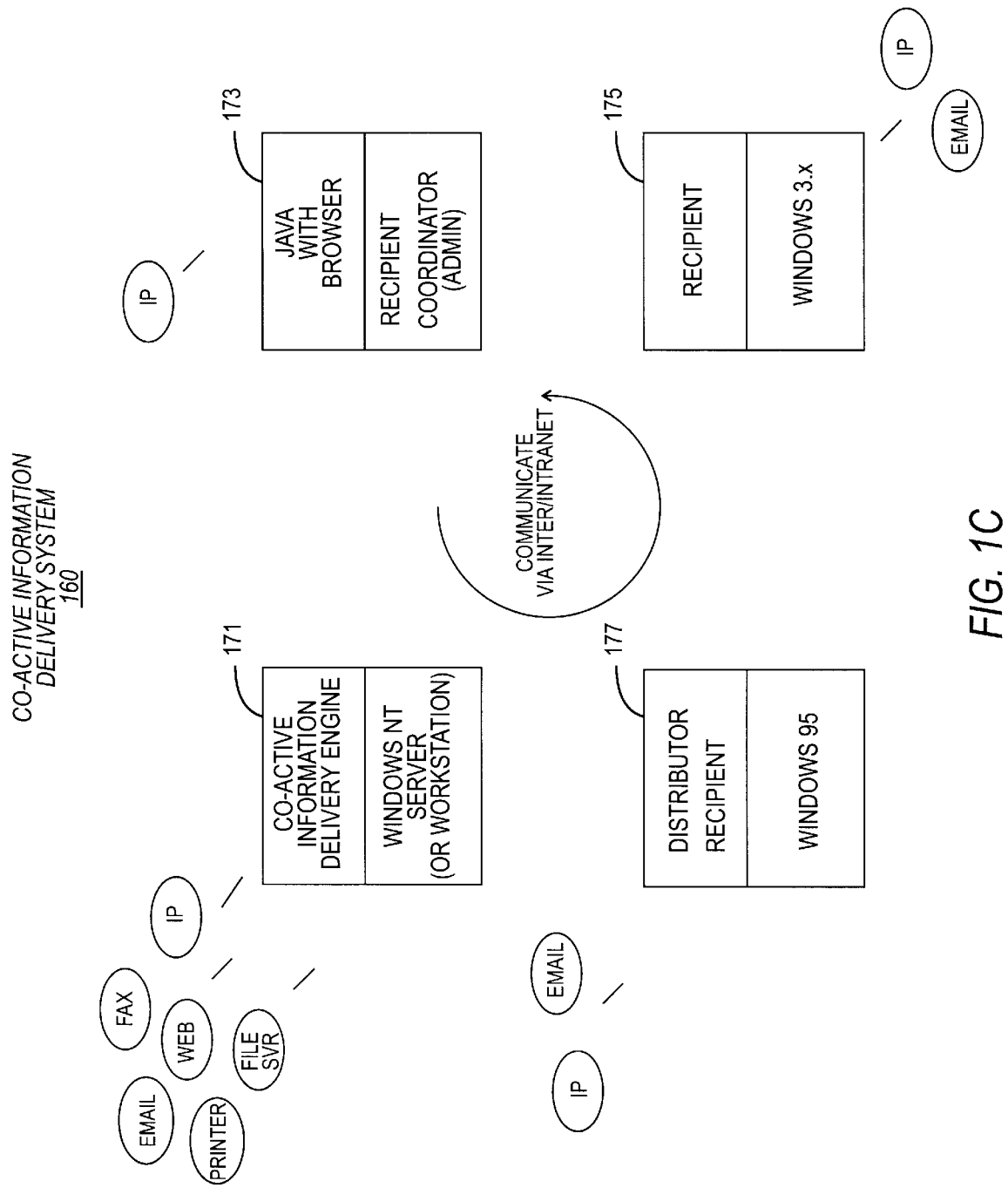
FIG. 1C, is a block diagram providing an overview of the basic organization of a Co-active Information Delivery System of the present invention.

FIG. 1C provides an overview of the basic organization of a Co-active Information Delivery System 160 of the present invention. As shown, the system 160 includes an Intranet server process 171 itself running as an NT background process. The server is connected as an Intranet application, listening and responding to requests from information distributors (e.g., Distributor 177 running under Windows 95), recipients (e.g., Recipient 175 running under Windows 3.x), and site coordinators (e.g., Coordinator 173 operating through a Java-enabled Browser). As illustrated, each module is in communication with the other (e.g., via e-mail and/or an IP connection). Construction and operation of the various components of the system will now be described in further detail.

B. Server Architecture

Figure 2:
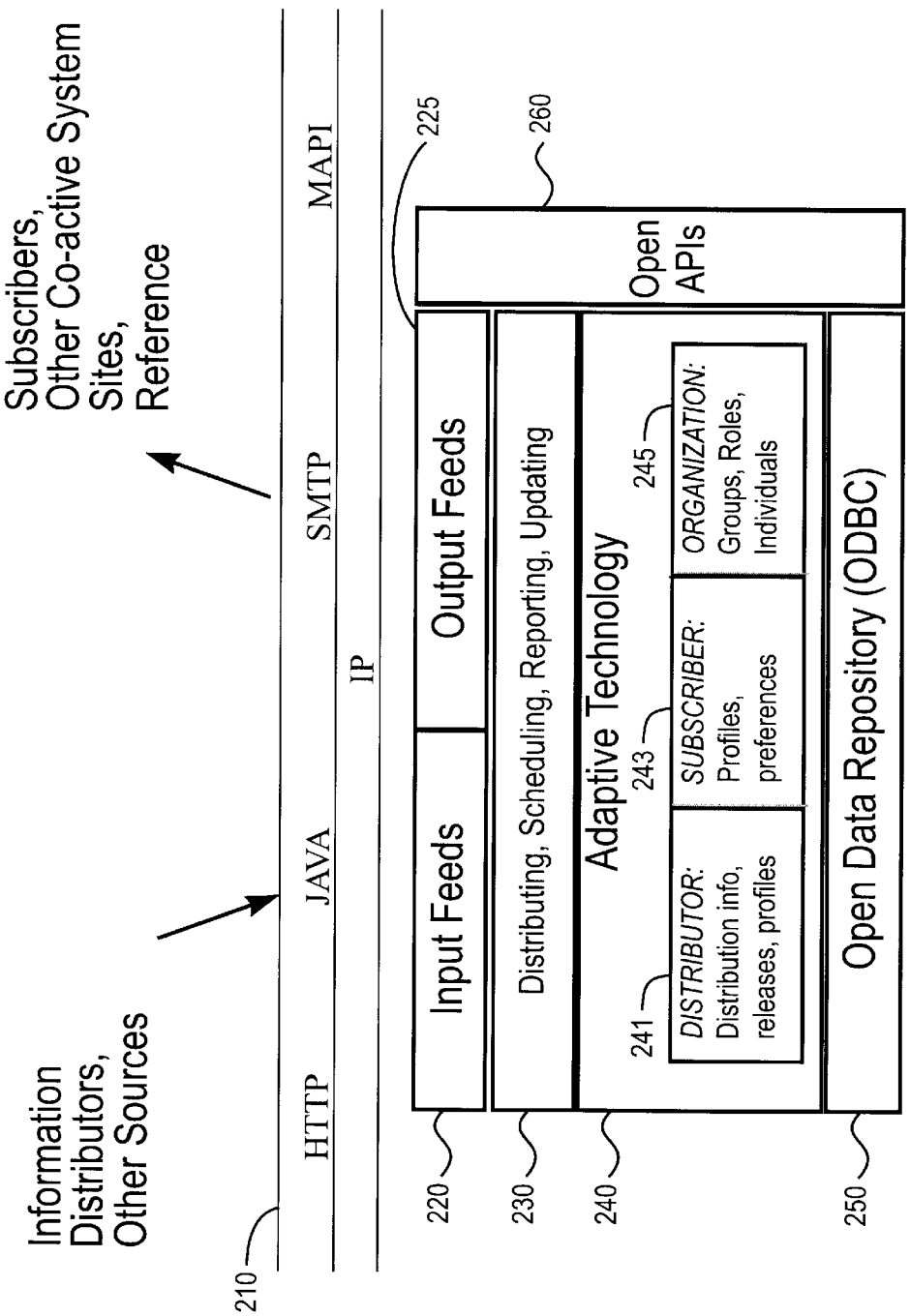
FIG. 2 is a block diagram illustrating internal architecture of the server present in the Co-active Information Delivery System of FIG. 1C.

Internal architecture of the Co-active Information Delivery Engine 200, embodied at the server, is illustrated in FIG. 2. As shown, the server includes Input Feeds 220, Output Feeds 225, Distributing, Scheduling, Reporting, and Updating module 230, Adaptive Technology module 240 (including Distributor 241, Subscriber 243, and Organization 245 functional modules), Open Data Repository 250, and an Open Interface (API) 260. Each will be described in further detail.

1. Input and Output Feeds

The server includes an IP connection 210 for listening to Input Feeds from information distributors and automated input sources. It responds with outputs to subscribers, postings to reference sites, and automated distribution feeds to other servers. Both the listening and responding occurs via the Web (HTTP) and messaging (electronic mail using SMTP and MAPI). It also communicates using an open transport architecture, with (and controlling output via) fax servers, network-connected printers, and other distribution media. Java and HTML objects and forms are used to communicate across the Internet as a common carrier.

The server support two MTAs (Message Transfer Agents) for co-active recipients: e-mail and IP. Outbound-only MTAs are printer, fax, posting, and pager. Fax support in the system is provided by a fax server. In an exemplary embodiment, an Optus™ is employed, using a fax server and the Optus fax software. The Optus fax server can run on the same machine as IntraExpress or can be running remotely. Remote access is via a shared print queue. Embedded codes are used to configure the recipient fax phone number. The Optus fax server accepts postscript or PCL-formatted content. A Castelle™ server (remote IP connection) is employed as a separate fax appliance on the network. It maintains an account on an NT machine for spooling faxes. Castile provides a 32-bit API for sending faxes to the server. The server accepts PCL-formatted content. The NetCentric™ server (service bureau, IP connection) runs offsite as a service bureau. NetCentric provides a 32-bit API for sending faxes. The API sends faxes to the server using HTTP (HyperText Transport Protocol). The server accepts a variety of formats including Postscript and PCL.

For printer support, the server uses native Windows NT printing services. Formatting of content for particular printer devices is accomplished via Ghostscript (Alladen Ghostscript, for PS to PCL rendering). Content is converted from Postscript to the appropriate printer driver format before being spooled to the destination printer.

2. Distributing, Scheduling, Reporting, Updating Module

As the server is processing input and output feeds, it also undertakes the following activities: establishing new distributions; modifying distribution profiles; issuing new releases immediately or according to an agreed-upon schedule; reporting and feedback to information distributors, recipients and coordinators; and updating distribution, recipient, and organizational profiles in response to ongoing activity and negotiation. The server is available on a continuous basis to respond to real-time HTTP requests and store-and-forward messaging requests that arrive and are picked up by the server process.

3. Adaptive Technology Module

Maintained within the server are profiles for all distributions, subscribers, and the organizational structure and grouping of the recipient community. Adaptive technology ensures that all of these profiles are contextually linked together and changed automatically as new information or context for any part of the profile is updated. Profiles are conveniently divided into Distributor and Subscriber profiles.

A Distributor profile (which is maintained for each distributor) includes: information about:

What—Information about authoring application, including information about data file formats to automatically convert to and make available.

Who—Which groups, roles and individuals are eligible to receive the information; for each, the information distributor's policy about push versus pull to begin the Co-Active negotiation.

Where—To which Web site URLs, Netware or NT file servers, FTP servers or other servers the information should be automatically posted for reference.

Additionally, the profile references a versioned repository of previously-issued releases of actual content for each distribution in each available format. The number of back releases to be stored by the system is configurable as part of the distribution policy.

A Subscriber profile (which is maintained for each subscriber) includes information about:

Registered addresses—All the registered addresses to be used to reach that recipient. This includes e-mail, fax, networked printers, and pagers. It also includes an indication of preferred address routes to be used.

Eligible distributions—All distributions for which they are eligible, by virtue of membership in an eligible group, their individual role, or as a named individual. For each distribution, information is maintained about their subscription status and preference.

Organizational—This includes all individuals who are registered with the server, names and composition of organization groups (such as "Eastern Regional Sales Representatives" or "Tier 1 Partners"), and certain designated organizational roles (such as "Channel Coordinator" or "CFO"). This information can either be originated and maintained within the server or imported and synchronized from external sources, such as customer mailing databases, or network or electronic mail name services.

The Adaptive Technology module monitors and maintains the integrity of this information on an ongoing basis.

4. Open Data Repository

The above-described profiles are stored in a Data Repository. In a preferred embodiment, the system use standard ODBC (Microsoft Open Database Connectivity) for storing the profile information in relational table, thereby providing an "open" Data Repository, with performance, portable, and database independence. Any ODBC data source, including Oracle, Sybase, Microsoft SQL Server, and Informix database server products, may host the underlying Data Repository in a manner which is transparent to the system. In this manner, one's corporate standard database server and customer standards/policies for database administration and backup may be applied. The Data Repository itself comprises two ODBC-compliant databases: an Address Database (ADB) and a Distribution Database (DDB). The former handles all addressing, policy and profile information; the latter handles distributions and releases. Together, the database provide storage persistency and data access.

5. Import Utility & Address Book

An import utility is provided as a separate component. This utility will allow the system Administrator/Coordinator to import ASCII comma-separated vectors (CSV) files into the system. The import capabilities allow field matching to map external database information to the system's internal address book information. An update component allows the system's address book to be refreshed based on changes from the external source.

6. Open Interface (API)

The system externalizes its functionality (including Wizard-based user interaction for the information distributor, recipient and system administration), so that it can be programmatically accessed through an open Application Programming Interface (API). This enables the system to easily accommodate specialized applications, including automated sources of reports and documents, such as accounting systems or sales force automation tools; automated recipient tools or posting reference sites, such as for library management, cataloging or indexing, or marketing encyclopedias; specialized networking, electronic mail, or other communications systems.

Client Components

The server is driven by the client components. In particular, the server services three types of client components in the system: Distributor, Recipient, and Coordinator. The features and functionality of each will be described in turn.

A. Distributor

The Distributor component provides a user with the ability to create a distribution that will be published to the server and distributed to other users within Intracommunity. In addition to being able to create a distribution, the Distributor can also create new releases for the distribution, manage the distribution and manage the groups, and manage roles and individuals associated with a specific distribution. The Distributor identifies the "who," "what," "where," and "when" of the distribution by selecting one of two modes: a Simple Document or Files and Applications distribution.

1. Creating a Distribution—A Simple Document

Typically a user chooses this option when distributing a single file, a word-processing document, spreadsheet, a simple report document, or the like. The process of creating a distribution begins with describing "what" the contents are which make up the distribution, "who" will be a recipient, "where" the distribution is posted, and "when" the distribution occurs. The contents of a Simple Document distribution will now be examined.

(a) Title and Description

The Title and Description of the distribution is displayed in the body of the cover letter that the recipient receives upon announcement of the offer for subscription. The Title is unique for all distribution for a particular distributor, thereby allowing the system to easily identify each distribution of that distributor. The Description serves as an optional thumb nail description of the whole distribution.

(b) Distribution Policies

Distribution policies include the ability to specify a priority and a security-level for the distribution. Further, a policy can specify a version depth, thereby allowing others to issue releases against the distribution (co-issue). Finally, one can use a policy to set report preferences for a distribution. For setting policies, the system provides a user interface with the following user interface components:

Deferred priority (check box control): Indicates that when releases are delivered the delivery transport should make an effort to expedite the delivery if possible (e.g. for e-mail send with high priority).

Deferred confidential (check box control): Indicates that when releases are delivered the delivery transport should maintain the release as confidential (e.g. for e-mail send as confidential).

Version depth: A numeric value to specify the number of back issues (releases) the server should keep available for fulfilling request on demand; a value of 0 indicates all releases will be kept. Once the number of releases is equal to the version depth, the oldest back issue will be deleted from the server.

Co-issue—check box control: Allows others to issue releases against the distribution.

Reports: The distributor may specify that a report should be delivered on a regular basis (e.g., daily, weekly, or monthly). The report shows the current status of the distribution indicating who has access to the distribution, who is currently active and how they are receiving releases.

(c) Identify the Formats

Distributions may contain more than one format. Each release of the distribution should typically have the same formats available. A format is considered as an alternative representation of content (e.g., version 2.0 and version 7.0 of Word would be considered as two formats). The user identifies the applications used to create the content of the distribution. Each application maps to one or more formats that will then be contained in the distribution. After the primary applications (formats) are chosen, the system can automatically make available other native formats for a particular application via OLE automation. in an exemplary embodiment, the following three Microsoft Office applications are supported: MS-Word, MS-Power-point, MS-Excel. The system will automatically make the distribution also available in Fax and Printer format. This is accomplished by rendering the primary file of the format in an interchange format (e.g., Postscript™, available from Adobe of Mountain View, Calif.). This format is sent to the server where it can be further rendered to a set of common print formats.

(d) Identify the Recipients

The user selects the desired recipients for the distribution from the system directory list (address book). This includes individuals, groups and/or roles.

(e) Identify Recipient Policies

The distributor can select one of four policies to be assigned to the recipient for this particular distribution. These may be changed later either by the distributor or the recipient.

Deliver: Instructs the system to deliver the distribution to the recipient via their default delivery channel as specified in their profile. If more than one application format is available, the Distributor will be prompted to choose the format to be delivered to the recipient.

Notify: The recipient will receive a notification informing him or her that a new release of the distribution is available. A "notification" is a message that describes the release. It does not contain the actual content of the release. Each time a new release of the distribution has been issued, the recipient will receive a new notification.

Offer: Instructs the system to send the recipient a message indicating that a new distribution has become available to that recipient. The offer provides three options to the recipient: to start a subscription, to be notified of future releases, and to take no action at this time. If the recipient chooses to take no action, access to the distribution remains available.

Available: Instructs the system to take no action. The recipient is simply marked as a valid eligible subscriber.

(f) Specify Site to Publish to (Optional)

The system can post releases to specific sites. A site is usually a public (or restricted) place where information can be accessed. Three types of sites can be specified: a Web Site, an NT/Novell File Server, or an FTP (File Transfer Protocol) Server. The user can create Site definitions that identify where the distribution should be posted. For a Web site, releases are posted using network copy or FTP; releases are then accessed by the recipients using standard URLs. For NT/Novell File Server, releases are copied to network file servers using either public access or restricted access if credentials are supplied. For FTP Server, releases are delivered to an FTP site using FTP (File Transfer Protocol); an anonymous login is used unless credentials are supplied. The scope of the site is local to the distributor—that is, site definitions are not shared between distributors, unlike the address book. Sites may have optional credentials supplied by the distributor. These credentials are used by the system to access a restricted site.

2. Issuing a First Release

At this point during distribution creation, the distributor is prompted to finish with the distribution or to also issue the first release at the same time. If the distributor chooses to finish, the distribution is sent to the server and the distribution is done. If, on the other hand, the first release choice is taken, "Issue Release" internal method is executed.

(a) Title/Description of Release

The Title and Description of the release are displayed in the body of a cover letter for the distribution. The recipient receives the cover letter upon notification of the offer for subscription. In an exemplary embodiment, the system requires the user to specify a release title; unique titles are typically used within a distribution. The description, which is optional, includes information that is used to help recipients identify the content of the release.

(b) Identify the Files

The user is prompted to select the appropriate files that correspond to the specified formats for the distribution. This selection usually includes a primary file for each format specified. The user can also specify related files for each format, in instances where more than one file is needed for the format in the release. These files are commonly embedded graphic files, templates, and the like (e.g., a GIF file for an HTML document).

(c) Specify Distribution Time

The final element of creating a distribution is specifying a time when the distribution will be made available by the server. The distributor has the option of specifying "immediate" or "deferred" availability. Deferred delivery can be any absolute time in the future; here, the distribution is not available to recipients until the specified time. In all cases, the distribution is still posted to the server immediately.

3. Creating a Distribution—File and Applications

Typically, a user chooses this option when distributing file sets or software applications. Each release of the distribution may have different files and formats. There are no restrictions on matching and maintaining formats at the distribution level. The option provides a less structured interface than the simple document option. In particular, the format and file selection process are less structured.

(a) Identify the Files

The user is prompted to enter or browse for the file set to include in a particular release of the distribution. Unlike above, formats are not selected and iterated through.

(b) New Releases

A distributor typically uses this feature to issue new releases against an existing distribution. The user can select a new file(s) for each specified format in the distribution; the user can also add additional related files. In a manner similar to "Issue First Release" above, the distribution delivery time can also be specified.

(c) Manage Distribution

The Manage Distribution option allows the user to manage the distribution profile. These elements include the ability to delete existing issues, modify distribution policies, add or remove formats, modify the recipient list and recipient policies, and add or remove sites.

(d) Manage Groups, Roles and Individuals

The Manage Groups, Roles and Individuals option allows the user to add, edit and delete groups, roles or individuals. The content of a Group or Role can be viewed from the edit group and role windows. The distributor's rights to manage the address book can be constrained by the administrator.

B. Recipient

The Recipient component of the system allows the user to respond to notifications and offers, and to manage their address profile and subscription profile.

1. Offer

The recipient can receive an offer via e-mail, fax, printer or pager. When receiving the offer via e-mail, the user can select the offer (e.g., click on the attached offer icon) for invoking the Recipient component. The user can select from one of three options: subscribe for delivery, subscribe for notification, or to take no action.

Delivery: Allows the user to select the delivery channel and the desired file format when choosing e-mail.

Notify: Allows the user to select the desired delivery channel that the system will use to deliver the notification.

No Action: Leaves the recipient on the access list for this distribution with no delivery action taken by IntraExpress.

2. Notification

The recipient can receive a notification via e-mail, fax, printer or pager. When receiving the notification via e-mail, the user can select the notification (e.g., click on the attached notification icon) for invoking the Recipient component. The user can select from one of the two major options: Deliver (now) or View (now).

Deliver: Allows user to select the desired delivery channel and file format (for e-mail) that IntraExpress will use to deliver this release of the distribution to the recipient. Delivery to a pager requires the content to be available in ASCII (simple text) format.

View. Allows the user to view the file (current release) that has been posted to a Web Site, File Server, or FTP server. If the file is available as a URL, then the client will launch the registered browser for viewing the contents. The release can also be retrieved via FTP or from IntraExpress. In the later case, the client will attempt to launch the appropriate native viewer to display the contents of the release.

The user can also chose from two sub-options: convert the notification policy to a deliver policy, or convert the notification policy to a no action policy (stop notifying).

3. Edit/Manage Profile

This allows the recipient to manage their personal profile. There are two major components of the profile editor: Addresses editor and Subscription Policies editor. Addresses can be added, modified, or deleted. Each recipient requires at least one address specifying which address should be used as a default (preferred) address by the system. The recipient can also specify if a report should be sent on a regular basis (daily, weekly, monthly) indicating the recipients state with respect to registered addresses and subscription policies within the system.

Addresses: Addresses can be added and deleted from the recipients profile. Addresses may also be edited in that the address value can be modified without side effecting any active subscriptions that use that address. All future releases will be delivered to the edited address. If an address is removed that has active subscriptions using it, the recipients default (preferred) address is substituted for the active subscriptions.

Subscriptions: Recipients may view and search through their available and active subscriptions. They may also change the policy for any of their subscriptions, or request individual releases to be delivered on demand. Searching allows the recipient to narrow the viewable list of distributions by allowing a search on the title, description, and distributor.

4. "Universal" Recipient

A Universal Recipient is defined as anyone having access to the system as a service, but not actually having the client software (i.e., Recipient component) available or running on their system. Two types of universal recipients exist: Passive Universal Recipient and Co-Active Universal Recipient. The Passive Universal Recipient can only receive information. This typically comprises recipients who receive via fax, pager, e-mail, or printer. A Co-Active Universal Recipient, on the other hand, can interact with the system using simple text mail messages. The system will deliver simple text forms to the recipient's e-mail box. These are designed as "human readable". The recipient can markup the form and return it back to the system. The form will be processed by the system and acted upon in the same way as the system's own client forms.

C. Coordinator

The Coordinator component provides the administrator (i.e., coordinator user) with the ability to manage the server.

The coordinator can manage the address book, recipient profiles, and distributions. The coordinator can also set global system policies. The coordinator provides all of the recipient functionality as applied to all users of the system.

1. Address Book

The coordinator has full access to the address book. Individuals, roles, and groups can be viewed, created, deleted, and edited.

2. Recipient Profiles

The coordinator can "act" on the behalf on any recipient. The system provides a list of all recipients in the system. The coordinator can select any given recipient and then manage their profile.

3. Distributions

The coordinator can delete and re-assign distributions. Deleting distributions removes the distribution from the system and cancels any active subscriptions against that distribution. The coordinator may re-assign a distribution to another distributor. The newly-specified distributor will, as a result, have complete ownership of the distribution.

4. System Policies

The coordinator can edit and maintain the global system policies within the system. The following policies are supported: editing the coordinator password, specifying system report frequency (none, daily, weekly, monthly), assigned address book rights.

Password: The coordinator account requires a password for gaining access. This password can be changed at any time by the coordinator (note: a blank or canned password will be present at initialization).

Report: The report is an ASCII (simple text) report that displays the current state of the system. This includes the contents of the address book, and the distributions and policies in the system.

Address Book Rights: Two sets of address book rights are available, either (1) only the administrator can manage the address book or (2) distributors can be granted manage rights. Distributors can either have the right to only add new individuals (add on-the-fly), or have full access to individuals, groups, and roles.

Preferred User Interface

A. Distribution

1. General

Figure 3A:
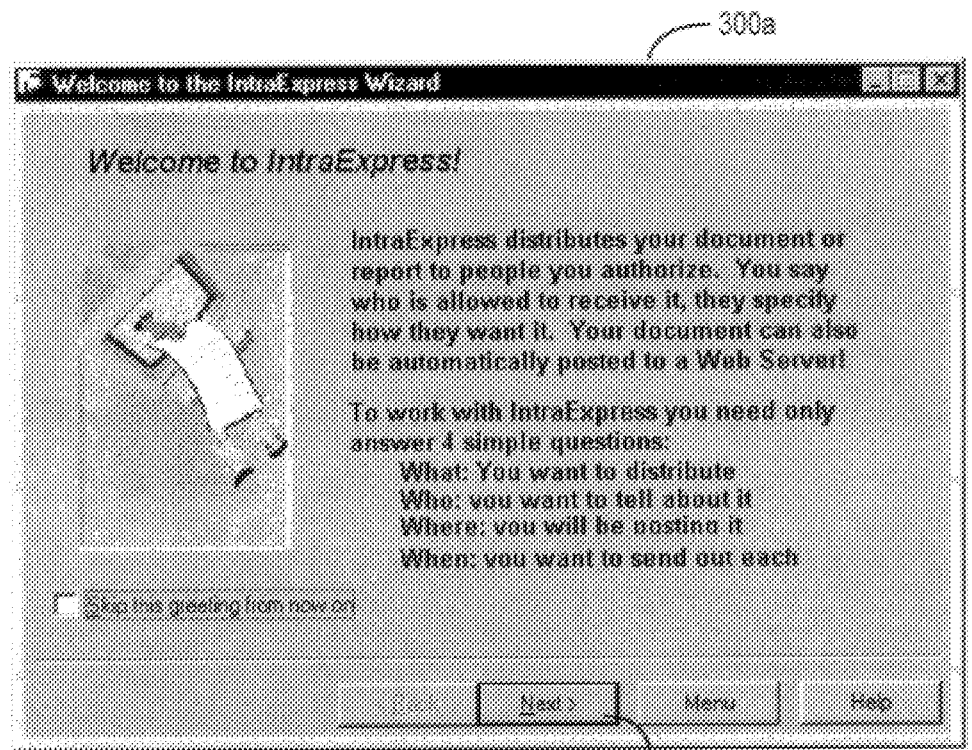
FIGS. 3A and 3B are bitmap screenshots illustrating "Wizard" dialogs providing by a user interface of the system for assisting the user with user input tasks.

"Distribution" includes four core areas of functionality: new distribution, new release, manage distribution, and address management. At the outset, it is helpful to examine operation of the user interface for a user who desires to set up a distribution. As shown in FIG. 3A, a "Wizard" dialog 300a is employed for assisting the user with this task. The Wizard comprises a sequence of directed dialogs, with each particular dialog of the sequence directed at accomplishing a particular sub-task. During the sequence, the user can continue to the next dialog by clicking a corresponding "Next" button; in a corresponding manner, the user can back-track through the sequence by clicking a "Back" button.

Figure 3B:
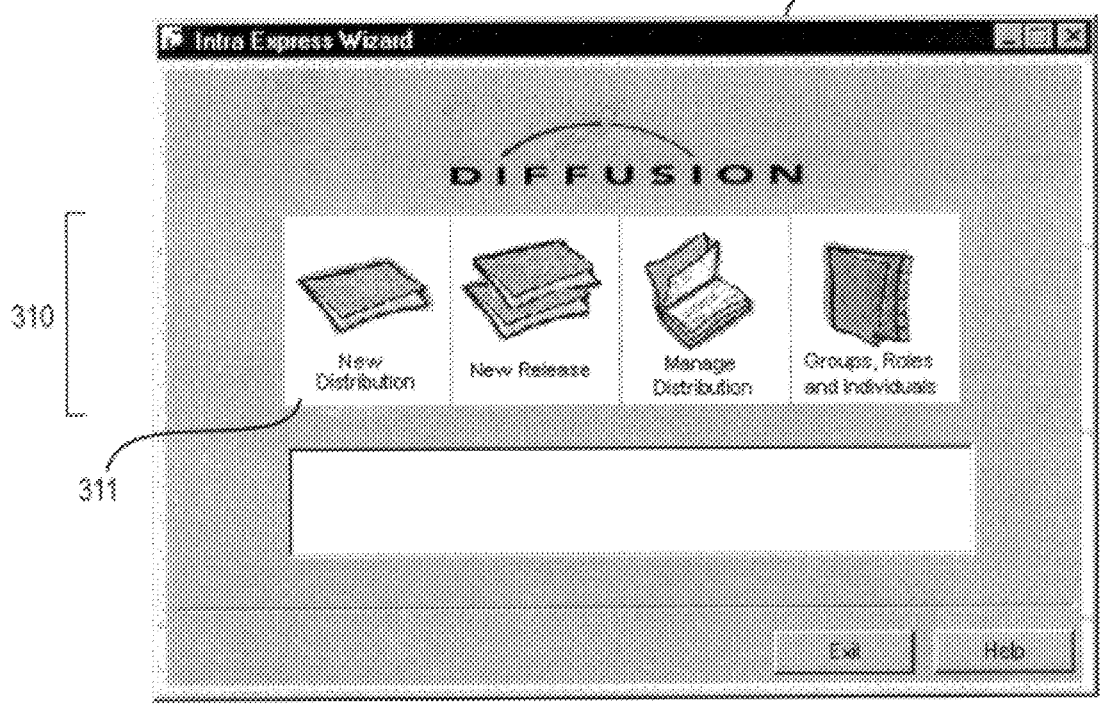

Upon clicking Next button 301, the Wizard 300a changes from the "welcome" dialog shown in FIG. 3A to a general, task-selection dialog, shown in FIG. 3B as 300b. From here, the user can establish a distribution including specifying content, format (i.e., initial format), and recipients to receive the distribution. The corresponding recipient piece is "co-active," allowing recipients to change receipt of the distribution. The Wizard dialog 300b includes selection buttons 310, for selecting a particular task to perform. For the present example, the user selects new distribution icon 311 for specifying a new distribution, as will now be described.

2. New Distribution

Figure 4A:
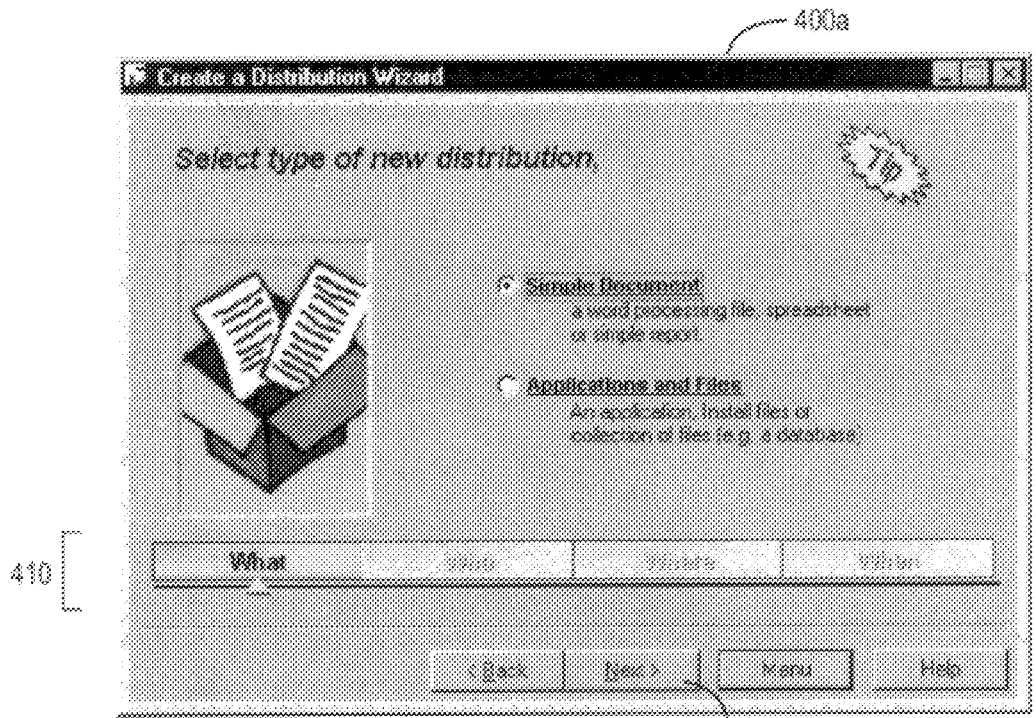
FIGS. 4A, 4B, 4C, 4D and 4E are bitmap screenshots illustrating "Wizard" dialogs of the system for assisting the user with the task of inputing information during specification of a "new distribution," for indicating "what" is to be distributed.

Upon the user selecting the New Distribution icon 311, the system, in response, displays New Distribution Wizard 400a, as shown in FIG. 4A. Here, the user selects the type of new distribution desired. In the currently preferred embodiment, two types are supported: (1) simple document, and (2) applications and files. The former represents a distribution which is generally periodical in nature. The latter generally handles distribution of applications.

When specifying a distribution, the distributor user addresses four questions: what, who, where, and when. Sub-task icons 410 provide feedback during use of the Wizard, for indicating which particular sub-task is currently being addressed, as well as those sub-tasks which have been completed. Thus as shown for Wizard dialog 400a, for instance, selection of the type of "new distribution" comprises part of the "what" sub-task. The "what" component specifies what object (e.g., application object) and what format is to be distributed. The "who" component specifies who the distribution is to go to (i.e., formulation of a list of recipients). The "where" component specifies where (i.e., one or more addresses) the distribution is to be sent. The "when" component specifies when the distribution is to occur.

a. "What"

Figure 4B:
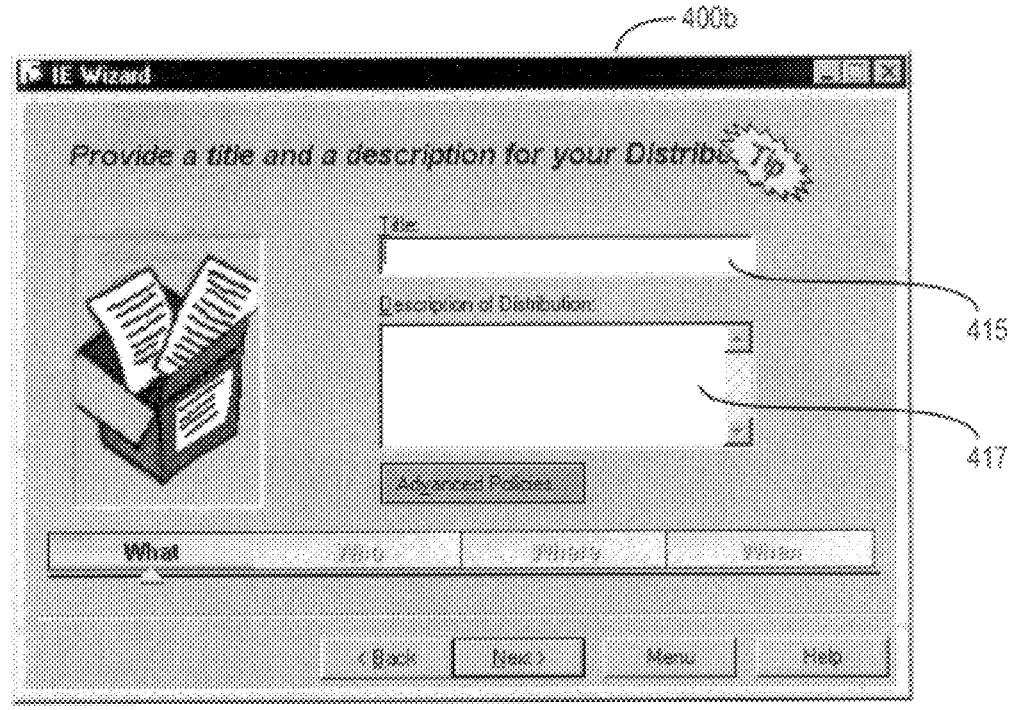
Figure 4C:
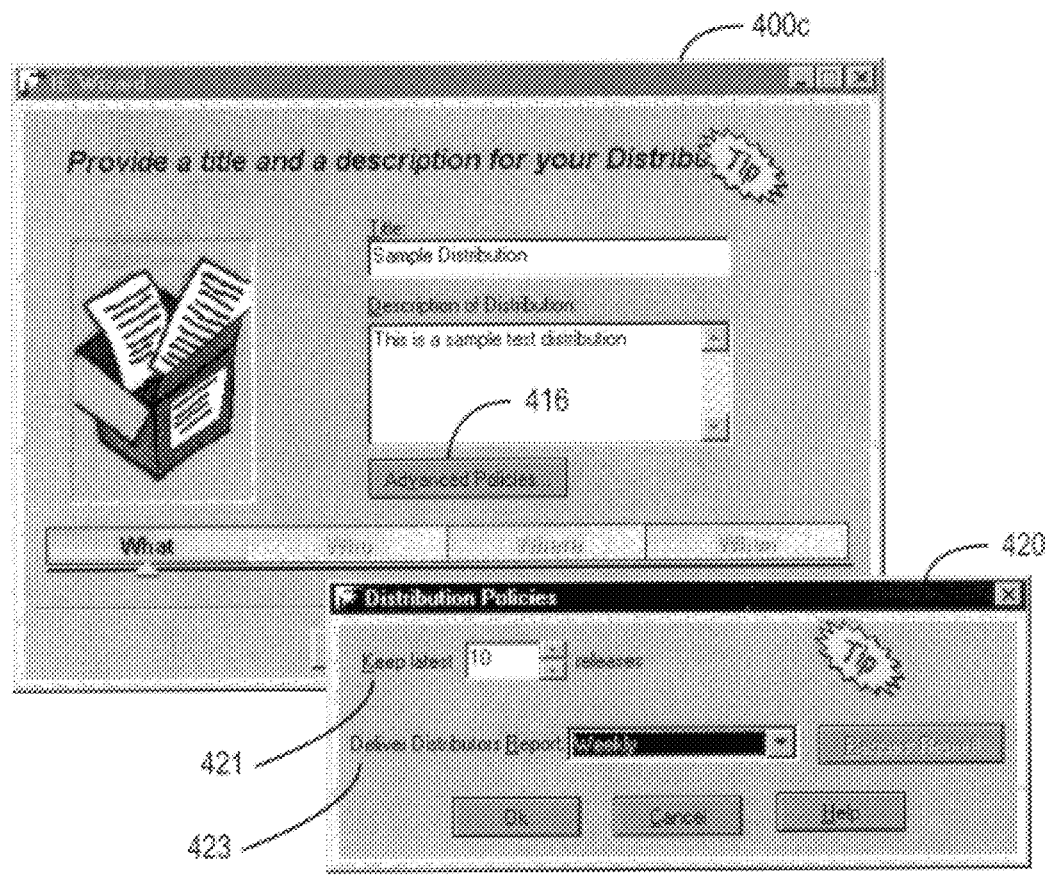

User operation of the user interface will now be described for completing input for each of these components. Upon the user selecting "Next" button 411, the system, in response, displays Wizard dialog 400b, as shown in FIG. 4B. Here, the user enters a title for the distribution at edit field 415 and enters a description of the distribution at edit field 417. FIG. 4C illustrates the Wizard (now 400c) after the user has entered information in the edit fields 415, 417. Additionally, upon the user selecting "Advanced Policies" button 416, the system displays Distribution Policies dialog 420. Here, the user inputs information for defining distribution policies. For instance, at Version Depth edit field 421, the user indicates how many releases or versions of the distribution are to be maintained—that is, "back issues" stored by the server. The user can set this value anywhere from zero to unlimited. At Distributors Report edit field 423, the user can select a time interval (e.g., weekly) for specifying automatic report generation which is sent back to the distributor, for indicating the activity for the distribution. After the user has completed input at this point, he or she selects the "next" button for proceeding to the next input step of the Wizard.

Figure 4D:
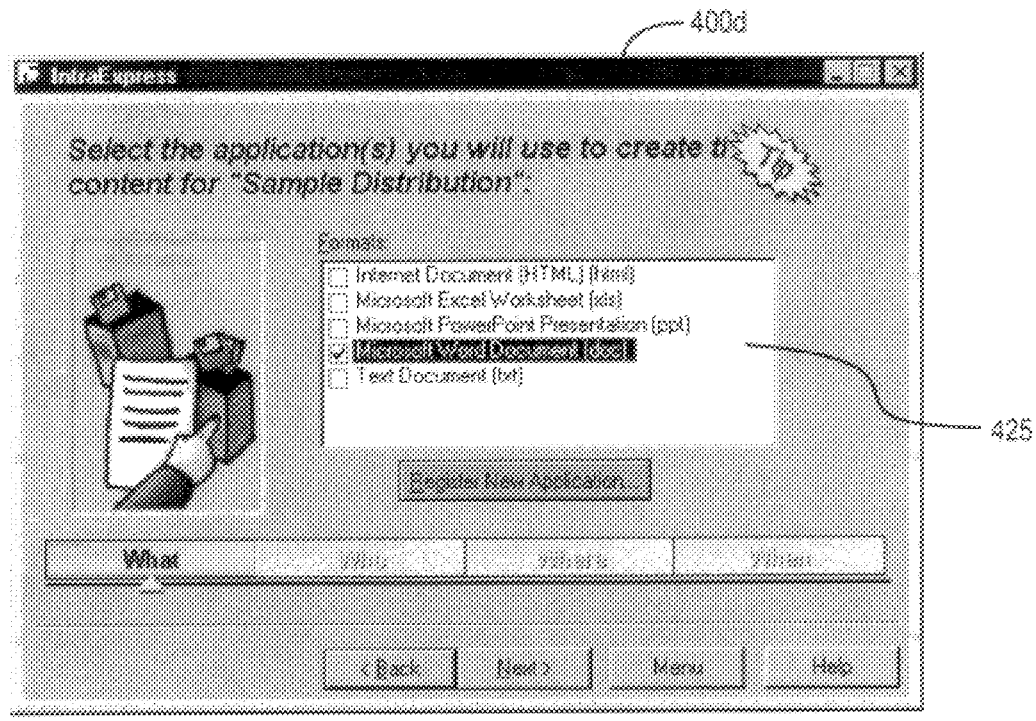

Next, the user selects the application(s) he or she will use to create the content for the distribution, as illustrated by Wizard 400d in FIG. 4D. As shown by the dialog, a list 425 of source formats supported is displayed. Here, the user can select from the list for indicating one or more formats in which the distribution is to occur. For the example at hand, the user has selected the Microsoft Word document format.

Figure 4E:
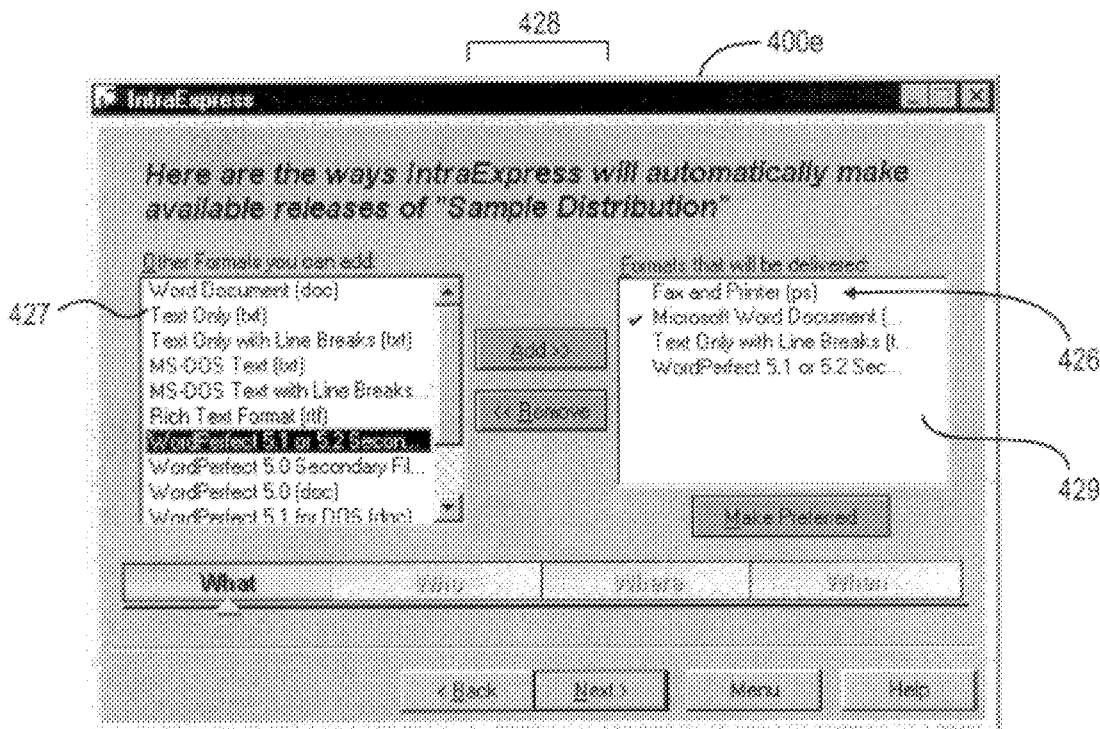

Upon the user selecting the Next button in dialog 400d, the system now displays Wizard dialog 400e. The system displays in FIG. 4E (based on the one or more formats the user selected in dialog 400d) additional formats which are automatically made available for the distribution. For the present example, for instance, the dialog 400e presents a list 427 of other formats automatically available as a result of the user selecting the Microsoft Word document format in dialog 400d. By invoking add/remove buttons 428, the user can add (or remove) formats appearing on the list 427 to (or from) a delivery format list 429. Thus at Wizard dialog 400e, the user is indicating exactly how (i.e., what format) he or she desires to make the distribution available to other users. In this fashion, the distributor user can easily accommodate the needs of different users, each of which might need the distribution in a particular format (e.g., WordPerfect format for one user, Rich Text format for another user, and so forth and so on). Additionally, the system automatically adds an appropriate format for FAX and printing (e.g., TrueType™ or PostScript™), as shown at 426. In an exemplary environment, the format employed is PostScrip™ (Adobe Software, Inc. of Mountain View, Calif.) which, in turn, can be rendered at the server for appropriate output to a FAX and/or printing device. In the event that the user does not specify a preferred format, the system will perform the distribution using the native format for the object to be distributed. In such an instance, the object is distributed "as is," without translation into other formats.

b. "Who"

Figure 5A:
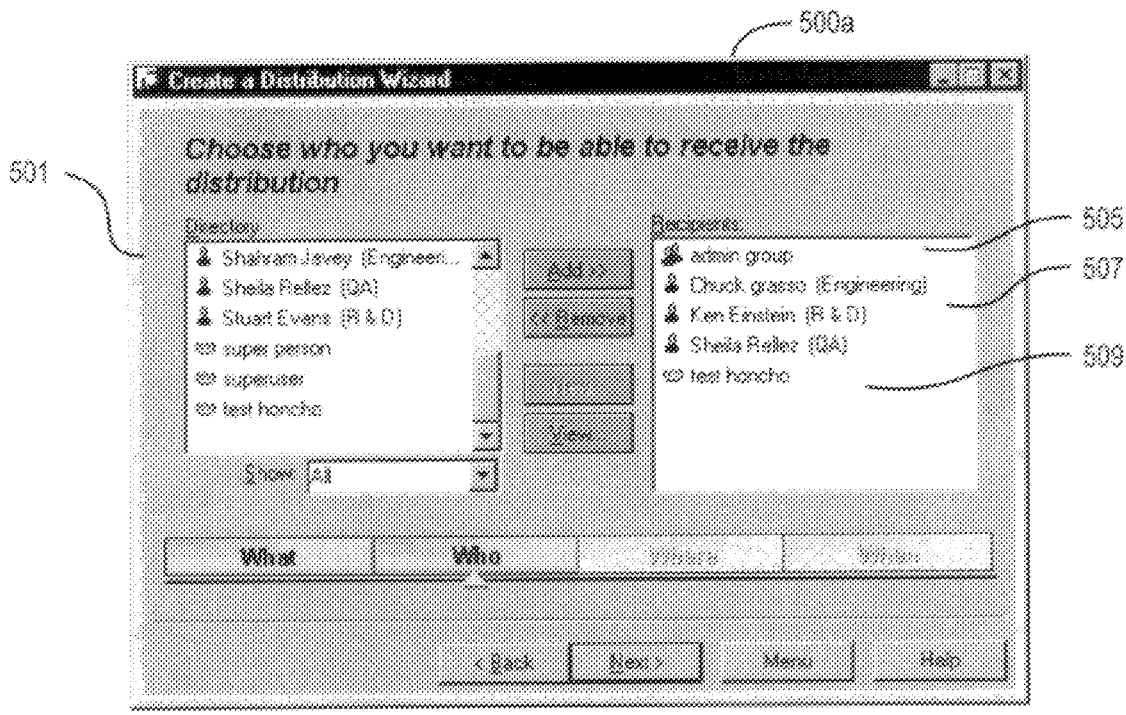
FIGS. 5A and 5B are bitmap screenshots illustrating "Wizard" dialogs of the system for assisting the user with the task of inputing information during specification of a New Distribution, for indicating "who" is to be added to the distribution.

Upon the user selecting the Next button in Wizard dialog 400e, the system, in response, displays "Who" Wizard dialog 500a, as shown in FIG. 5A. The dialog 500a includes a directory list 501 from which the user can select the following: groups, roles, and individuals. An "individual" is a particular person. A "role" represents, on the other hand, a one-to-one relationship, such as "vice president of sales"; as the system is adaptive, the role can be vacant or occupied at the time the distribution is defined. A "group," which exists as a collection, can contain roles and/or individuals, or even other groups (i.e., subgroups). In response to user selections from the list 501, the system displays selected recipients at list 509. For the current example, the list ] includes a group 505, multiple individuals 507, and role 509. Now that the user has chosen desired recipients, he or she can proceed to the next step in the process by selecting the Next button.

Figure 5B:
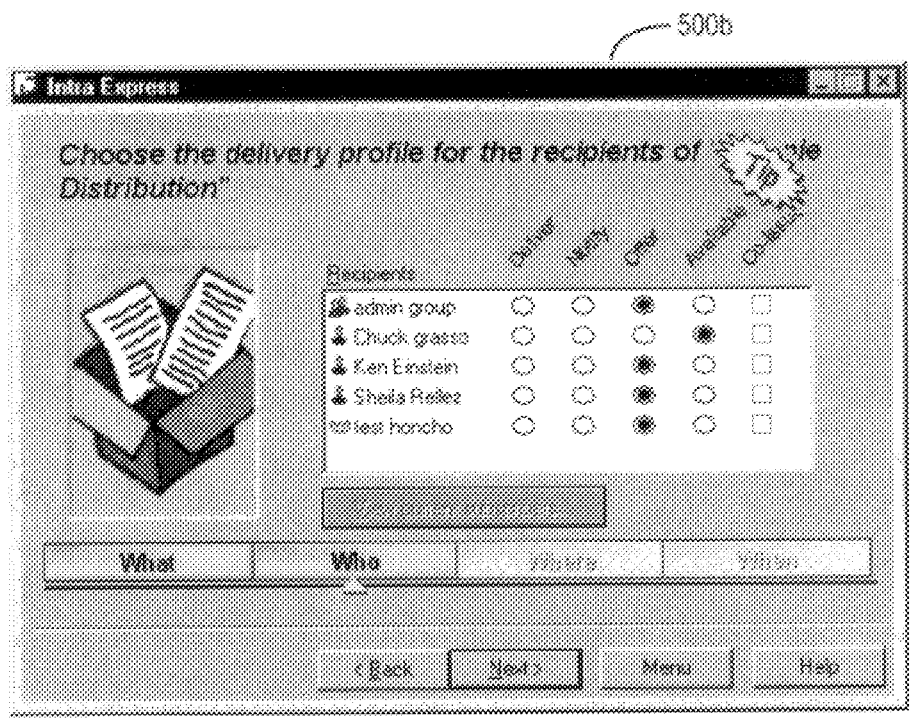

FIG. 5B illustrates the next step in the process, as represented by Wizard dialog 500b. Specifically at this point, the distributor user is given the opportunity to chose a delivery profile or policy for each of the recipients of the distribution being created. In an exemplary embodiment, the following policy states are supported: deliver, notify, offer, available, and co-issue. These operate as follows. "Deliver" instructs the system to send the distribution object to the recipient immediately (i.e., transfer of content without delay). "Notify" instructs the system to send out a notification indicating that a new version of the distribution is available. "Offer" instructs the system to send out an offer (invitation to subscribe) to the recipient, for giving the recipient the opportunity to accept or decline the distribution, as well as co-act with the system for indicating how (i.e., what format) the recipient desires to receive the distribution. In an exemplary environment, "offer" is chosen by default.

"Available" indicates to the system that the recipient will receive access to the distribution (i.e., access to the data object). In such a case, the recipient will not receive notification of the distribution (i.e., will not receive an e-mail notification), but nevertheless will be able to readily determine (from the client-side Profile Manager) that the distribution is available to him or her at any time, and decide at that point whether to subscribe. By default, the distributor user (sender) will have an "available" profile for his or her own distributions.

"Co-issue" indicates to the system that the recipient can serve as a co-issuer of the distribution. This gives the co-issuer recipient the right to send out other versions of the distribution. The distributor user, for instance, might wish to publish electronically the current week's edition of a newsletter. By establishing a co-issuer recipient, the distributor user grants permission to that recipient to publish later versions (e.g., next week's edition of the newsletter). In an exemplary embodiment, co-issuer rights only include the rights to publish versions; the rights do not include the ability to modify other aspects of the distribution, such as the target recipients (i.e., recipient list). In an alternative environment, these additional rights can be granted by providing yet another delivery profile state—manage subscription.

From the server's perspective, management of the distribution is adaptive. If, for instance, a particular individual is added to the "admin" group, that individual would automatically get an offer for the distribution without any intervention on the part of the distributor user. Similarly, if a role is fulfilled by a new individual, the system adapts the distribution to accommodate the new individual. In this manner, the system provides automatic, adaptive support for a changing organization, without further intervention on the part of the distributor user. Internally, as roles and groups change, the server component of the system cycles through all the distributions that the changed role or group has access to, and adjusts the distributions accordingly. At that point, the server can go through each distribution retrospectively and send out the appropriate policy for that distribution. After the distributor user has reviewed and/or modified the delivery profile for the recipients, he or she selects the Next button, thereby concluding input for "who."

c. "Where"

Figure 6A:
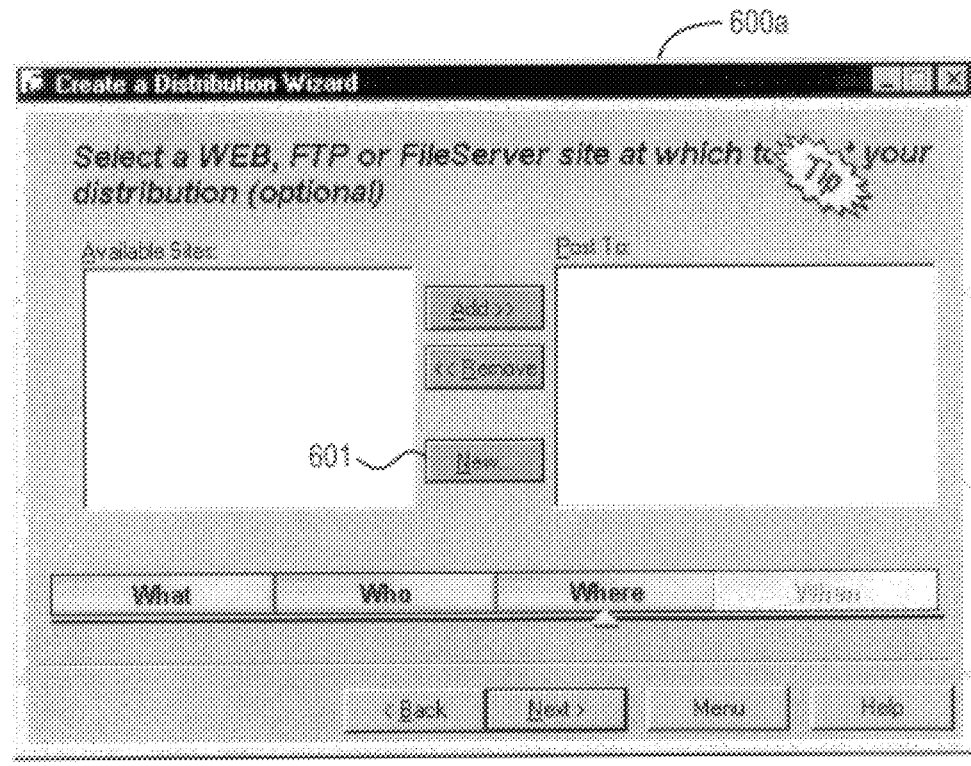
FIGS. 6A, 6B, 6C, 6D, and 6E are bitmap screenshots illustrating "Wizard" dialogs of the system for assisting the user with the task of inputing information during specification of a New distribution, for indicating "where"—a location for the distribution.
Figure 6B:
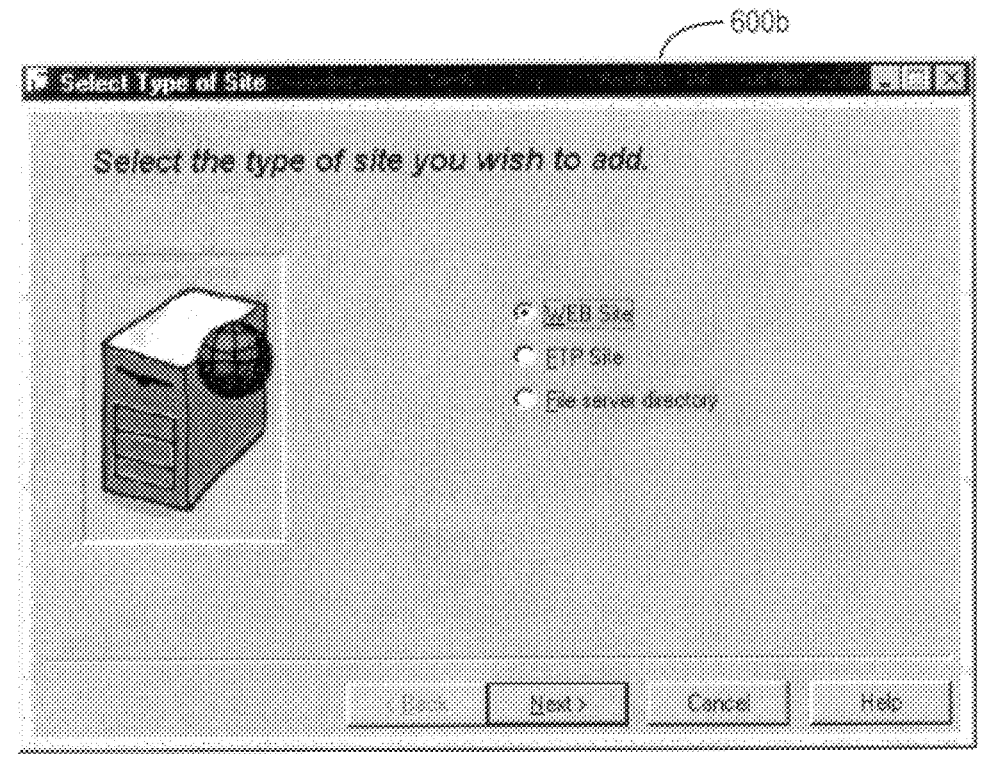

Upon the user completing specification of "who," the system proceeds to display "Where" Wizard dialog 600a, as shown in FIG. 6A. This allows the distributor user to specify a location to post a distribution, including a Web site, an FTP (File Transfer Protocol) server, a file server, or the like. To add a new site, the user clicks New button 601. In response, the system displays Wizard dialog 600b, illustrated in FIG. 6B. As shown, the Wizard dialog includes options for selecting a Web site, an FTP site, and a file server directory.

Figure 6C:
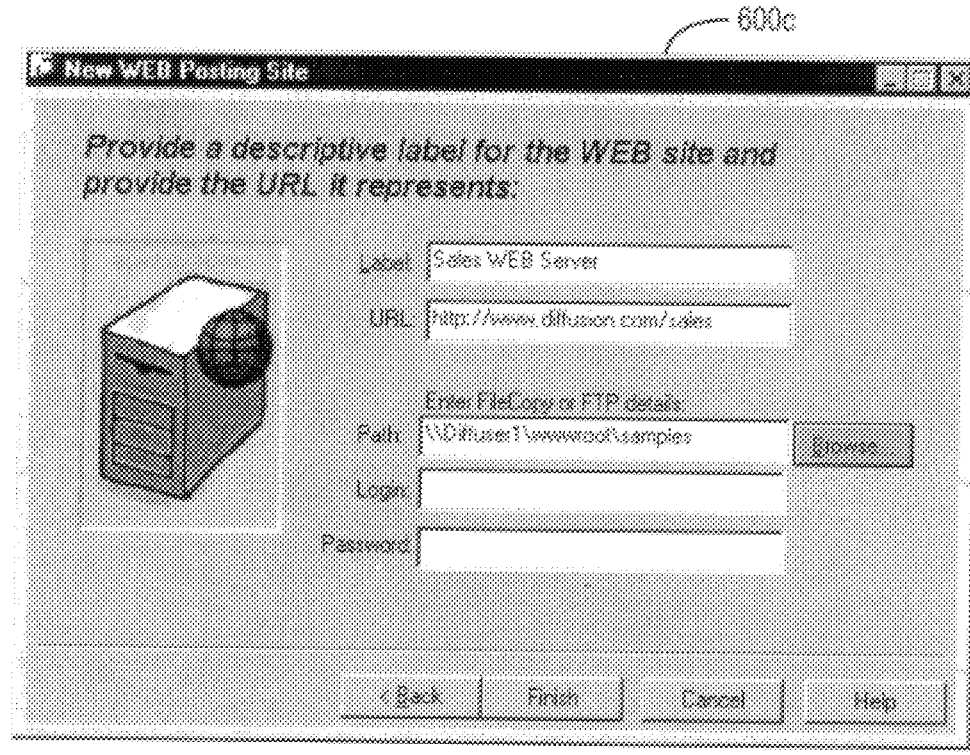
Figure 6D:
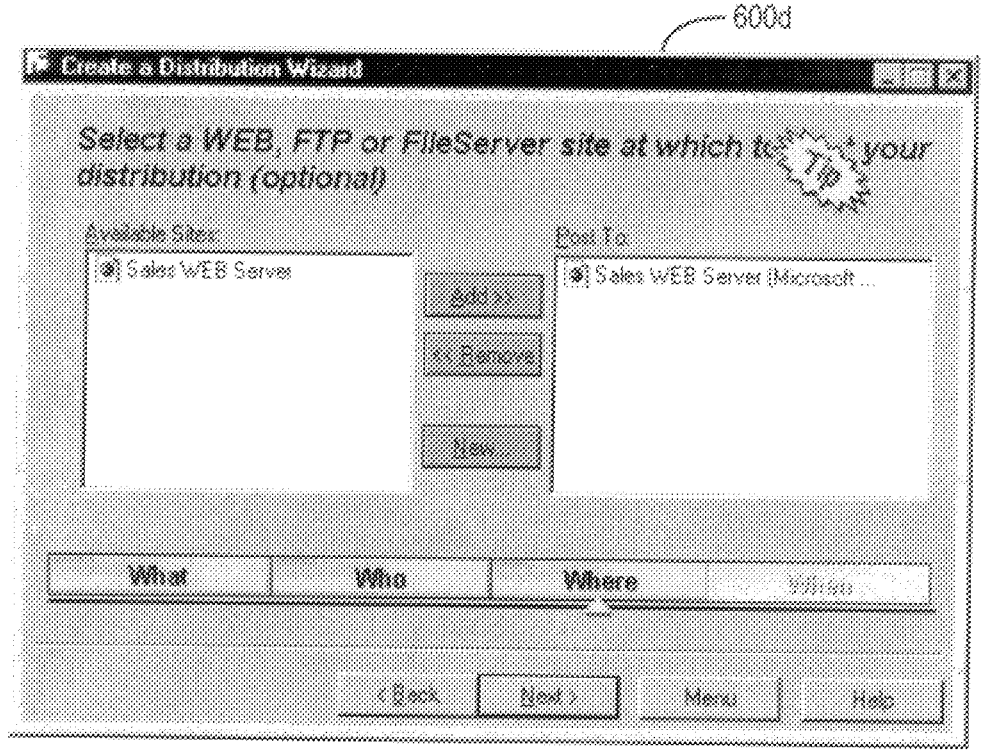
Figure 6E:
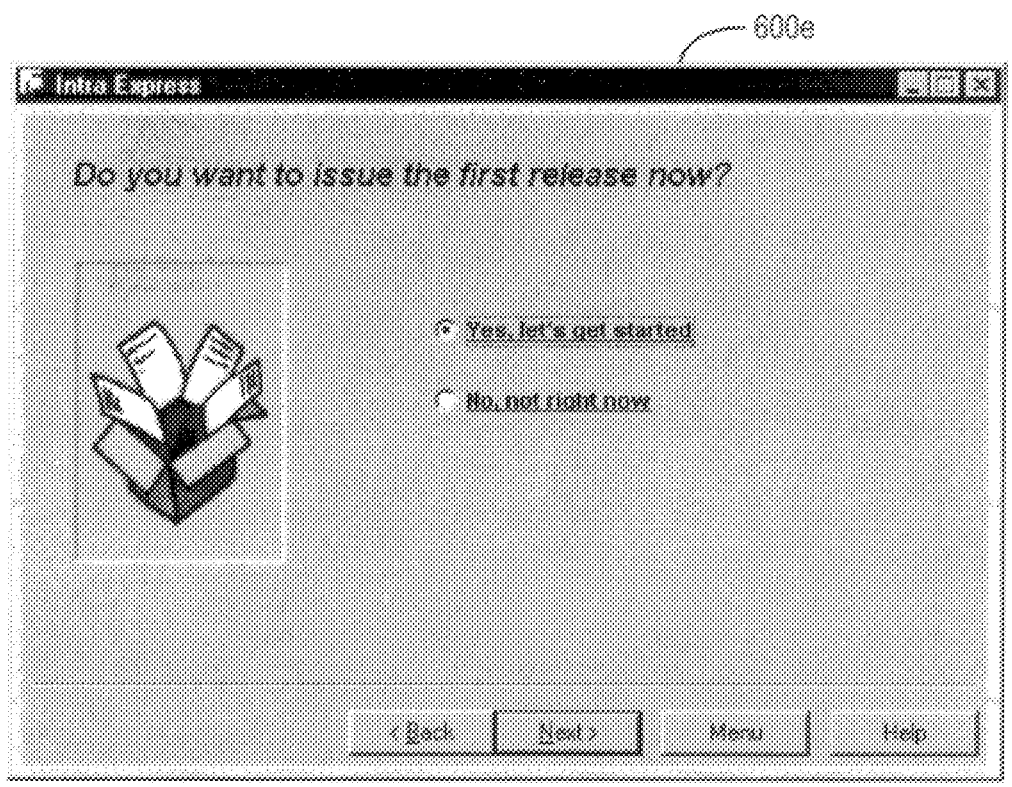

FIG. 6C illustrates user input for defining a Web posting site. Dialog 600c is displayed in response to user selection of "Web site" from dialog 600b. Dialog 600c includes edit fields for defining a Web server, including specifying a URL (Universal Resource Locator) address where recipients can access the distribution. FIG. 6D shows successful completion of adding the new web server, as indicated by dialog 600d. The distributor user is given the opportunity at this point to proceed with issuing a distribution immediately, as indicated by dialog 600e in FIG. 6E.

Figure 7A:
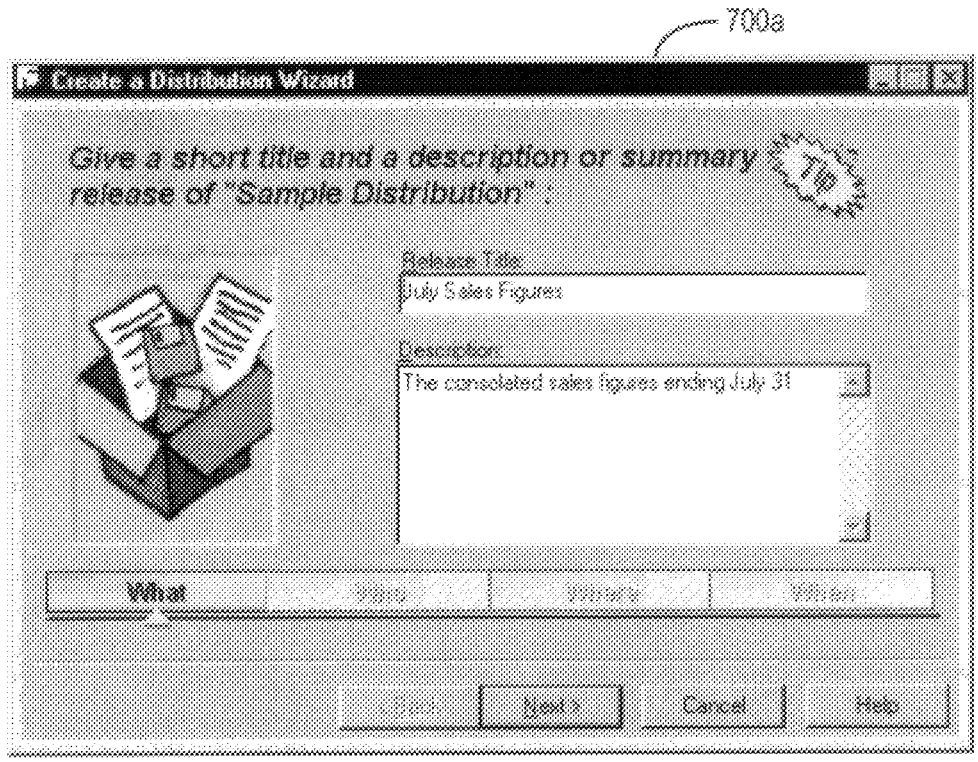
FIGS. 7A and 7B are bitmap screenshots illustrating "Wizard" dialogs of the system for assisting the user with the task of inputing information during specification of a New Distribution, for providing a short title and description or summary for the then-current release and for selecting a particular object for distribution as the current release.
Figure 7B:
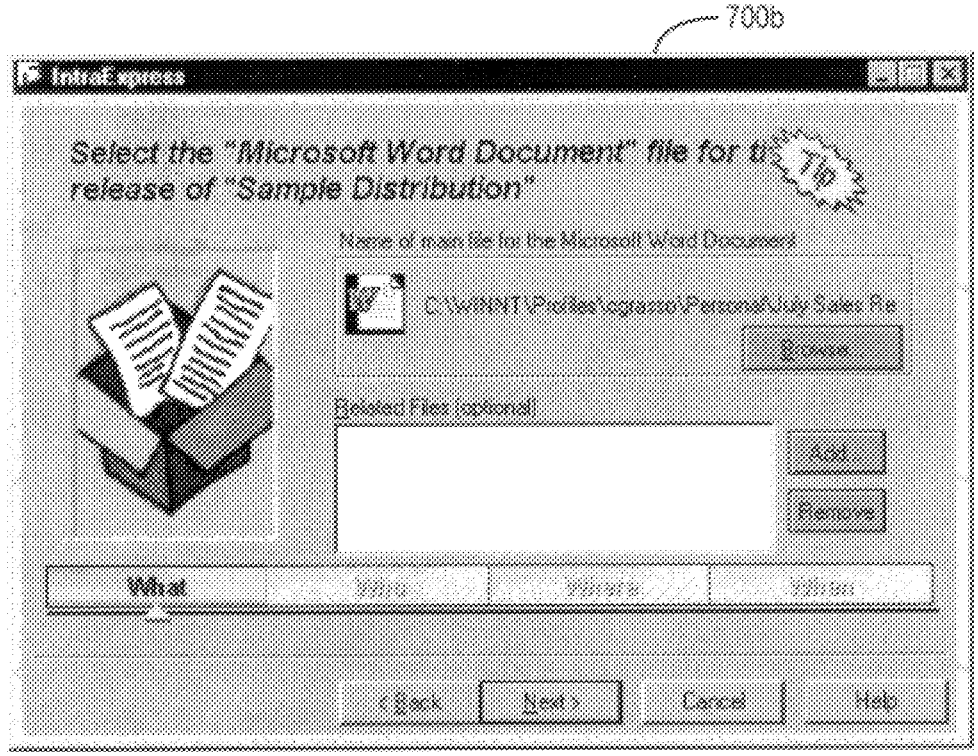

The distributor user can provide a short title and description or summary for the then-current release, as illustrated by Wizard dialog 700a in FIG. 7A. In the present example, the user has entitled the current release, "July Sales Figures." Now at this point, the distributor user is ready to select a particular object for distribution as the current release, as illustrated by Wizard dialog 700b in FIG. 7B. Since the user has previously indicated that the object to be distributed is a Microsoft Word document, the dialog will by default provide browsing for Microsoft Word documents (i.e., files ending with the extension ".doc"). Further at this point, the user can add other objects to the distribution as indicated by related files edit field 705. For a Microsoft Word document, for instance, a typical related file is a Microsoft Word template; such a template could easily be attached to the distribution at this point. After specifying at least one object for the release, the user is now ready to proceed to the next step by clicking the next button of dialog 700b.

d. "When"

Figure 8A:
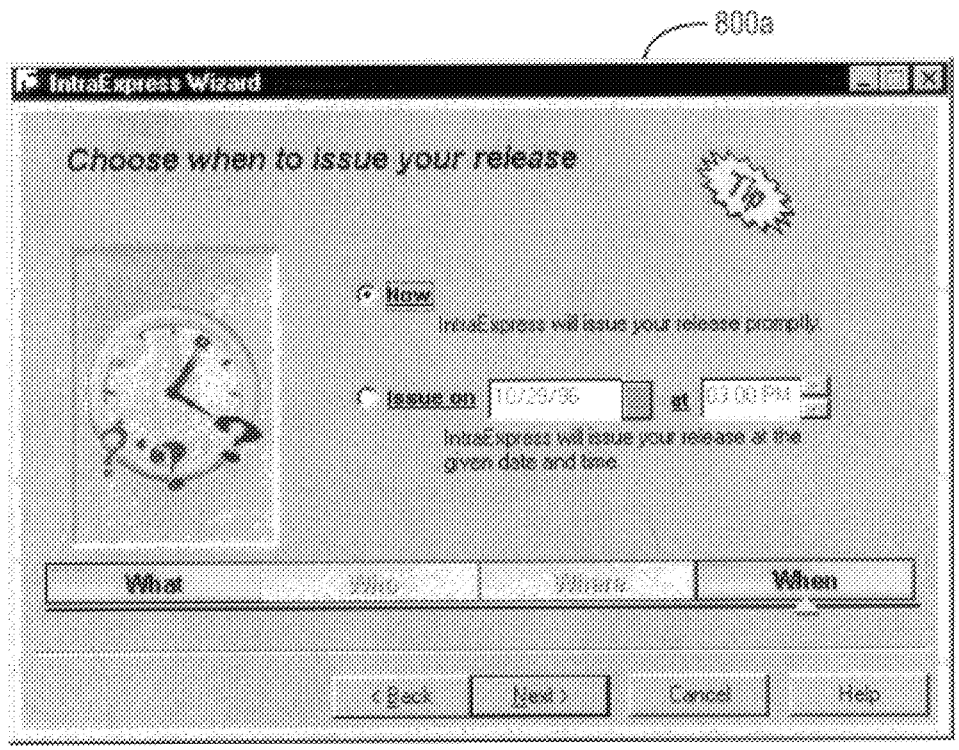
FIG. 8A is a bitmap screenshot illustrating a "Wizard" dialog of the system for assisting the user with the task of inputing information during specification of a New distribution, for indicating "when" a distribution release is to be issued.
Figure 8B:
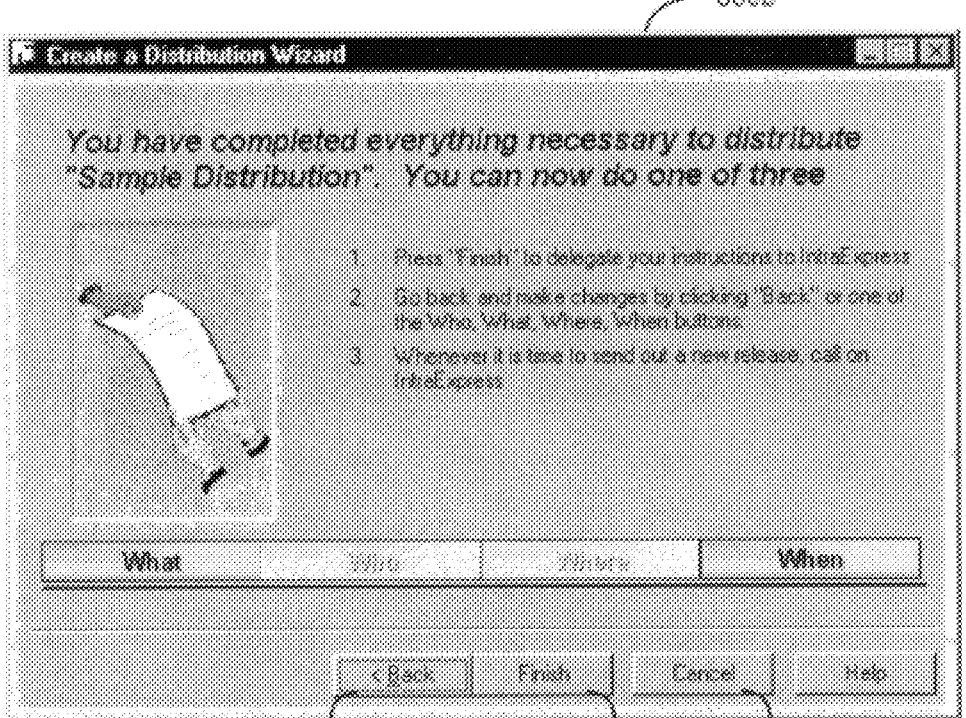
FIG. 8B is a bitmap screenshot illustrating a "Wizard" dialog of the system comfirming successful input of information for specifying a New Distribution.

The distributor user is now ready to chose "when" to issue the release, as indicated by Wizard dialog 800a in FIG. 8A. The user can chose to issue the release now or at a given date and time, as indicated in the Wizard dialog 800a. After the user has specified "when" to issue the release, he or she clicks the Next button of the dialog. The system, in response, displays Wizard dialog 800b in FIG. 8B, for indicating that the user has completed entry of all information necessary for carrying out the distribution. Also at this point, the user can delegate these instructions to the system by selecting Finish button 805. Alternatively, the user can back-track over the various Wizard dialogs, by selecting Back button 809. Finally, the user can simply cancel the instructions, by selecting Cancel button 807. For the present example, the user selects "Finish." Accordingly, the distributor user has completed entry of all information necessary for creating the distribution and sending out the first release.

3. New Release

Figure 9A:
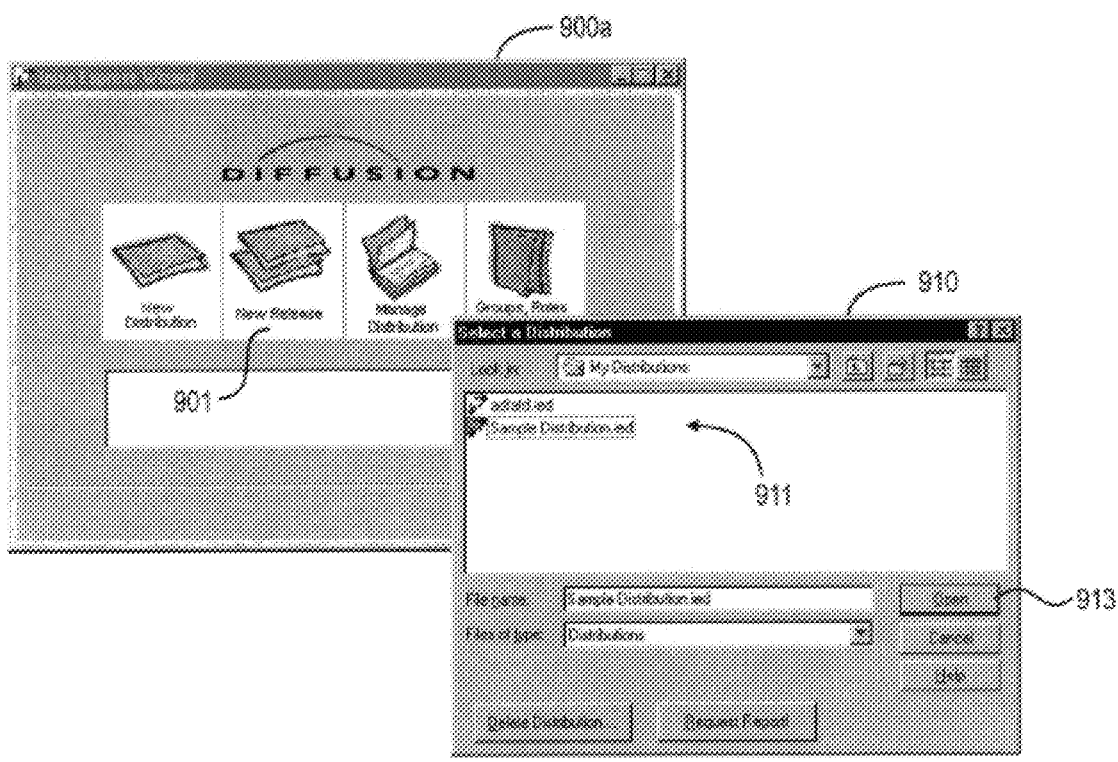
FIGS. 9A and 9B are bitmap screenshots illustrating "Wizard" dialogs of the system for assisting the user with the tasks of inputing information for issuing new releases of a distribution.
Figure 9B:
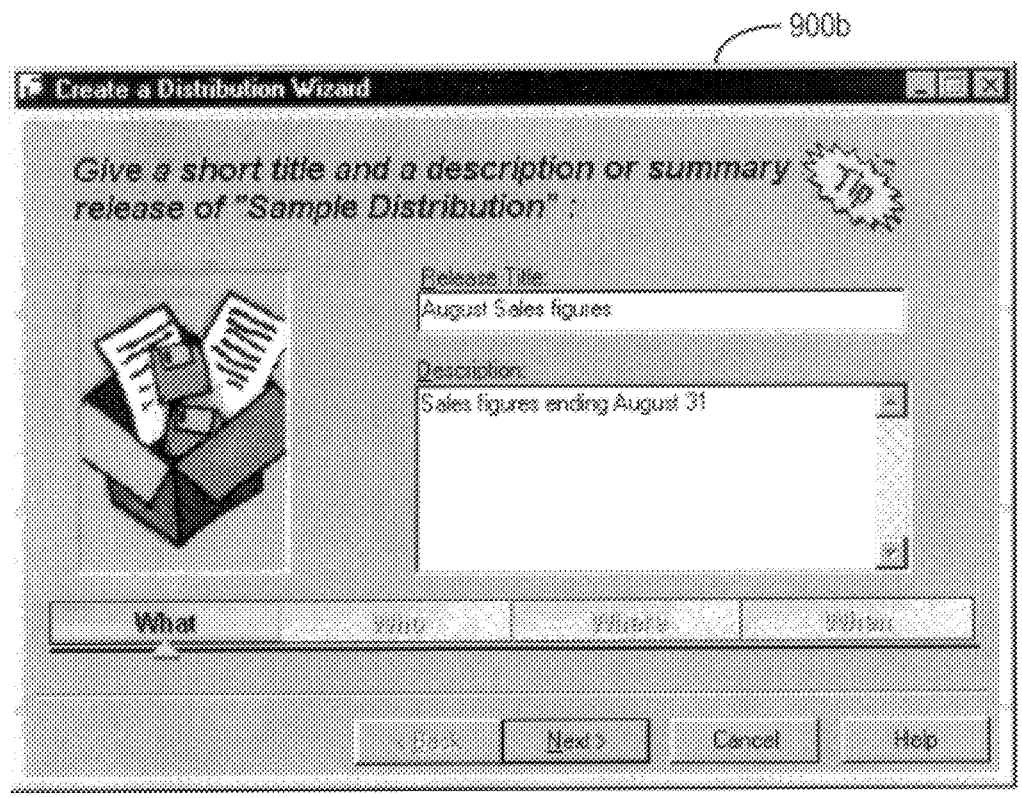

When desired, the distributor user can easily issue new releases of the distribution. The user selects "New Release" option 901 from the main Wizard dialog, shown as dialog 900a in FIG. 9A. In response, the system displays Distribution Selection Wizard dialog 910. This dialog allows the user to select from the user's existing distributions, for choosing a particular distribution for which a new release is to be issued. As shown at 911, the "Sample" distribution (created for the example above) is shown selected. Upon the user selecting Open button 913, the system displays Distribution Creation Wizard dialog 900b, as shown in FIG. 9B. In a manner similar to that shown for the initial distribution (in FIG. 4B), the distributor user can provide a release title (e.g., "August Sales Figures") and a description, for the new release which is to be issued.

B. Management

1. Managing Distribution

Figure 10A:
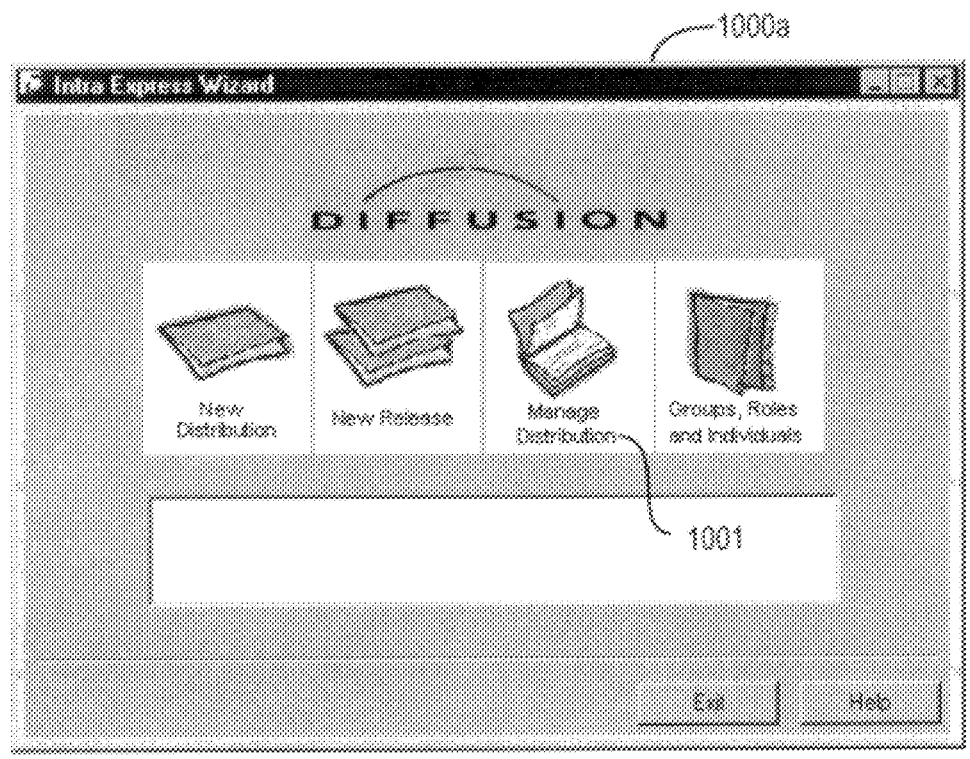
FIGS. 10A and 10B are bitmap screenshots illustrating "Wizard" dialogs of the system for assisting the user with the tasks of inputing information for managing distributions.
Figure 10B:
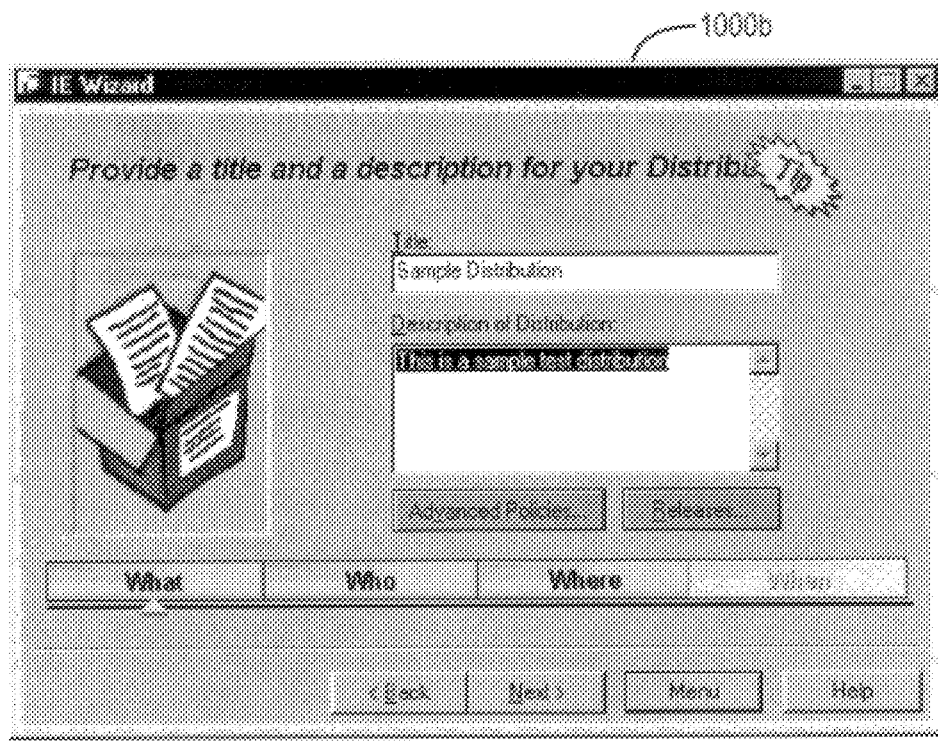

To manage a distribution, the distributor user selects the Manage Distribution option 1001 from the main Wizard dialog, shown as dialog 1000a in FIG. 10A. Now, the user can modify the information which defines the distribution. As shown by Wizard dialog 1000b in FIG. 10B, for instance, the user can edit the title and description for the distribution.

2. Managing Profile and Managing Information

Figure 11A:
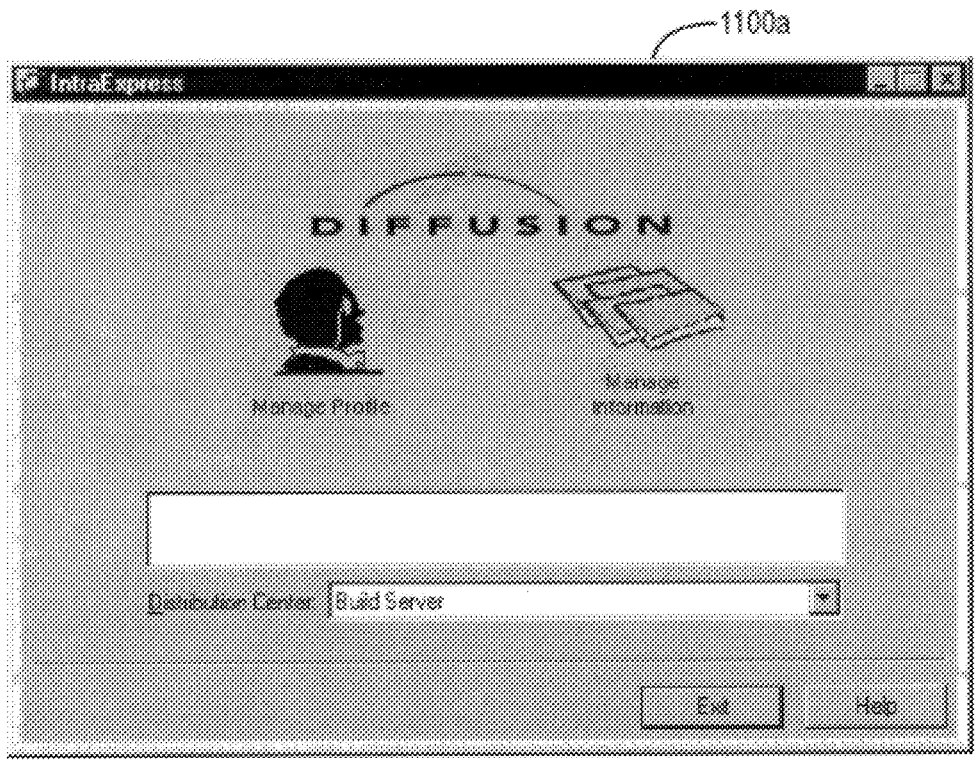
FIGS. 11A, 11B, 11C, 11D, 11E, 11F, 11G, 11H, and 11I are bitmap screenshots illustrating "Wizard" dialogs of the system for assisting the user with the tasks of inputing information for managing a user's profile.

As shown by the Wizard dialog 1100a in FIG. 11A, the system allows the user to manage the user's profile and manage information. The user's profile includes, for instance, information about addresses known to the user. Managed information, on the other hand, includes information which has been made available to the user. Each will be described in further detail by examining operation of the Wizard.

Figure 11B:
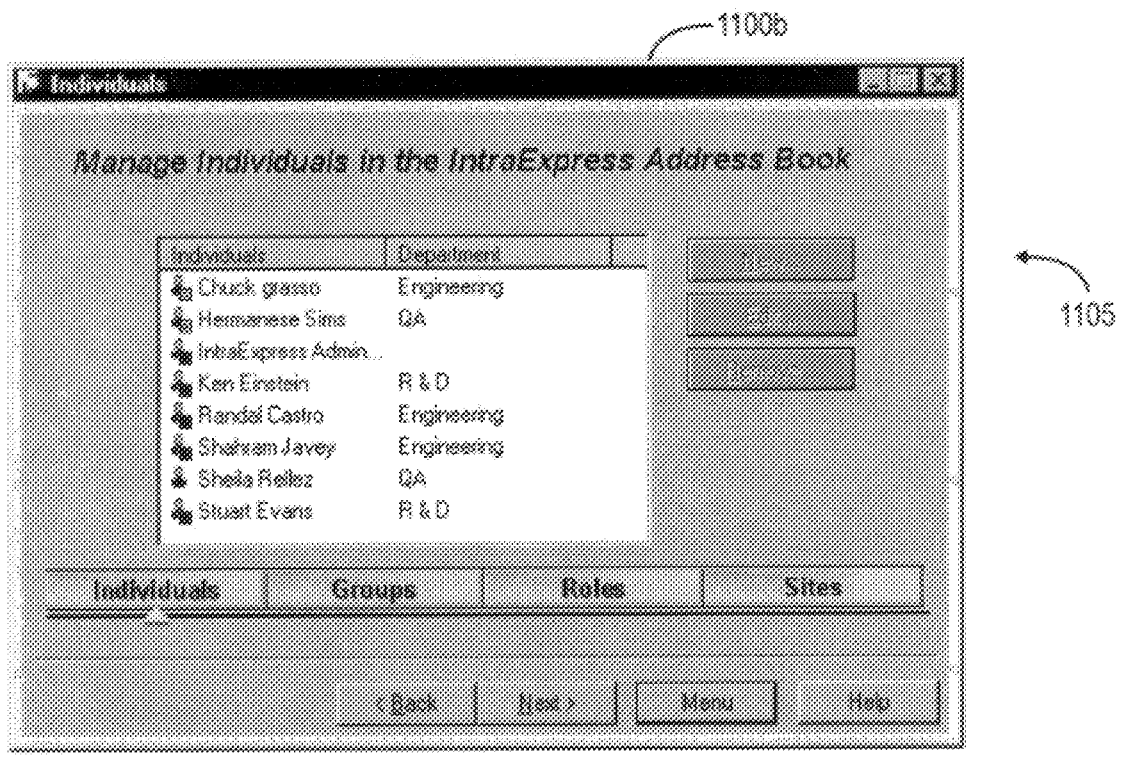
Figure 11C:
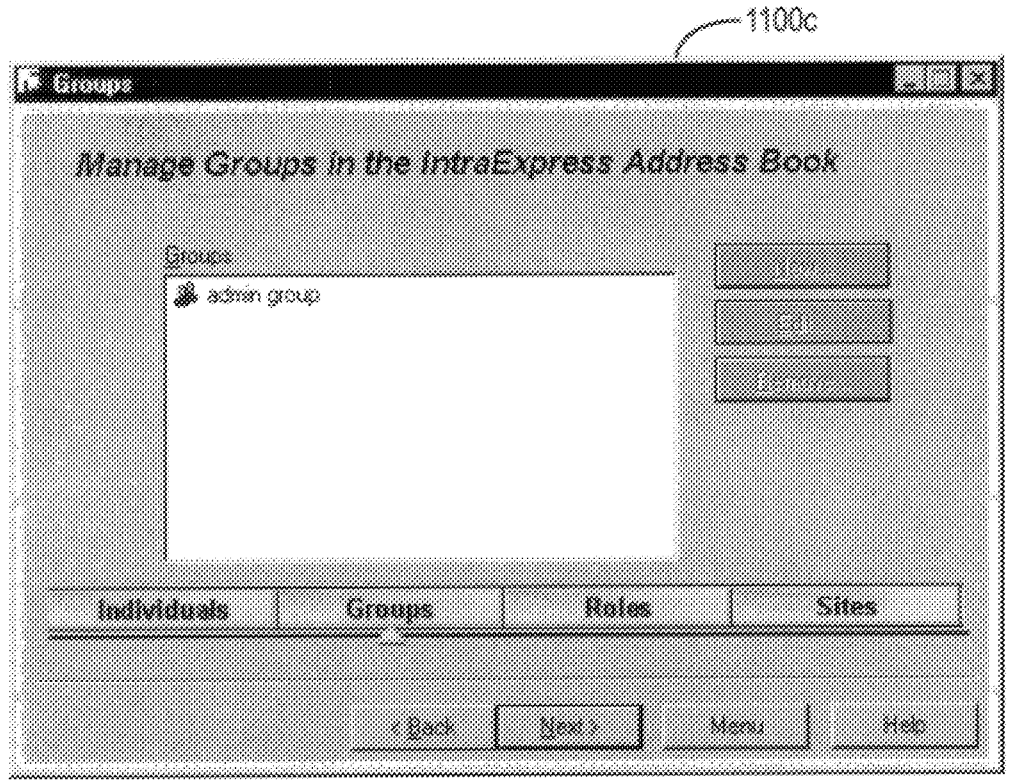
Figure 11D:
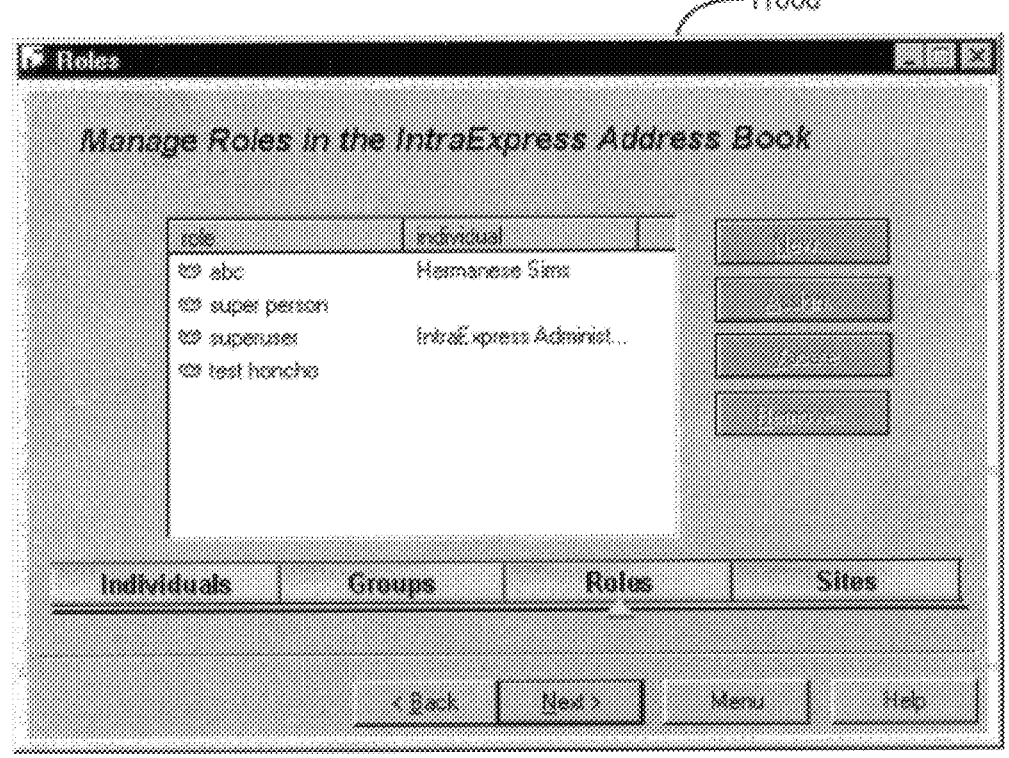
Figure 11E:
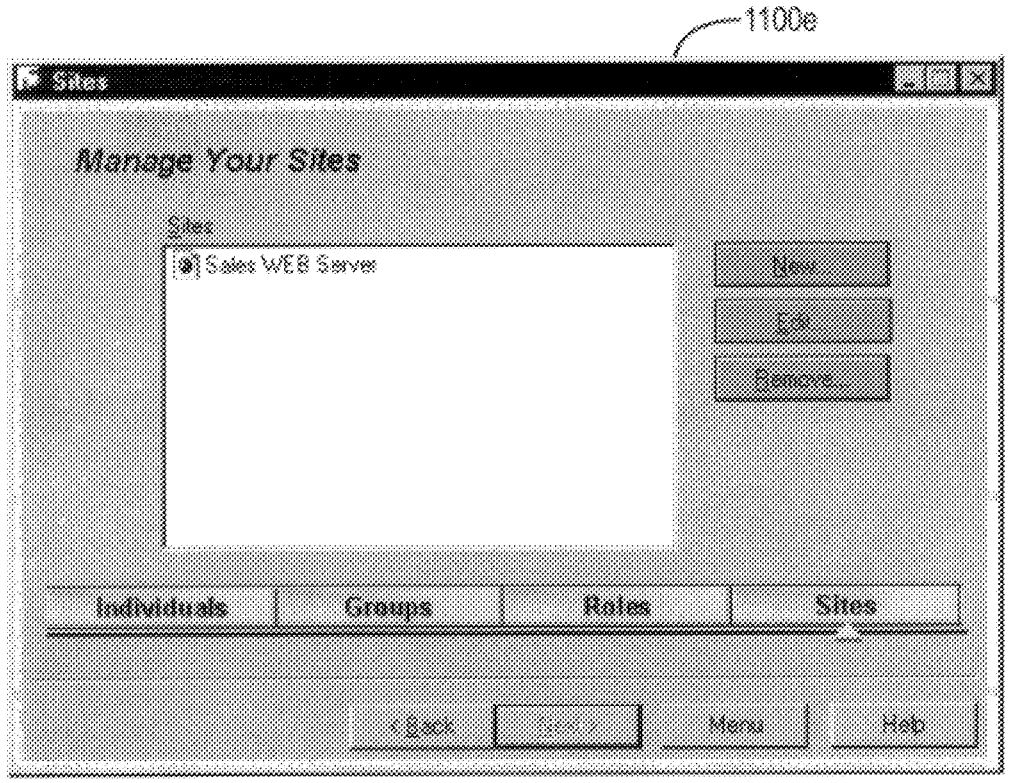

As shown by Wizard dialog 1100b in FIG. 11B, the user can easily manage profile information about individuals, groups, roles, and sites in the user's address book. Selection buttons 1105 allow the user to add, modify, and/or remove addresses, as desired. Similar Wizard dialogs are provided for managing groups (e.g., Wizard dialog 1100c in FIG. 11C), managing roles (e.g., Wizard dialog 1100d in FIG. 11D), and managing sites (e.g., Wizard dialog 1100c in FIG. 11E).

Figure 11F:
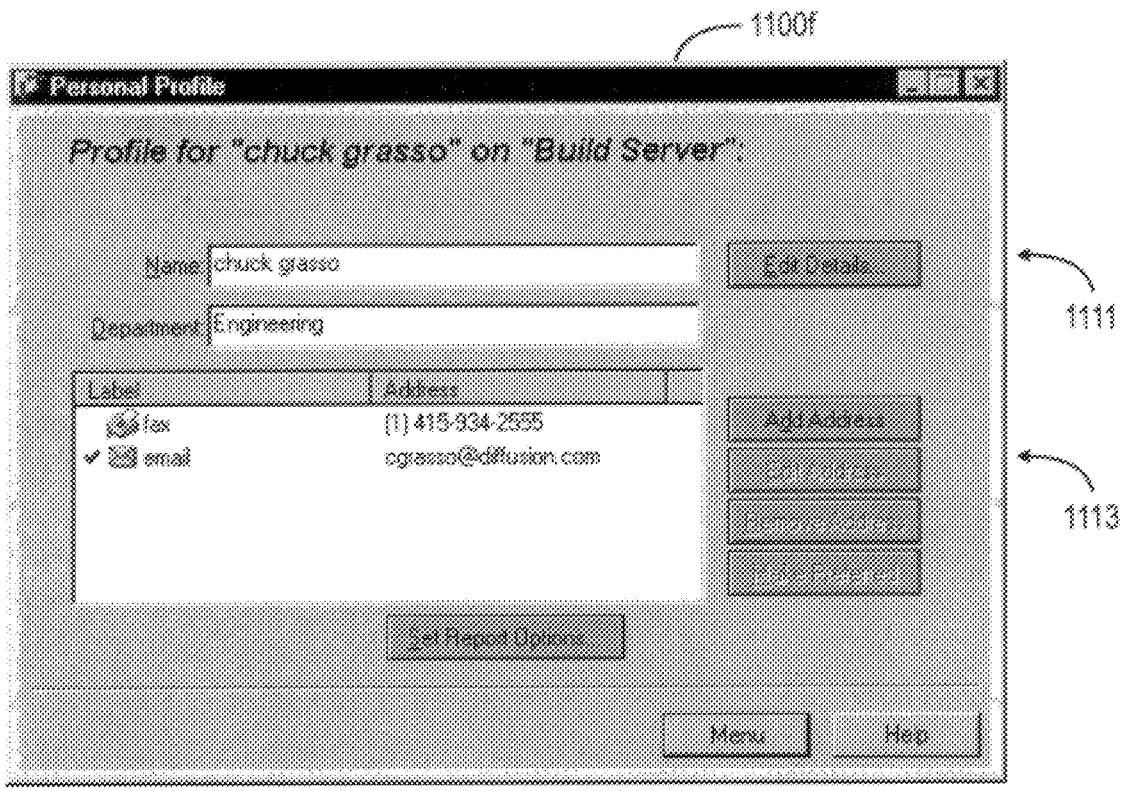

Upon the user selecting to edit a profile item, the system displays a more detailed dialog. For instance, Personal Profile Wizard dialog 1100f, shown in FIG. 11F, is displayed for editing personal profile information about a particular individual. Here, the user can edit details (e.g., name and department) about a particular individual, by selecting Edit Detail button 1111. Additionally, the user can also add, modify, and/or remove addresses (e.g., e-mail address) for a given individual, using selection buttons 1113. If multiple addresses are available for an individual, the user can select a particular address as that individual's preferred address.

Figure 11G:
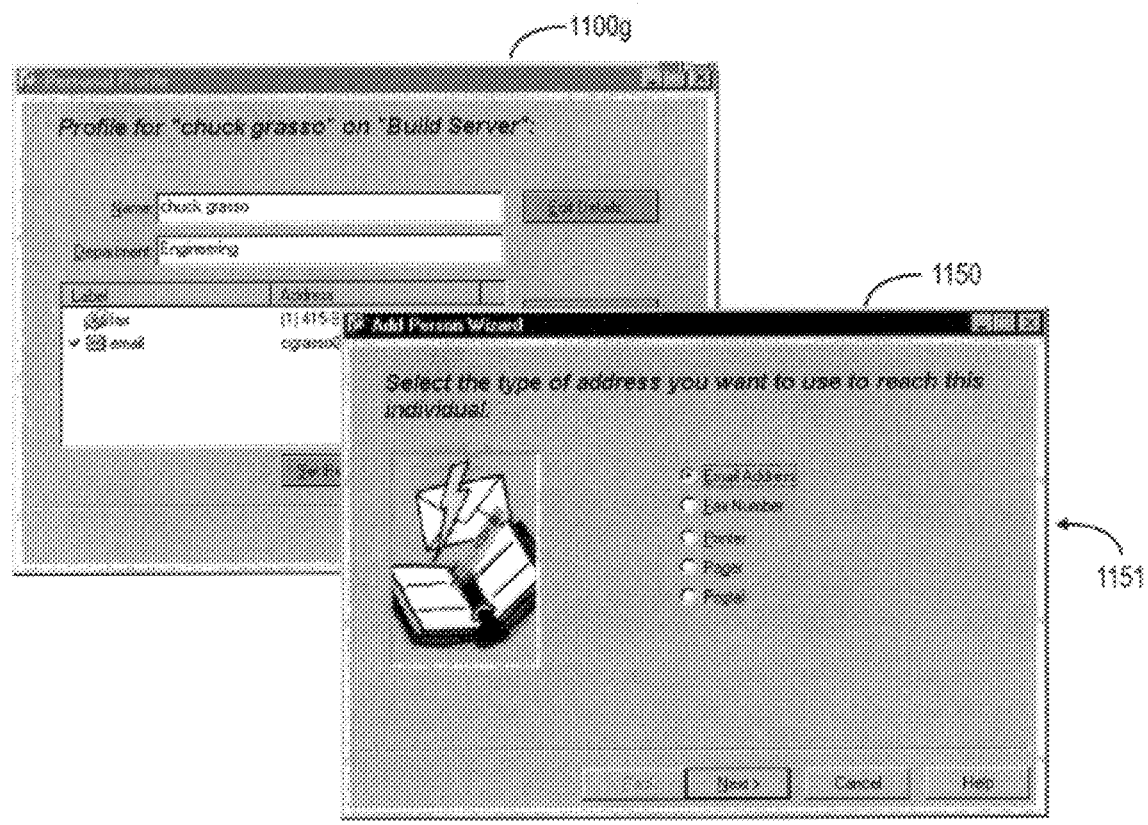
Figure 11H:
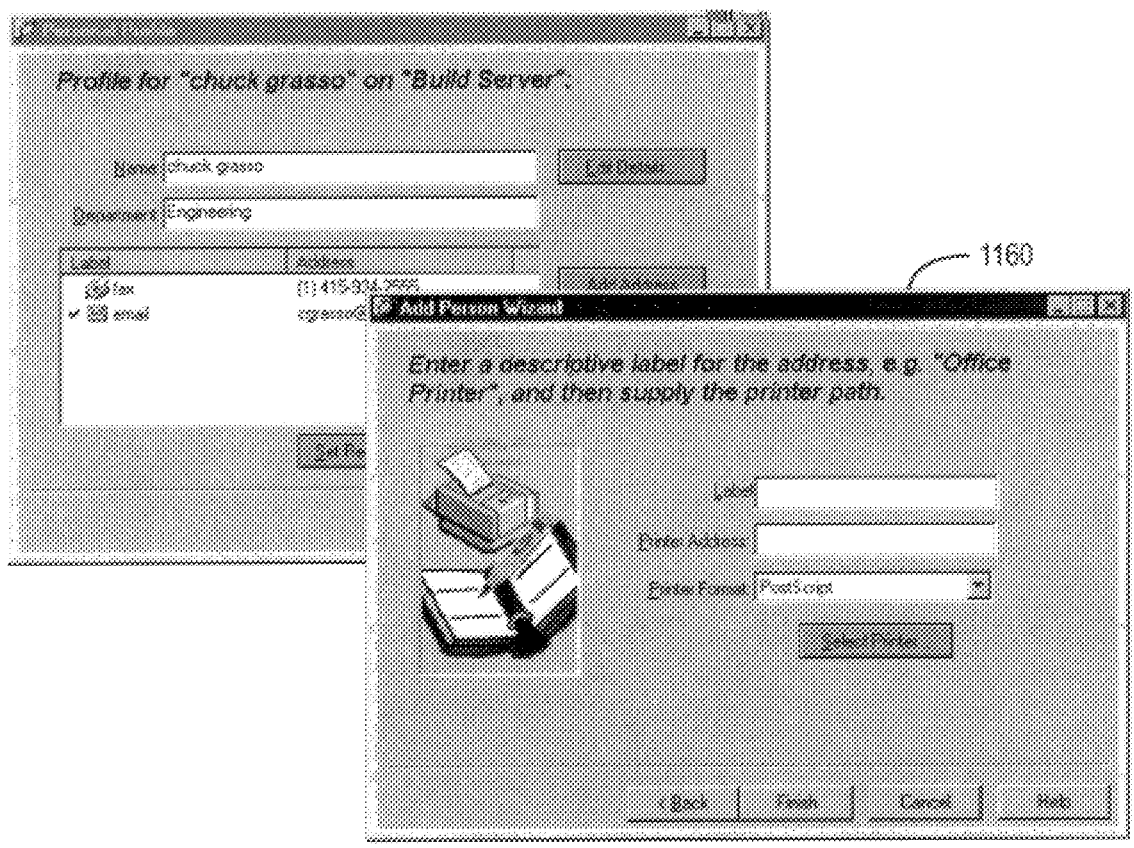
Figure 11I:
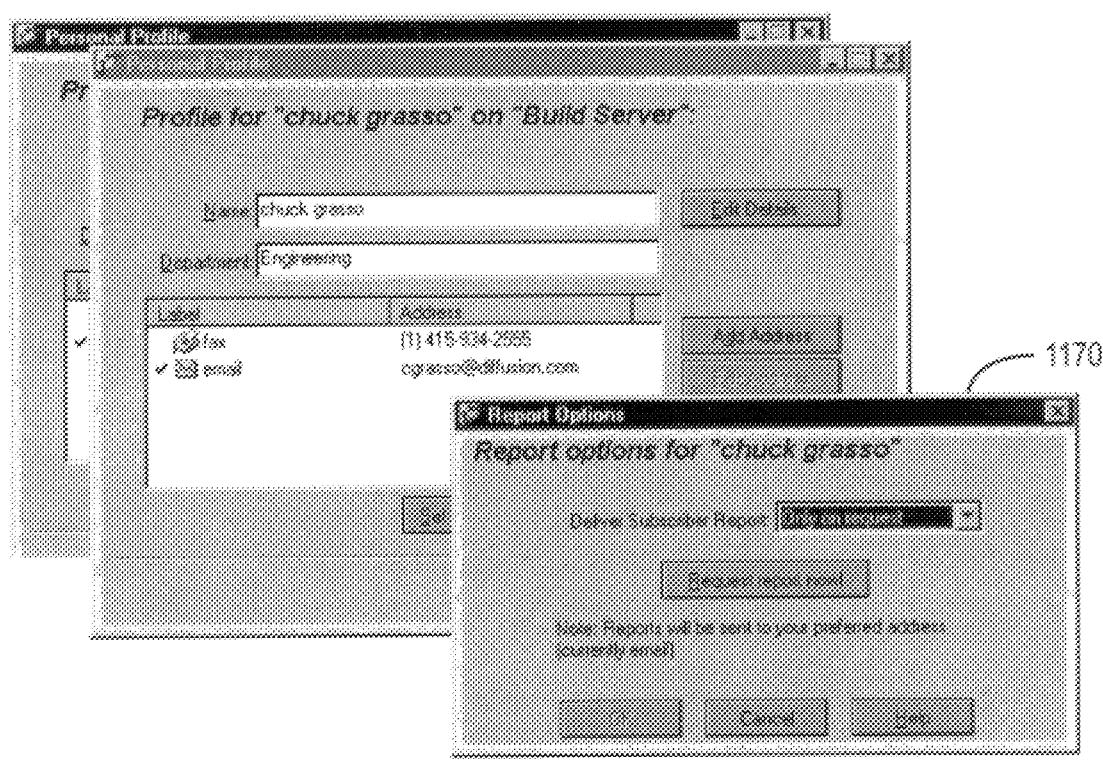

FIG. 11G illustrates use of the Wizard for entering an address. In response to a user request at the Personal Profile Wizard dialog (now shown at 1100g) to enter a new address, the system displays Address Type dialog 1150. Here, the user selects a type of address from several available types including, for instance, an e-mail address, a FAX number, a printer, a pager number, or a postal address. In response to the user selecting, for instance, "printer" from list 1151, the system displays an input dialog for the particular type, such as input dialog 1160 shown in FIG. 11H. Alternatively at this point, the user can specify report options for the individual, such as by entering information in Report Options dialog 1170 shown in FIG. 11I. The report option allows the distributor user to specify when subscriber reports are delivered, for reporting information about the subscriber currently being edited.

Figure 12A:
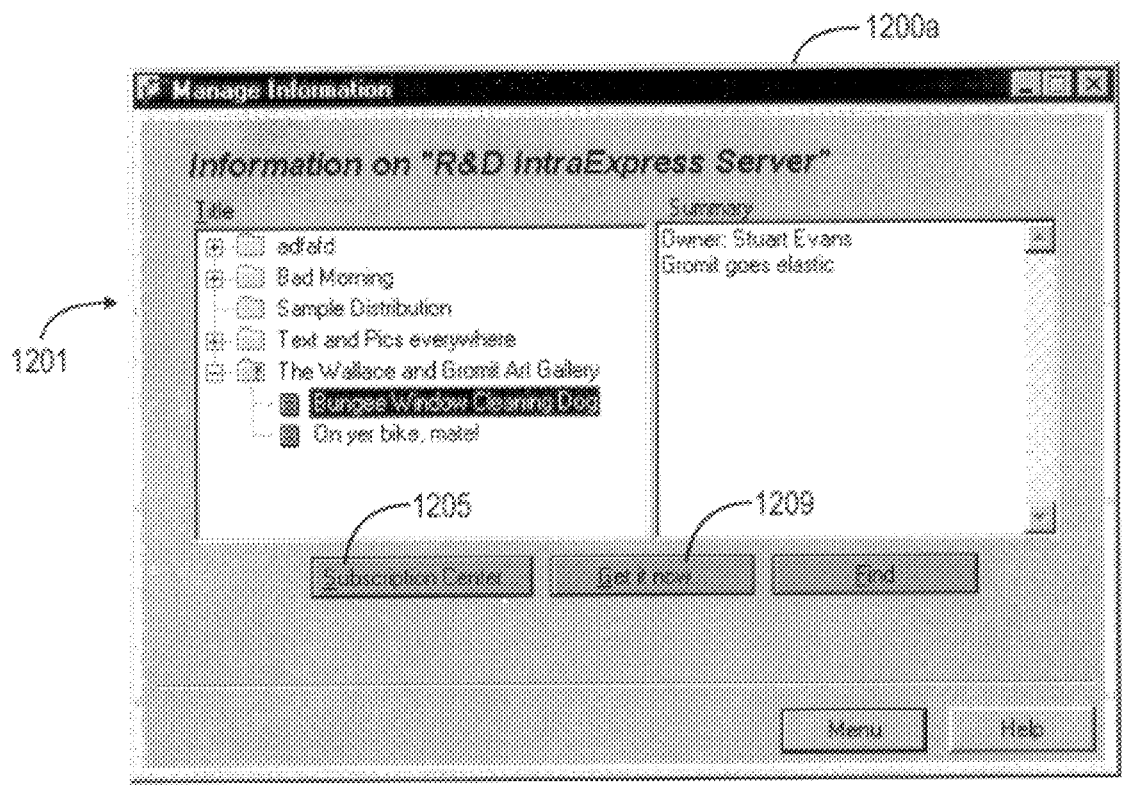
FIGS. 12A, 12B, 12C, 12D, 12E, 12F, 12G and 12H are bitmap screenshots illustrating "Wizard" dialogs of the system for assisting the user with the tasks of inputing information for managing information made available to the user.
Figure 12B:
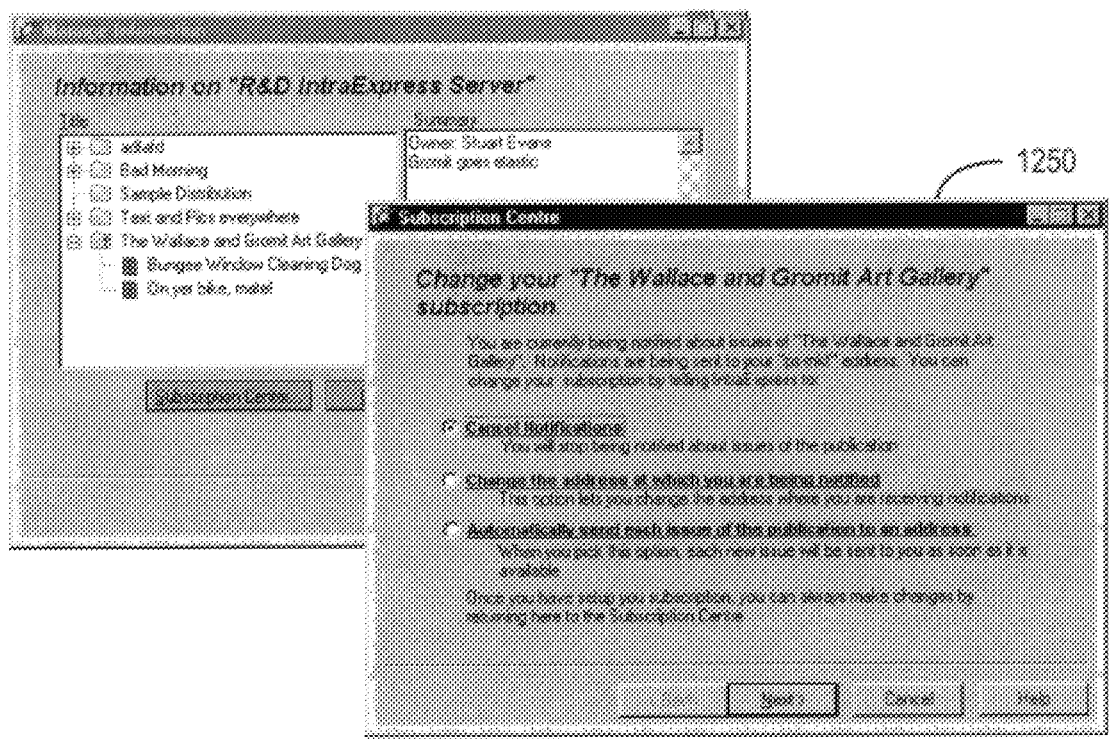

If, on the other hand, the user selects "Manage Information" from Wizard dialog 1100a, the system displays managed information dialog 1200a, as shown in FIG. 12A. This dialog shows all the information available to the user. In an exemplary embodiment, the information is presented as a hierarchical (outline) list 1201. Upon selecting Subscription Center button 1205 from Wizard dialog 1200a, the user can edit subscription information. Specifically, in response to user selection of button 1205, the system displays Subscription Center dialog 1250, as shown in FIG. 12B. The user can modify a current subscription, as well as starting a new subscription or stopping an existing subscription. In an exemplary embodiment, the Subscription Center dialog is context sensitive. For the current example, the selected distribution is one in which the user is already being notified. Accordingly, the Subscription Center dialog 1250 include context-sensitive choices of "cancel notifications," "change the address at which the user is being notified," and "automatically sending each issue as soon as it is available."

Figure 12C:
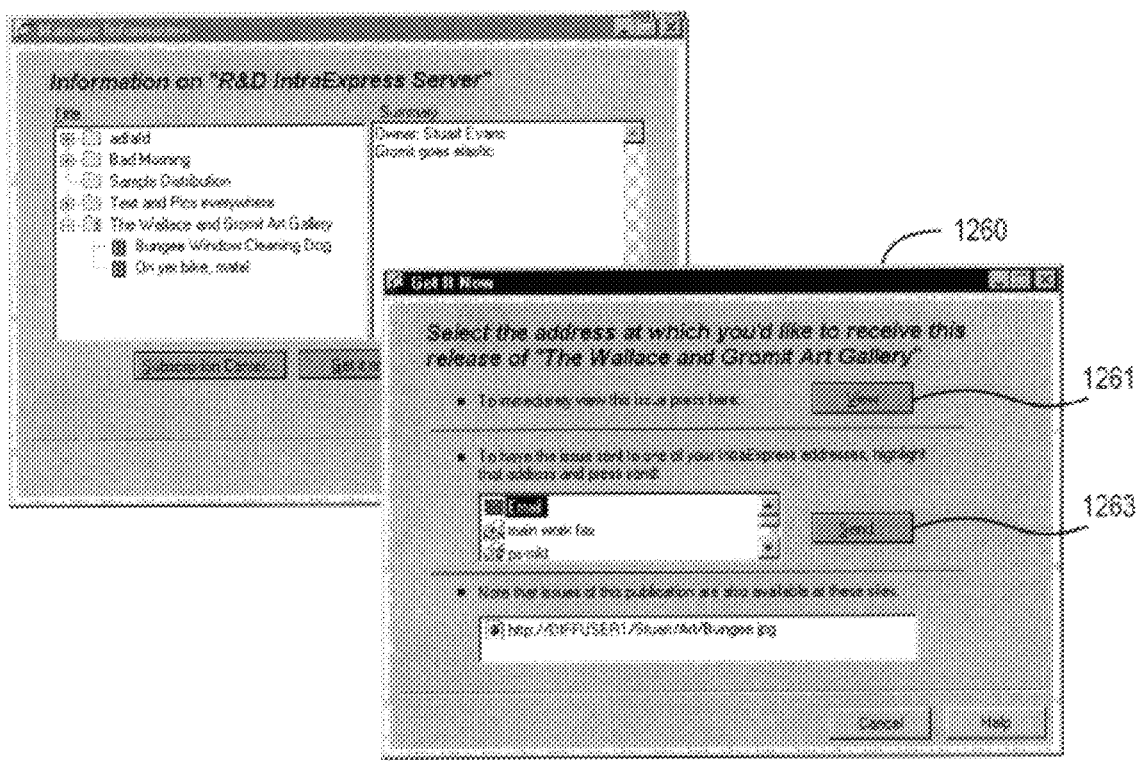
Figure 12D:
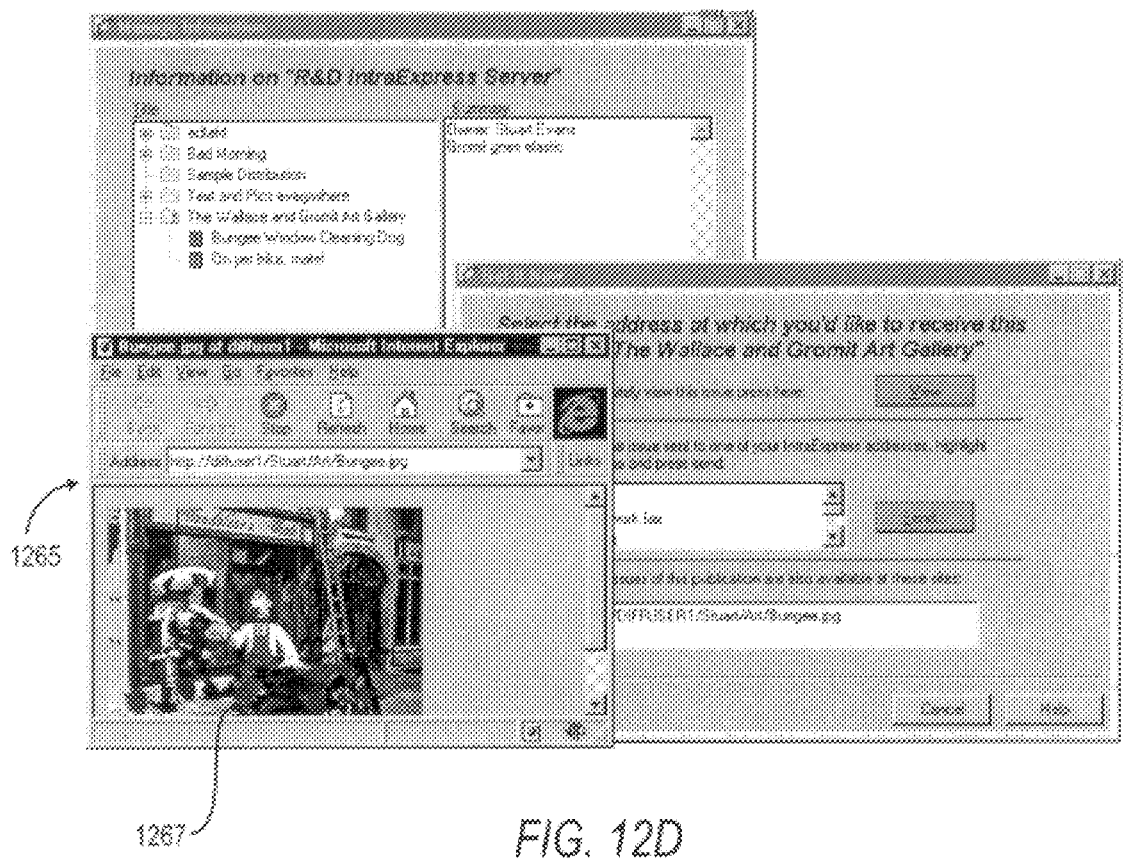

If, on the other hand, the user selects "Get it now" button 1209 from Wizard dialog 1200a (FIG. 12A), the system displays "Get it now" dialog 1260, as shown in FIG. 12C. Upon the user selecting View Button 1261 from the dialog 1260, the system invokes a browser for allowing the user to immediately view the object(s) (i.e., release). For the example at hand, for instance, selecting View button 1261 causes the system to launch a Web or HTML (Hypertext Mark-up Language) browser (e.g., Microsoft Internet Explorer) for viewing the object, such as browser 1265 for viewing distribution object 1267 (e.g., an image file).

Figure 12E:
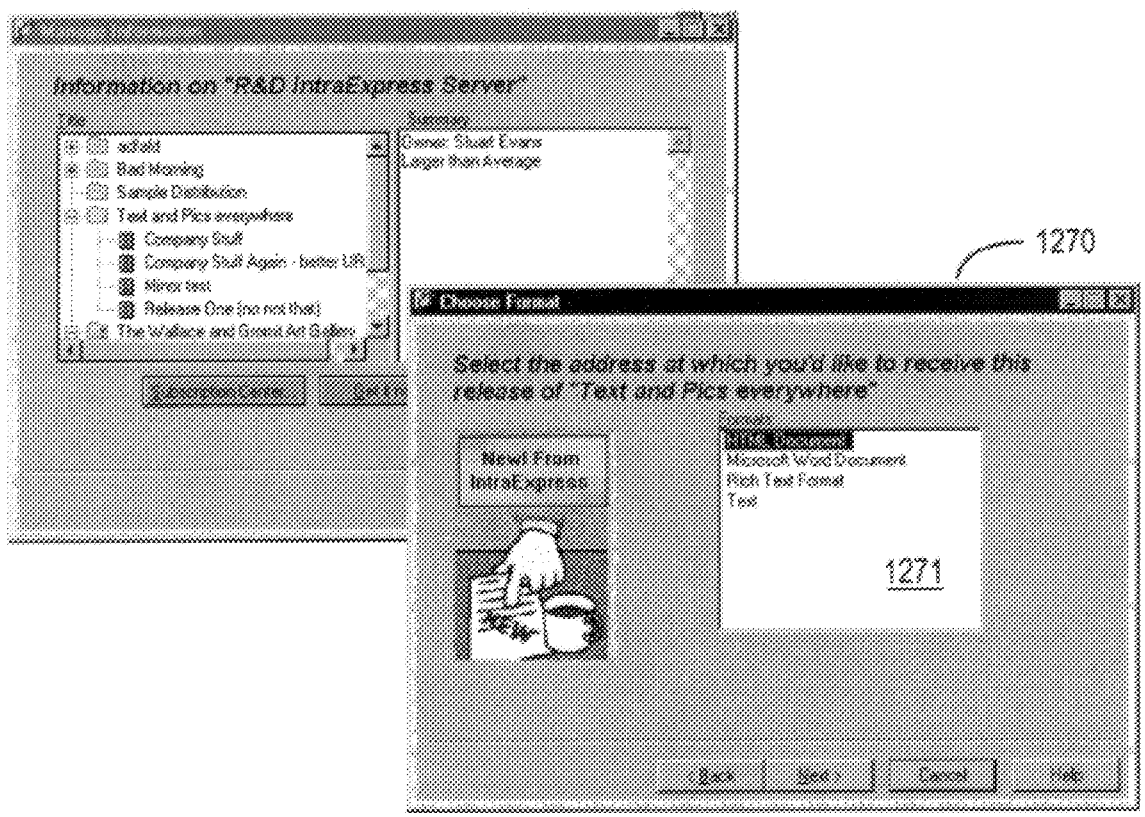
Figure 12F:
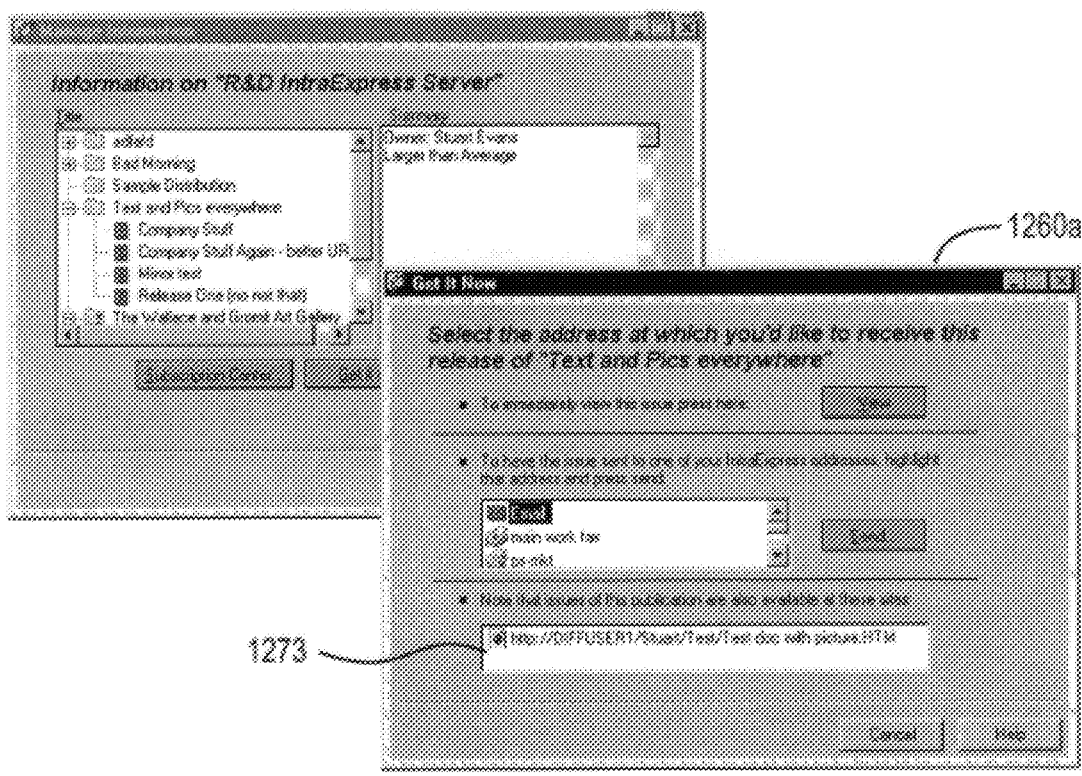

If, on the other hand, the user selects Send button 1263 (from dialog 1260 in FIG. 12C), the system displays Choose Format dialog 1270, as shown in FIG. 12E. Here, the user can select from a list of formats 1271, for receiving the release of the objects. As illustrated by FIG. 12F, if the user selects, for instance, "HTML document" from list 1271, the dialog 1260 (now 1260a) is updated at field 1273 for indicating that the release is now available in the newly-specified format.

Figure 12G:
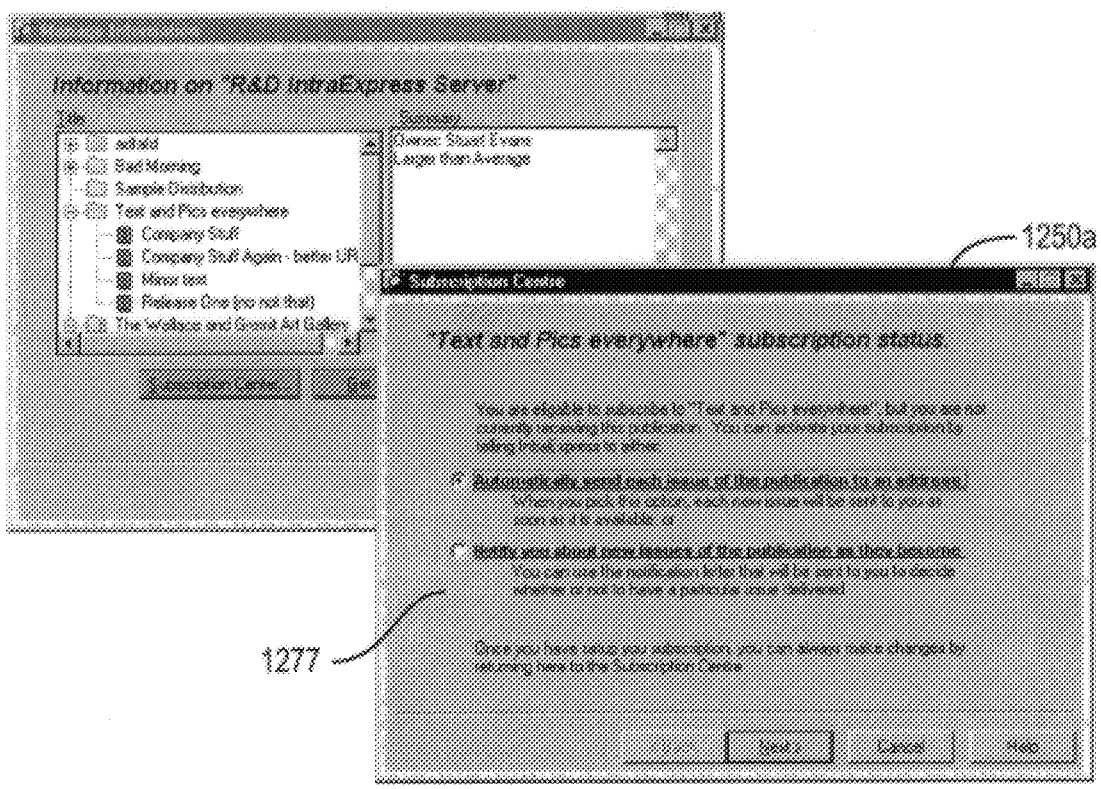
Figure 12H:
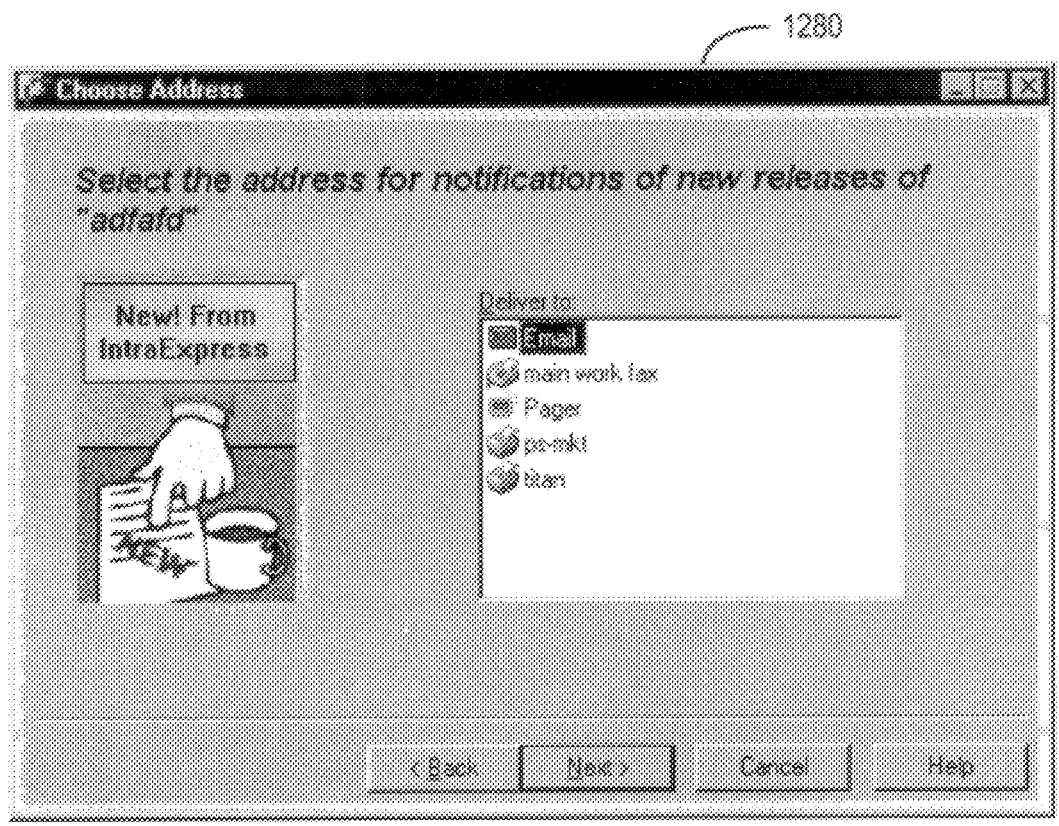

Alternatively, the user can configure how he or she desires to receive the publication, using the Subscription Center. As shown in FIG. 12G for Subscription Center dialog 1250a (in contrast to Subscription Center dialog 1250 in FIG. 12B), for an object which the user has yet to subscribe to, the Subscription Center dialog displays choices allowing the user to either (1) have each issue of the publication automatically sent to an address or (2) notify the user about new issues of the publication as they become available. If the user selects Notify choice 1277 from the dialog 1250a, the system displays Address dialog 1280 as shown in FIG. 12H, for specifying an address to receive the notification. Note, in contrast to receipt of the object itself (which has a particular format), notifications can be sent to any address, including a pager, without regard to object format.

C. Offers and Notifications Received by Recipient

As previously described, "offers" and "notifications" are sent to various recipients of a distribution. Typically, distributions will be configured such that these are sent to recipients as e-mail messages (although such a configuration is not required). In a preferred environment, each such message includes an attachment or "mini-Wizard" which allows the recipient to interact with the system from within the context of his or her e-mail client (software)—that is, without having to launch the program (i.e., the IntraExpress client-side software).

Figure 13A:
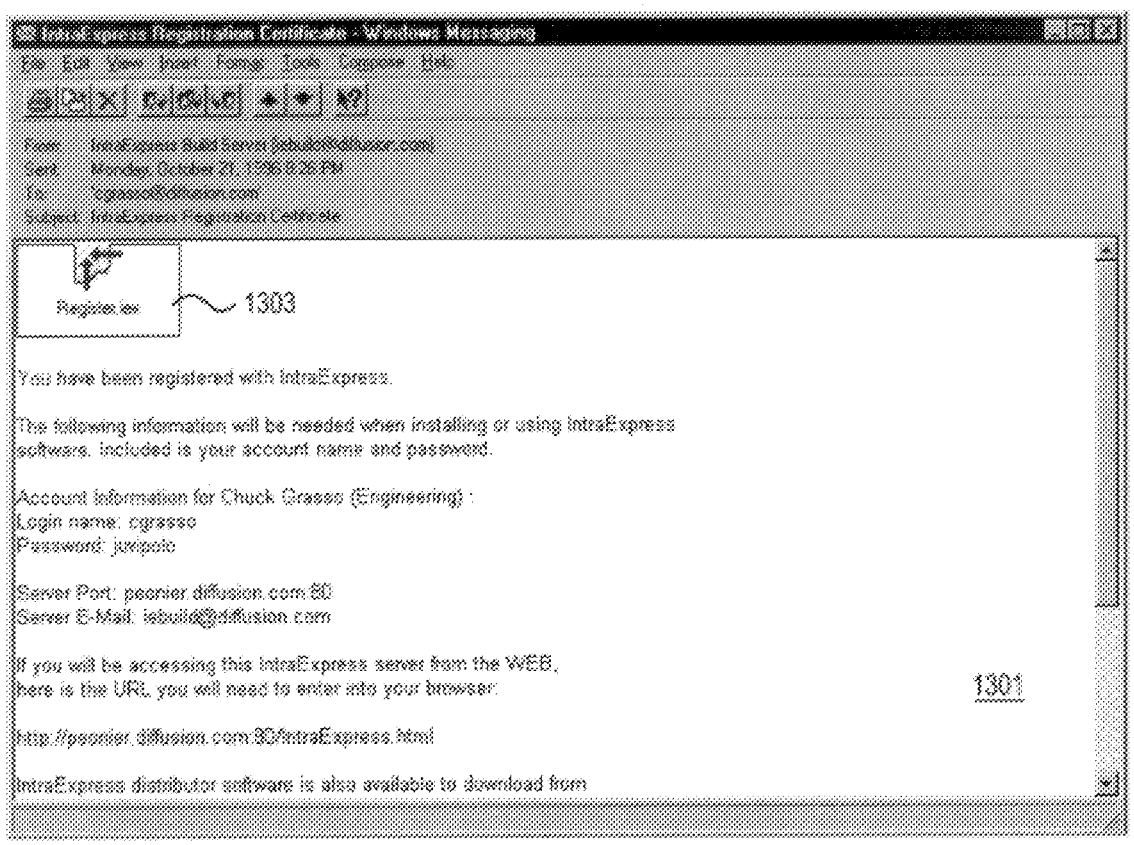
FIG. 13A is a bitmap screenshot illustrating an exemplary e-mail message which includes a "registration" message or certificate for registering a new user with the system.

If an intended recipient has not yet installed client-side software on his or her system, the first message the user will receive is a "registration" e-mail. As shown by registration message or certificate 1301 in FIG. 13A, for instance, the user is prompted to log on to a URL address, for downloading and installing client-side software. The recipient can complete this task manually by entering the appropriate URL address in his or her browser or, alternatively, complete the task automatically by launching a Java applet (appended as an attachment to the registration message, such as attachment 1303).

Figure 13B:
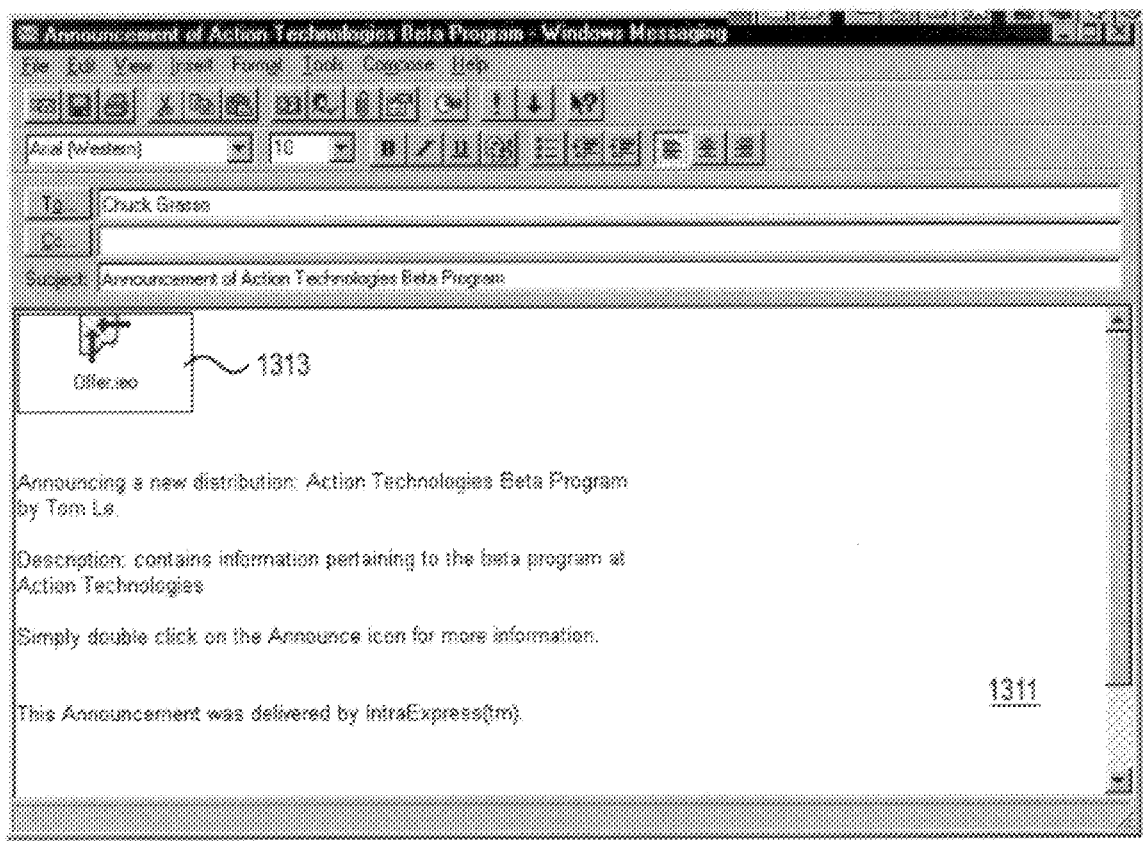
FIGS. 13B, 13C, 13D, 13E, 13F and 13G are bitmap screenshots illustrating an exemplary e-mail message and accompanying "Wizard" dialogs for receiving and accepting an "offer."
Figure 13C:
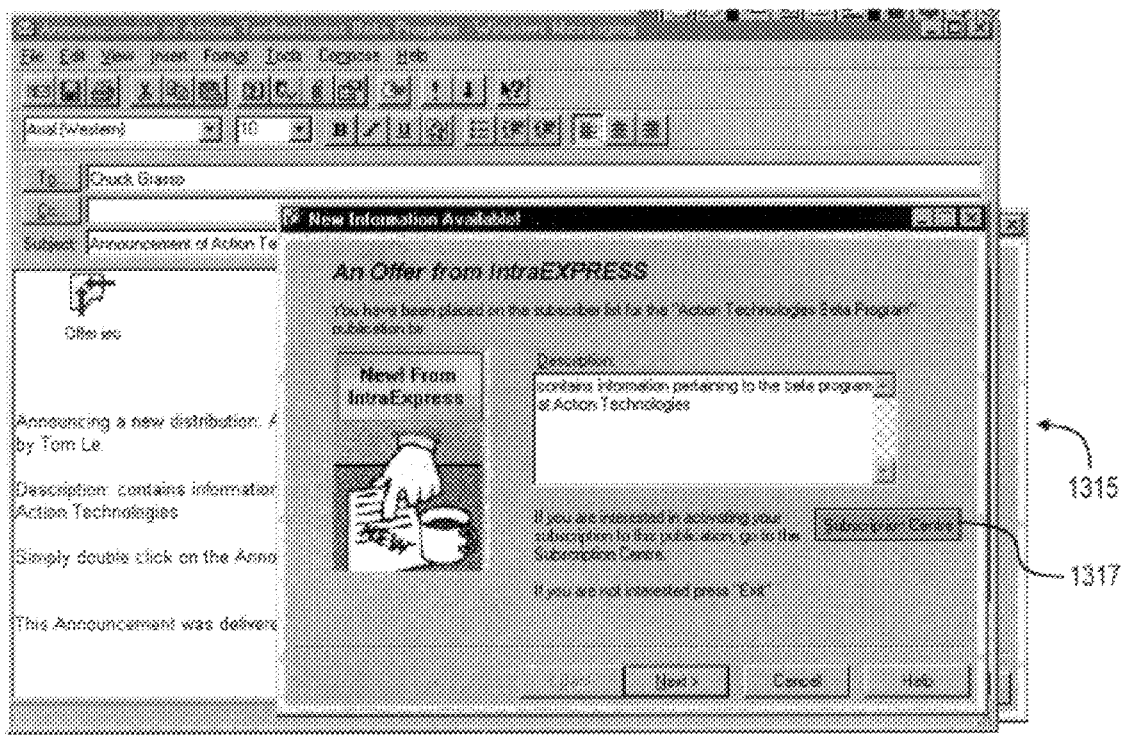
Figure 13D:
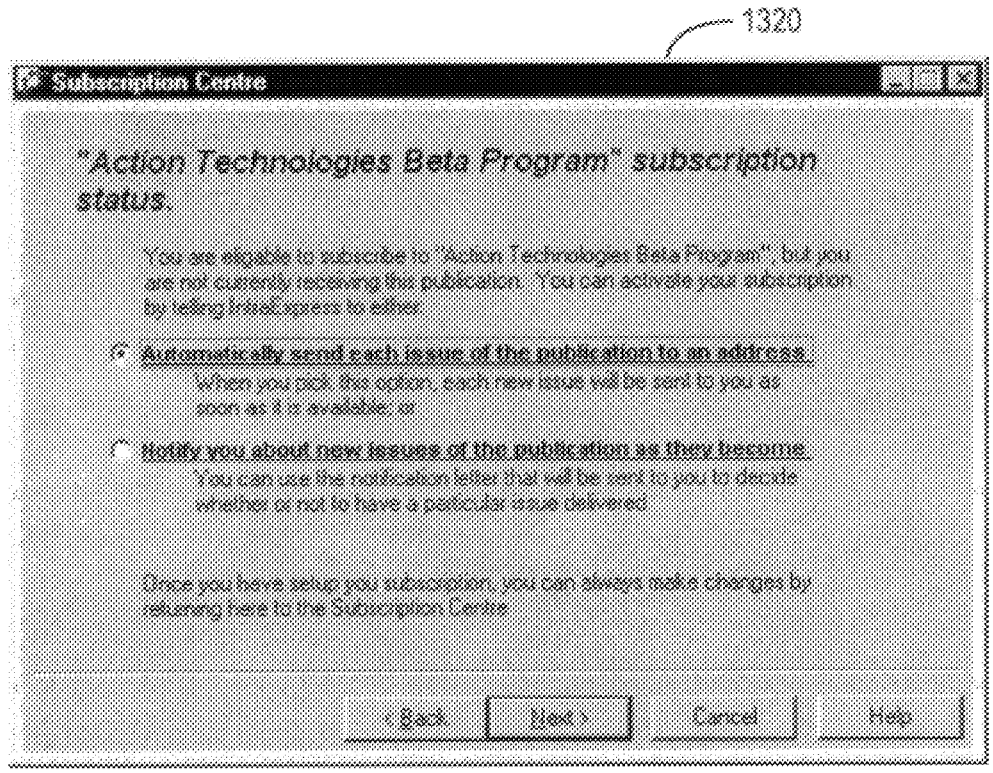
Figure 13E:
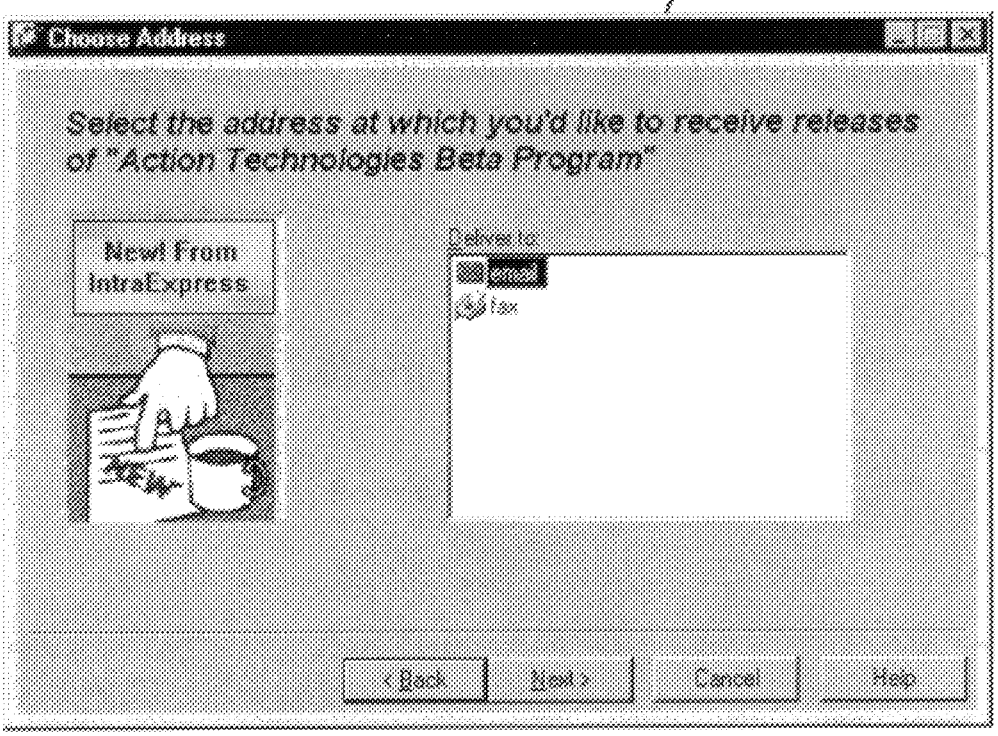
Figure 13F:
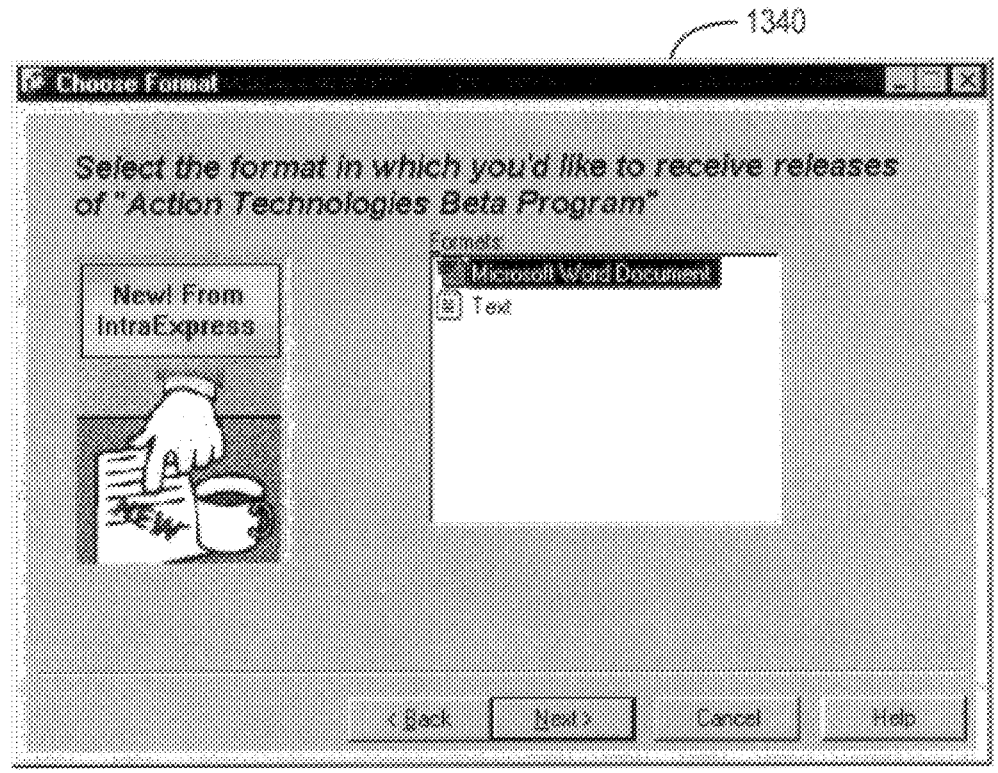
Figure 13G:
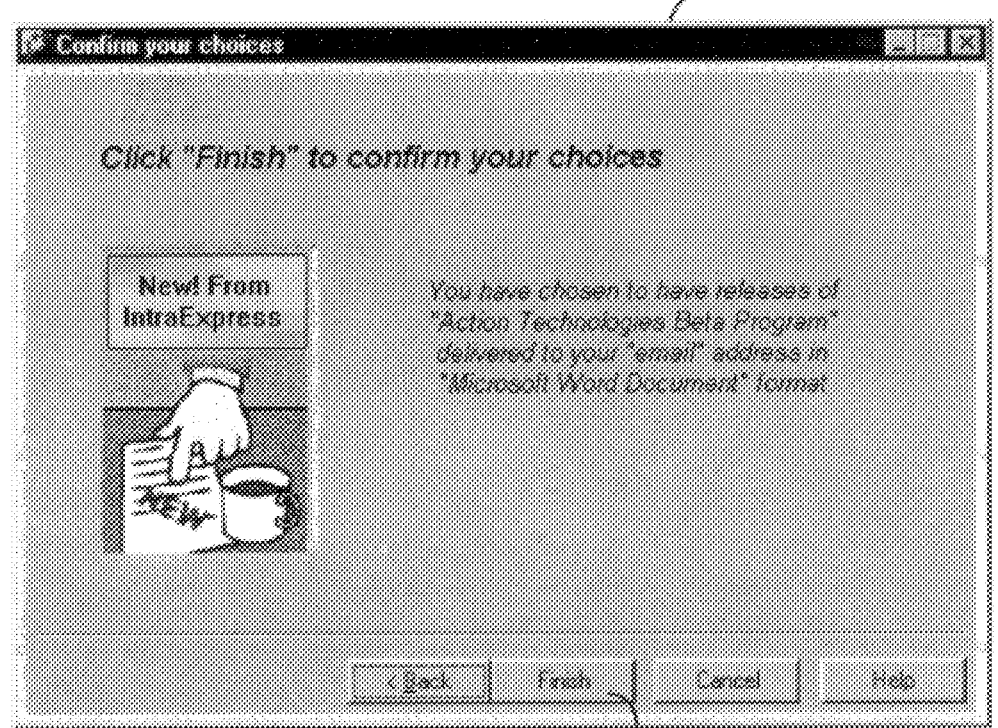

FIG. 13B illustrates receipt of an "offer" message 1311. Upon the user selecting (e.g., clicking) Offer or Announce icon 1313, the system displays Offer Information dialog 1315, as shown in FIG. 13C. After viewing the description of the offer, the recipient user can select Subscription Center button 1317 for specifying how the user would like to receive the publication (if at all). In response to user selection of the Subscription Center button 1317, the system displays the previously-described Subscription Center dialog. Since, for this example, the recipient user has yet to subscribe to the publication, the Subscription Center dialog displays choices which allow the recipient user to specify receipt of the publication, as shown by dialog 1320 in FIG. 13D. To complete input for the offer, the recipient user chooses an address to receive releases (dialog 1330 in FIG. 13E) and a preferred format for receiving releases (dialog 1340 in FIG. 13F). After completing these additional inputs, the recipient user concludes acceptance of the offer by selecting "Finish" button 1351 from dialog 1350, as shown in FIG. 13G.

Figure 14A:
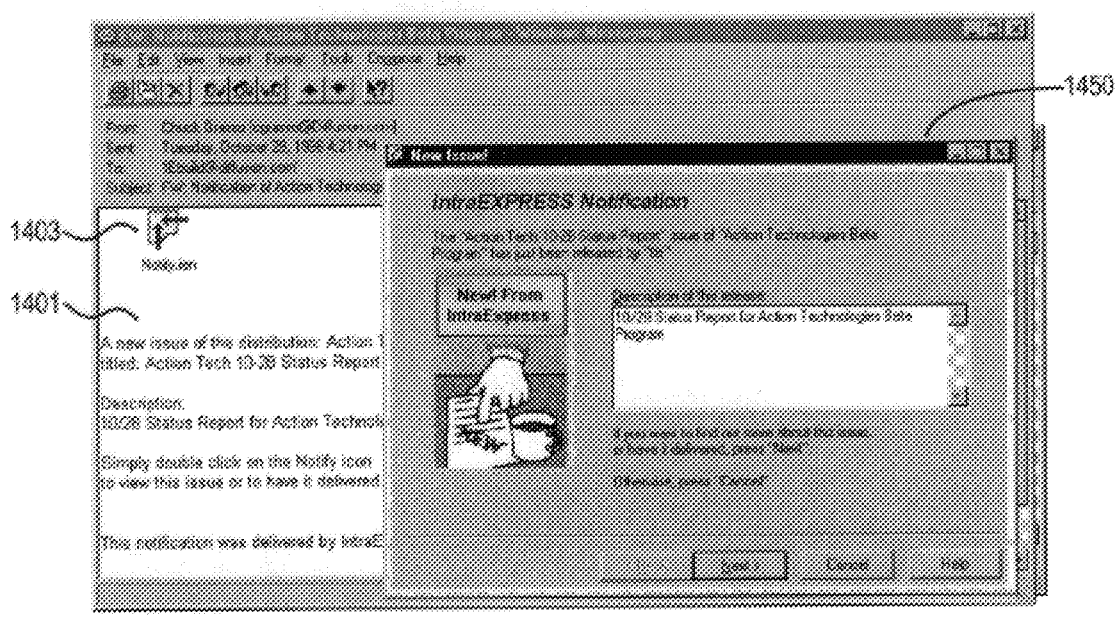
FIGS. 14A and 14B are bitmap screenshots illustrating an exemplary e-mail message and accompanying "Wizard" dialogs for receiving and accepting a "notification."
Figure 14B:
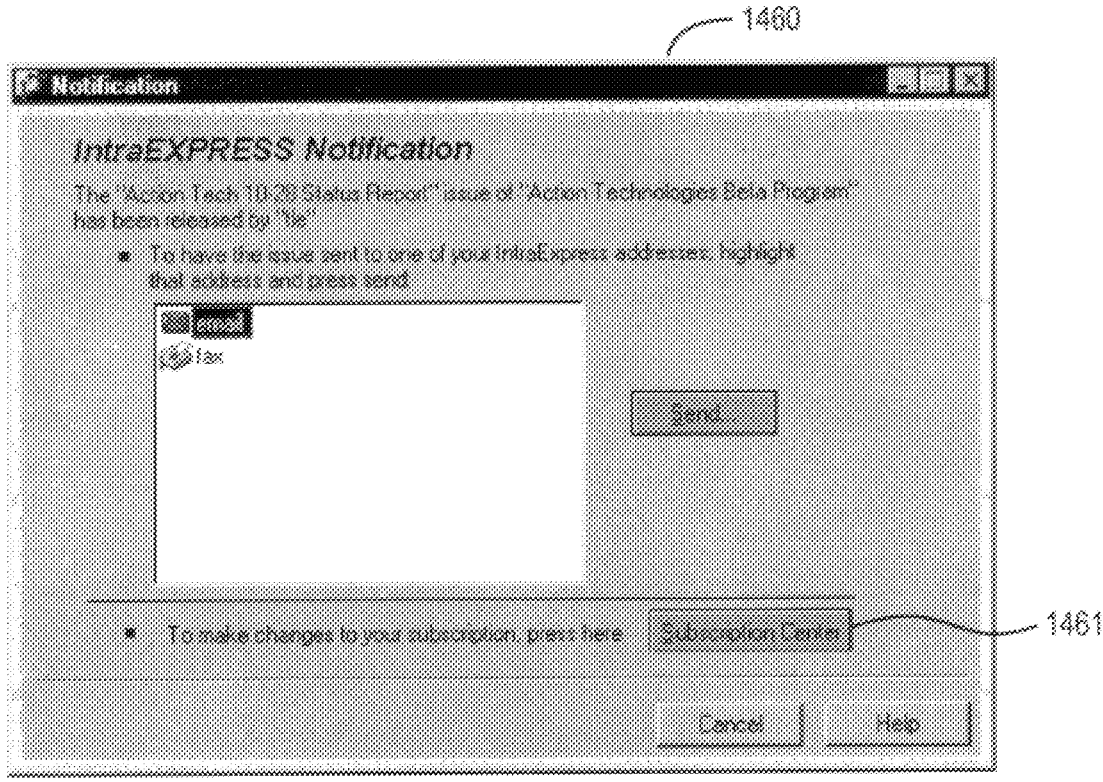
Figure 14C:
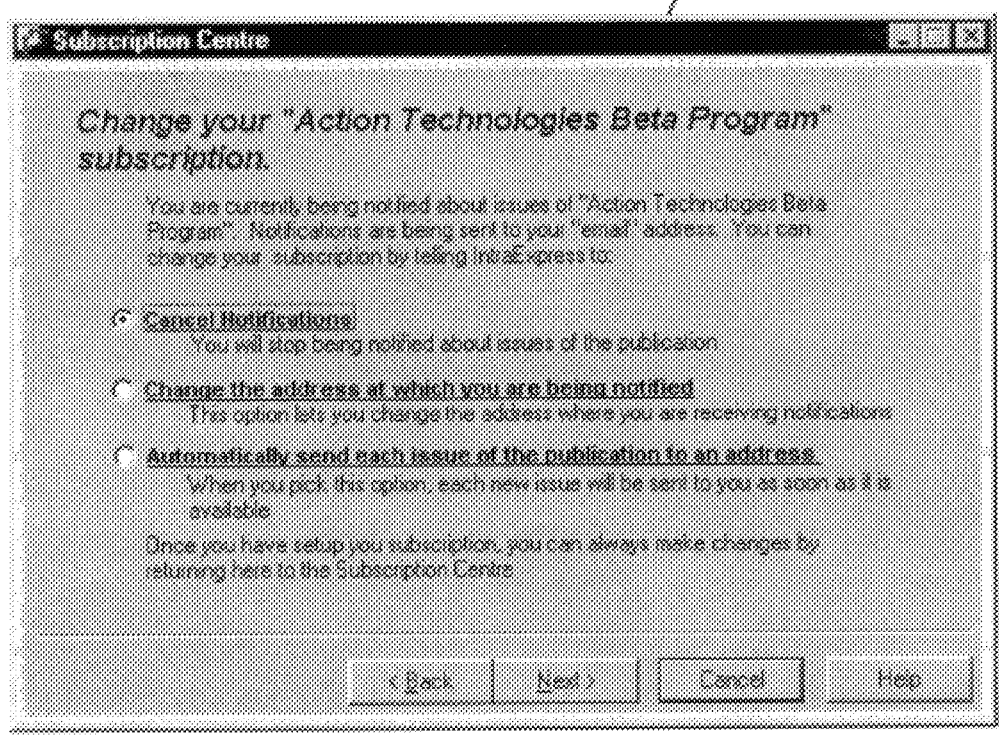
FIG. 14C is bitmap screenshots illustrating an exemplary Subscription Center dialog.

In a similar manner, a notification can be transmitted via e-mail to a recipient user, as illustrated by notification 1401 in FIG. 14A. Upon user selection of notify attachment 1403, the system displays New Issue notification dialog 1450. In a manner similar to that illustrated for inputting information for an offer, the recipient user can respond appropriately to the notification by providing appropriate input to the notification dialog or mini-Wizard 1450. For instance, after the user selects the Next button in dialog 1450, the user can specify an address for receiving releases, as illustrated by dialog 1460 in FIG. 14B. The recipient user can make changes to the underlying subscription by selecting subscription center button 1461. As illustrated in FIG. 14C, the system will, in response, display Subscription Center dialog 1470. Here, the recipient user can elect to (1) cancel notifications, (2) change the address at which the user is being notified, or (3) instruct the system to automatically send each issue of the publication to an address.

Internal Operation

A. Internal Architecture

1. General

Figure 15:
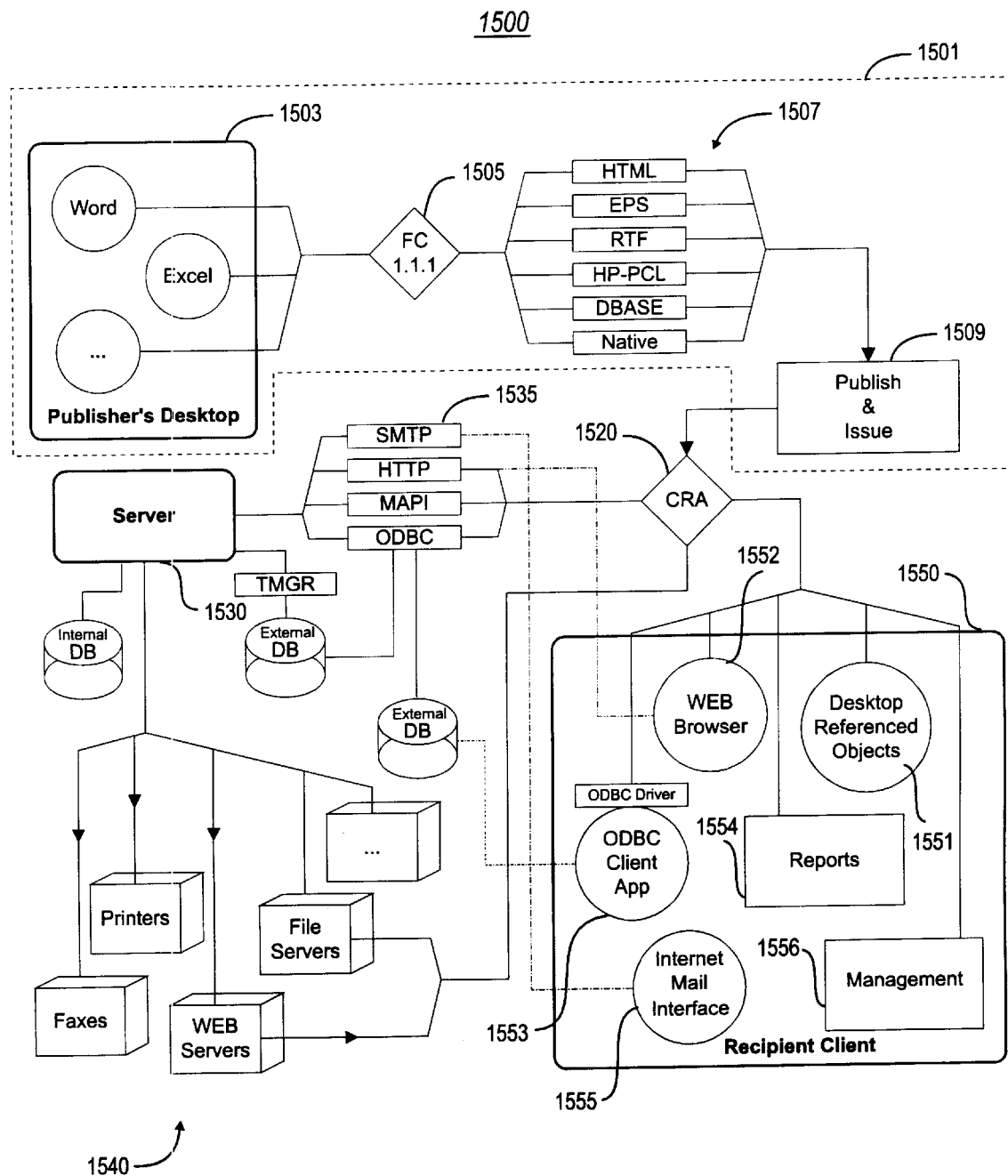
FIG. 15 is a block diagram illustrating detailed architecture of the system of the present invention.

FIG. 15 is a block diagram illustrating the detailed architecture of the system. As shown, the system 1500 includes a distributor or sender component 1501 which, in turn, comprises client applications 1503, IntraExpress client 1505, format drivers 1507, and publish and issue module 1509. In the currently preferred embodiment, these components operate at a client's workstation. Residing at each client workstation, the distributor module 1501 communicates with server 1530 through client resolver agent (CRA) 1520. This module is, in effect, the workhorse module for communicating from each client to the server.

During system operation, any task or request which is initiated at the client is ultimately delivered to the server. At a high level, the CRA 1520 functions by taking a "form" of information from a client, converting it (if necessary) to an appropriate format, and then forwarding it to the server as a form-based request or action. The system decomposes the request into specific tasks. Within the server, each task or action is "atomic"—that is, it can be carried out largely independent of any other task or action. Further, each task encapsulates the information presented to the server (from the client). Once information reaches the server, it is contained within a specific type of form—a type which the server understands. In an exemplary embodiment, these forms are text-based forms in property/value format which describes a task and which presents the information necessary for carrying out the task. In a complementary manner, results are returned to clients using the same form-based approach.

In an exemplary embodiment, the CRA module 1520 surfaces an API (Application Programming Interface) which various clients may, in turn, invoke for processing the form-based information. A recipient piece—residing at another client—would also, in effect, "plug into" the CRA module 1520. The CRA module 1520, in turn, forwards form-based information to the server 1530. The server 1530 supports a variety of transport (protocol) agents or drivers 1535, for transporting information to and from the server. For instance, the server supports an SMTP (simple mail transport protocol) protocol, for transferring information to and from the server. Additionally, the server supports a database transport, such as ODBC (Microsoft Open Database Connectivity) driver, for connecting to external databases. The ODBC transport serves as a database administration layer for communicating with two internal databases: administrative database (ADB) and document database. The former stores administrative and profile information; the latter stores content information as "blob" (binary large object) data.

In the currently preferred embodiment, the CRA module 1520 will generally communicate with the server 1530 via either MAPI (available from Microsoft Corp. in Redmond, Wash.) or a messaging protocol (e.g., TCP/IP), for bi-directional communication. An executing Java component (e.g., such as appended to an "offer") communicates generally through the IP (Internet Protocol) transport. In sum, each transport is responsible for taking an external format of form-based information, converting it into an internal format, and delivering it to the server. Internally, each transport will fill-in an internal representation of the information, based on the content received by the individual transport.

The entry point into the CRA module is a "submit" handler. The handler is invoked with two basic pieces of information. First, the client (caller) specifies a target server—that is, the intended destination for the information. Second, the client specifies the content to be sent; in the currently-preferred embodiment, this is specified as a memory AV (i.e., pointer or handle to attribute value "blob"

data in memory). The submit handler validates the request, including interrogating the target server. For instance, the submit handler determine whether the target server is available, including determining its IP address and available route. Recall at the outset, the client "registers" with the server. This registration process includes transmitting back to the client profile information which includes information about what the target server support and what address or addresses it uses. The CRA module can access the profile information, since it is stored locally at the client. In this manner, the system can easily determine whether a connection is available and can switch dynamically to online or offline communication modes (e.g., direct connect versus store and forward).

Output modules 1540, on the other hand, allow the server 1530 to provide information in a variety of output formats. One-way formats are supported, such as fax or printer output. Bi-directional output is also supported, through use of Web servers, file servers, or the like.

2. Client Recipient Component

Also shown in FIG. 15, the system 1500 includes at least one recipient client 1550. Each recipient, in turn, includes desktop (referenced) objects 1551, a Web browser 1552 (e.g., Netscape Navigator or Microsoft Internet Explorer), reports 1554, database (e.g., ODBC) client application 1553, profile and information management module 1556, and Internet mail interface 1555. Web browser 1552 interacts with the server 1530 (e.g., through HTTP transport) for accessing server-maintained information directly (i.e., without the CRA module 1520) or indirectly (i.e., through the CRA module 1520). Desktop objects 1550 comprise application and data objects, including those which have been distributed to the workgroup. Management module 1556 allows the recipient user to manage his or her profile and available information, as previously illustrated during operation of the user interface. Database (ODBC) client application 1553 illustrates one or more database applications local to recipient client 1550 yet with the ability to access external database information, such as database tables accessed by the server 1530. Finally, Internet mail interface 1555 illustrates a component or module providing the recipient client with the ability to communicate via Internet mail (e.g., SMTP) with the server 1530; in an exemplary embodiment, Internet mail interface may be provided by a Windows "socket" (e.g., Microsoft Winsock) driver implementing TCP/IP support.

3. Basic Actions

Underlying the system 1500 is a messaging architecture. For instance, message types are defined for "publish," "subscribe," "register," "cancel subscription," and the like. More specifically, the system internally defines an "actions" array for storing the following message transport agent (MTA) actions.

```
#define ACT_UNKNOWN              0
#define MTA_ACT_UNKNOWN          "unknown"
#define ACT_PUBLISH              1
#define MTA_ACT_PUBLISH          "publish"
#define ACT_VERSION              2
#define MTA_ACT_VERSION          "version"
#define ACT_SUBSCRIBE            3
#define MTA_ACT_SUBSCRIBE        "subscribe"
#defie  ACT_REGISTER             4
#define MTA_ACT_REGISTER         "register"
#define ACT_MULTIACTION          5
#define MTA_ACT_MULTIACTION      "multiaction"
#defie  ACT_MNGPUB               6
```

-continued

```
#define MTA_ACT_MNGPUB           "mngpub"
#define ACT_CANCELSUB            7
#define MTA_ACT_CANCELSUB        "unsubscribe"
#define ACT_REQUEST              8
#define MTA_ACT_REQUEST          "request"
#define ACT_MNGPROF              9
#define MTA_ACT_MNGPROF          "mngprof"
#define ACT_GETPROF              10
#define MTA_ACT_GETPROF          "getprof"
#define ACR_GETGRI               11
#define MTA_ACT_GETGRI           "getgri"
#define ACT_GETGROUP             12
#define MTA_ACT_GETGROUP         "getgroup"
#define ACT_GETROLE              13
#define MTA_ACT_GETROLE          "getrole"
#define ACT_GETDIST              14
#define MTA_ACT_GETDIST          "getdist"
#define ACT_GETSUBS              15
#define MTA_ACT_SETSUBS          "getsubs"
#define ACT_GETASUBS             16
#define ACT_GETASUBS             "getasubs"
#define ACT_GETREPORT            17
#define MTA_ACT_GETREPORT        "getreport"
#define ACT_MNGGROUP             18
#define MTA_ACT_MNGGROUP         "mnggroup"
#define ACT_MNROLE               19
#define MTA_ACT_MNGROLE          "mngrole"
#define ACT_DELPUB               20
#define MTA_ACT_DELPUB           "delpub"
#define ACT_DELPROF              21
#define MTA_ACT_DELPROF          "delprof"
#define ACT_DELGROUP             22
#define MTA_ACT_DELGROUP         "delgroup"
#define ACT_DELROLE              23
#define MTA_ACT_DELROLE          "delrole"
#define ACT_NEWGROUP             24
#define MTA_ACT_NEWGROUP         "newgroup"
#define ACT_NEWROLE              25
#define MTA_ACT_NEWROLE          "newrole"
#define ACT_GETVERSION           26
#define MTA_ACT_GETVERSION       "getversion"
#define ACT_GETSYS               27
#define MTA_ACT_GETSYS           "getsys"
#define ACT_MNGSYS               28
#define MTA_ACT_MNGSYS           "mngsys"
#define ACT_GETPUB               29
#define MTA_ACT_GETPUB           "getpub"
#define ACT_COUNT                30
#define MTA_ACT_ANNOUNCE         "announcement"
#define MTA_ACT_NOTIFY           "notification"
#ifdef _DSUTILS_CPP
static char *actions[ACT_COUNT+1] = {
    MTA_ACT_UNKNOWN,
    MTA_ACT_PUBLISH,
    MTA_ACT_VERSION,
    MTA_ACT_SUBSCRIBE,
    MTA_ACT_REGISTER,
    MTA_ACT_MULTIACTION,
    MTA_ACT_MNGPUB,
    MTA_ACT_CANCELSUB,
    MTA_ACT_REQUEST,
    MTA_ACT_MNGPROF,
    MTA_ACT_GETPROF,
    MTA_ACT_GETGRI,
    MTA_ACT_GETGROUP,
    MTA_ACT_GETROLE,
    MTA_ACT_GETDIST,
    MTA_ACT_GETSUBS,
    MTA_ACT_GETASUBS,
    MTA_ACT_GETREPORT,
    MTA_ACT_MNGGROUP,
    MTA_ACT_MNGROLE,
    MTA_ACT_DELPUB,
    MTA_ACT_DELPROF,
    MTA_ACT_DELGROUP,
    MTA_ACT_DELROLE,
    MTA_ACT_NEWGROUP,
    MTA_ACT_NEWROLE,
    MTA_ACT_GETVERSION,
    MTA_ACT_GETSYS,
```

-continued

```
        MTA_ACT_MNGSYS,
        MTA_ACT_GETPUB,
        0
};
```

Use of these messages will be illustrated for exemplary activities of the components which comprise the system 1500.

4. Exemplary Activities

The sender or distributor component supports, at the top level, four basic actions or activities. The first action, "create new template" (or "create new distribution") corresponds to the action of "publish" (i.e., MTA_ACT_PUBLISH). In response to this action, the server creates an empty object in its database, for storing information characterizing the distribution. Specifically, the object stores certain descriptors and properties for characterizing a distribution. At this point (i.e., upon initial creation), however, it contains no information (other than initialization or default values).

In operation, the sender component communicates the "publish" action by creating a "publish" form. This form is published to the client resolver agent (CRA) 1520. The resolver agent 1520, in response, packages the "publish" form into a transmittable format, such as MAPI or IP (depending on one's connection). Once so converted, the form is transported to the server's corresponding message transport agent (MTA). The corresponding MTA at the server (e.g., MAPI), in response, unpackages the transmitted form into a format understood by the server (i.e., an internal server form) and places it into the server's internal queue. At a high level, therefore, numerous incoming form-based messages arrive from various clients via the CRA module 1520 (which communicates with the server 1530 through an appropriate one of the server's message transport agents 1535). Once in the queue, the message is ready for processing by the server. The server itself includes a dispatcher which reads each message from the queue and dispatches it to an appropriate handler which supports the requested service. All told, a form originates at the user interface (i.e., at the distributor user's desktop). From there, the form gets packaged for transport and then unpackaged after ultimately being received by the server. At the server, the information exists as a form, with the properties which were set initially at the distributor's user interface.

A "publish" action creates an empty distribution or subscription object. The object includes information about what the distribution will comprise, but does not include actual data itself. A "version" action or form includes the actual blob data for a particular publication. Every time a distributor wants to release a new version, a "version" form is generated. This form includes the format which was specified for the publication and the actual (blob) data.

A distribution also includes other properties, such as those characterizing who can receive the distribution and what are the policies. This is supported by the "manage pub" form or action. This form supports adding/removing individuals, groups, and roles, as well as changing formats. Accordingly, this form supports the general management of a distribution. As previously illustrated (in the user interface), management of individuals, groups, and roles is adaptive. When an individual or group is added to a distribution, for instance, the server, upon receipt of the "manage pub" form will intelligently determine appropriate addresses for the distribution (i.e., based on resolution of individuals, groups, and roles (and their respective profiles) into actual addresses).

5. Forms

As illustrated above, a basic mechanism exists in the system for transporting form-based messages (which include requested "actions") from a sender or distributor component to the server (and vice versa). Internally, a form is represented by an attribute value list in memory. In other words, each attribute value list provides a memory representation of a form. At the level of the CRA module, the attribute value list is "dumped out" (i.e., written out to a persistent image) in a format which is suitable for transmission across a wire (e.g., Internet). In a corresponding manner, at the server, a transmitted form can be parsed for recreating the form in memory (i.e., as an attribute value list). In essence, a form can be viewed as existing physically (i.e., persistently) during the time at which the form is transported.

For a simple form (i.e., one not containing user blob data), the system need only generate a text-based attribute or property value form. For a data form, on the other hand, the system maps the user data into a representation suitable for the transport. For MAPI transport, for instance, user data is mapped into one or more email attachments (i.e., whatever is needed to transmit the binary data). For a direct connection, the system partitions the user data into packets suitable for IP transmission. In the case of a direct connection, the CRA module awaits acknowledgment from the server of receipt of the information and reports such results back to the client. For store and forward, on the other hand, the CRA module need only post the information to the mail system.

B. Source Code Implementation

1. General Data Structures and Classes

The core data structure employed by the system is the "form"—an in-memory representation comprising an attribute value (AV) list. This list can be multiply linked, for providing flexibility to change or add functionality to the action represented by the form. Programmatically, this information is supported by a base AV data structure and an AV list data structure, for supporting property value pairs which can be linked in a desired manner.

In an exemplary embodiment, the AV (base) class may be implemented as a C++ class as follows.

```
class _EXPORT_ AV {
    friend AVList;
    friend AVIterator;
    friend AVListIterator;
public:
    AV(const char *, const char *, const char * = (const char *)0);
    virtual ~AV( );
    const char *GetAttr( );
    condt char *GetValue( );
    const char *GetTag( );
        void Add(const char *, const char * = (const char *)0);
        void LowerVal( );
        void TrimVal( );
    void Add(const char *, const char *, const char * = (const char *)0);
    void Add(AV *);
    void Remove(const char *);
    void Remove(AV *);
    AV *Find(const char *);
    AV *Find and Remove(const char *);
        AV *FindTag(const char *);
        const char *FindTagValue(const char *);
        AV *FindValue(const char *);
        GetCount( );
protected:
        AV( );
    void AddLink(AV *);
        void ShiftLink( );
        void Unlink(const char *);
```

-continued

```
    char *Attr;
    char *Value;
    char *Tag;
    int Count;
    AV *MNext;   // Multi-link next
    AV *MTail;
    AV *Next;    // (Regular) next
};
```

As shown, the class defines several public methods for "housekeeping" tasks. For instance, "getter" methods are defined for getting an attribute, a value, and a tag. Of particular interest in the class definition are the protected data members. Specifically, Attr (attribute), Value, and Tag are represented within an object instantiation of the class as (pointers to) character strings. The attribute represents the particular property, such as "Title" or "Color." The value represents data for the attribute, such as an integer value representing the color Red. A tag represents a subtype. Consider, for instance, a property which can have multiple values (as opposed to a single value). A tag can be employed in such an instance to distinguish among the multiple values for the property. In this manner, the system supports both backward and forward compatibility.

In class includes pointers (e.g., "next" pointer) for constructing a list of AV objects. This list is distinguished from an "AV List" which serves as a list of AV lists. Given these core data members within the class, the remainder of the class definition substantially comprises methods (e.g., getting, setting, adding, removing, finding, and the like) for processing these data members of the class.

The AVList class, on the other hand, may be constructed as follows.

```
class _EXPORT_ AVList {
    friend AVListIterator;
public:
    AVList( );
    virtual ~AV:ist ( );
    void Add(AV *);
    void Add(const char *, const char *, cpnst char * = (const char *)0);
    void AddMulti(AV *, int=0);
    void AddMulti(const char *, const char *, const char *);
    void Remove(const char *):
    void Remove*(V *);
    void RemoveMulti(const char *);
    void RemoveMulti(AV *);
    const char *Find(const char *);
        long FindLong(const char *);
        const char *FindLower(const char *);
        const char *FindTrunc(const char *, int);
        const char *FindTruncLower(const char *, int);
        AV *FindAV(const char *);
    Av *FindandRemove(const char *);
        AV *FindTag(const char *);
        AV *ParseLine(char *, int =0);
        Av *ParseMultiLine(SLine *, int &, int =0);
        void FreeLine(AV *);
        Load(int);
protected:
        void AVList::AddNext(AV *);
    int Count;
    AV *Head;
    AV *Tail;
};
```

Since this class is declared previously (i.e., in the AV class) to be a friend of the AV class, it has direct access to data members of an AV object (i.e., an object instantiated from the AV class). The AVList serves to manage a higher-level list. In other words, the system can maintain a linked list of AV objects (i.e., linked via pointers stored within each AV object). This initial linkage can be viewed as a one dimensional list. The AVList provides additional list processing on top of one dimensional AV list for allowing lists of AV objects (AVList) to be linked yet again (i.e., providing two dimensional lists of AV objects).

The reason underlying this approach to list processing is as follows. For the type of information which flows in the forms, often there will exist like or similar information which needs to be stored and accessed iteratively, as well as be grouped in common segments in memory. A lot of the information stored at the server is repetitive—essentially existing as repeated types of information. Consider, for instance, a simple e-mail address comprising a name, type, and value. By storing this information in two dimensional lists, the system provides support for iterating across the names of all the stored e-mail addresses, the values of all the stored e-mail addresses, or the types of all stored e-mail addresses. During system operation, the two dimensional lists are set up such that the linkages reflect types of information which might be important to iterate across. Accordingly, this gives the system the flexibility to traverse such information (e.g., e-mail addresses) in different directions in memory. Accordingly, the user can drill "down" or drill "across" information, without the system resorting to a hierarchical (e.g., tree) data structure.

2. Information Storage: Database Agent

For persistent storage, the server stores information in one or more database tables. More particularly, the server functions to convert information which is in AV format into appropriate semantics which allow storage of appropriate objects in the database. In this regard, the database employed by the server functions as an object store—that is, provides storage for blob data which the objects comprise as well as provides appropriate semantics for processing that blob data. The database agent layer is bi-directional. Information can be converted back into AV form after retrieval from the object store. In this manner, objects can be readily converted from an internal representation (i.e., AV representation) into a persistent form (i.e., blob data), and back again.

A document database is employed for storing "document" objects. Documents contain "versions" which, in turn, contain "sections." A document object is created in response to a "publish" action or form. Specifically, the server invokes the database agent layer for creating a document, based on the information specified by the publication. All the properties received at the UI for adding information about a distribution are eventually mapped down into each document's properties.

In an exemplary embodiment, a document object is created from a Doc C++ class, which may be defined as follows.

```
class_EXPORT_Doc {
public:
    virtual UID Get_Owner(        // get the doc owner
        ) = 0;                     // ret owner
    virtual DID Get_DID(          // get the doc id
        ) = 0;                     // ret id
    virtual bval Get_Name(        // get the doc name/key
        char *                     // name/key
        ) = 0;                     // returns func bool 0=OK
    virtual LDATE Get_Create_Date(  // get creation date
        ) = 0;                     // ret pub creation date
    virtual long Get_Flags(       // get the doc flags
        ) = 0;                     // ret flags
    virtual long Get_Vdepth(      // get version depth
        ) = 0;                     // ret version depth
```

```
        virtual long Get_Cdepth(              // get current depth
            ) = 0;                            // ret current depth
        virtual long Get_Notes(               // get doc notes/description
            char *                            // buffer to fill
            ) = 0;                            // returns func bool 0=OK
        virtual VID Get_CVid(                 // get current version id
            ) = 0;                            // ret id
        virtual bval Set_Owner(               // set the doc owner
            UID                               // owner
            ) = 0;                            // returns func bool 0=OK
        virtual bval Set_Create_Date(         // set creation date
            LDATE                             // creation date
            ) = 0;                            // returns func bool 0=OK
        virtual bval Set_Flags(               // set the doc flags
            long                 // flags
            ) = 0;                            // returns func bool 0=OK
        virtual bval SET_Vdepth(              // set version depth
            long                              // version depth
            ) = 0;                            // returns func bool 0=OK
        virtual bval Set_Notes(               // set doc notes/description
            const char *                      // notes desription
            ) = 0;                            // returns func bool 0=OK
        virtual bval Set_Cvid(                // set current version id
            VID                               // version ID
            ) = 0;                            // returns func bool 0=OK
        virtual VER * Create_Version(         // Create a new version
            UID,                              // version owner
            const char *,                     // version name
            long,                             // version index (user defined)
            LDATA                             // date received (now)
            ) = 0;                            // ret version class ptr
        virtual VER * Open_Version(           // Open existing version
            UID,                              // owner
            const char *                      // version name
            ) = 0;                            // ret version class ptr
        virtual VER * Open_Version(
            VID                               // version id
            ) = 0;
        virtual VER * Open_Version(           // Open existing version
            UID,                              // owner
            const long                        // version index
            ) = 0;                            // ret version class ptr
        virtual VER * Open_Version(           // Open existing version
            UID,                              // owner
            const char *,                     // version name
            const long                        // version index
            ) = 0;                            // ret version class ptr
        virtual bval Save_Version(            // save verion changes
            VER *                             // version ptr
            ) = 0;                            // returns func bool 0=OK
        virtual bval Close_Version(           // close section
            VER *                             // version ptr
            ) = 0;                            // returns func bool 0=OK
        virtual bval Delete_Version(          // delete version
            UID,                              // version owner
            const char *                      // version name
            ) = 0;                            // returns func bool 0=OK
        virtual bval Delete_Version(          // version id
            VID                               // returns func bool 0=OK
            ) = 0;                            // delete version
        virtual bval Delete_Version(          // version owner
            UID,                              // version index
            const long                        // returns func bool 0=OK
            ) = 0;                            // delete version
        virtual bval Delete_Version(          // version owner
            UID,                              // version name
            const char *,                     // version index
            const long                        // returns func bool 0=OK
            ) = 0;                            // match versions
        virtual int Select_Version(           // owner to match, 0=all
            UID                               // returns # of versions
            ) = 0;                            //   matched
        virtual bval Next_Version(            // iterate to next version
            UID &,                            // owner
            char *,                           // version name (copy)
            LDATE &,                          // date received
            LDATE &,                          // date created
            VID &                             // version id
            ) = 0;                            // returns func bool 0=OK
        virtual void Deselect_Version(        // finish or free select
            ) = 0;
        virtual int Get_Error(                // get the last error
            ) = 0;                            // return error code
    };
```

As shown, the class provides "setter" and "getter" methods for supporting document objects. For instance, the Get_Name method returns the name (text string) for the document. Get_Vdepth, on the other hand, returns a number (long integer) indicating the version depth (i.e., how many versions are stored) for the document. In a similar manner, the class defines several helper methods for managing versions of the document, such as the Open Version method for opening an existing version. As shown, the methods are implemented as "virtual" methods—that is, no implementation steps are provided for the methods at this class level. The system is designed in this manner so that different storage mechanisms (e.g., ODBC) can be supported by the system, with each particular type having a corresponding Doc subclass providing necessary implementation steps.

In a corresponding manner, each version object is an instance of a Version C++ class, which may be defined as follows.

```
class_EXPORT_Version {
    public:
        virtual UID Get_Owner(                // get the version owner
            ) = 0;                            // ret version owner
        virtual VID Get_VID(                  // get the version id
            ) = 0;                            // ret version id
        virtual VIX Get_VIX(                  // get the version index
            ) = 0;                            // ret version index
        virtual LDATE Get_Create_Date(        // get creation date
            ) = 0;                            // ret date
        virtual LDATE Get_Recv_Date(       // get received date
            ) = 0;                            // ret date
        virtual bval Get_Notes(               // get version descritpion
            char *                            // buffer to fill
            ) = 0;                            // returns func bool 0=OK
        virtual bval Get_Name(                // get version name
            char *                            // buffer to fill MAX_VNAME
            ) = 0;                            // returns func bool 0=OK
        virtual int Get_Num_of_Sects(         // get section count
            ) = 0;                            // returns section count
```

```
        virtual bval Set_Owner(           // set the version owner
            UID                           // owner
            ) = 0;                        // returns func bool 0=OK
        virtual bval Set_VIX(             // set the version index
            VIX                           // version index
            ) = 0;                        // returns func bool 0=OK
        virtual bval Set_Create_Date(     // set creation date
            LDATE                         // create date
            ) = 0;                        // returns func bool 0=OK
        virtual bval Set_Recv_Date(       // set received date
            LDATE                         // received date
            ) = 0;                        // returns func bool 0=OK
        virtual bval Set_Notes(           // set version description
            const char *                  // description
            ) = 0;                        // returns func bool 0=OK
        virtual SECT * Create_Section(    // Create a new section
            STYPE,                        // section type
            STYPE,                        // section sub-type
            const char *                  // section name
            ) = 0;                        // ret section ptr
        virtual SECT * Open_Section(      // Open existing section
            STYPE,                        //section type
            const char *                  // section name
            ) = 0;                        // ret section ptr
        virtual SECT * Open_Section(
            ID                            // section id
            ) = 0;                        // ret section ptr
        virtual bval Save_Section(        // save section changes
            SECT *                        // section ptr
            ) = 0;                        // returns func bool 0=OK
        virtual bval Close_Section(       // close section
            SECT *                        // section ptr
            ) = 0;                        // returns func bool 0=OK
        virtual bval Delete_Section(      // delete section
            STYPE,                        // section type
            const char *                  // section name
            ) = 0;                        // returns func bool 0=OK
        virtual bval Delete_Section(
            ID                            // section id
            ) = 0;                        // returns func bool 0=OK
        virtual int Select_Section(       // match sections
            STYPE,                        // section type to match, 0=all
            STYPE,                        // sub type to match, 0=all
            const char *                  // section name to match, 0=all
            ) = 0;                        // returns # of sections matched
        virtual bval Next_Section(        // iterate to next section
            STYPE &,                      // section type
            STYPE &,                      // section sub-type
            char *,                       // section name (copy)
            long &,                       // size of section (bytes)
            ID &                          // section id
            ) = 0;                        // returns func bool 0=OK
        virtual void Deselect_Section(    // finish or free select
            ) = 0;
        virtual int Get_Error(            // get the last error
            ) = 0;                        // return error code
};
```

As with the Doc class, the Version class presents an abstract (virtual) interface for managing versions. Specific implementation steps are provided based on the underlying storage mechanism employed (e.g., ODBC).

Each section comprises a section object, an instance of a Section C++ class. Such a class may be defined as follows.

```
class _EXPORT_ Section {
public:
    virtual long Read_Section(        // read section binary data
        char *,                       // buffer to fill
        long                          // max # of bytes to read
        ) = 0;                        // returns # of bytes read
    virtual long Write_Section(       // write section binary data
        const char *,                 // buffer to write
        long                          // # of bytes to write
        ) = 0;                        // returns # of bytes written
    virtual bval Start_Binary(        // start a blob r/w action
        BLOBVAL                       // read or write
        ) = 0;                        // returns func bool 0=OK
    virtual bval End_Binary(          // end a blob r/w action
        ) = 0;                        // returns func bool 0=OK
    virtual STYPE Get_Type(           // get the section type
        ) = 0;                        // ret section type
    virtual STYPE Get_Subtype(        // get section sub-type
        ) = 0;                        // ret section sub-type
    virtual long Get_Size(            // get the size section
        ) = 0;                        // ret # of bytes in section
    virtual bval Get_Notes(           // get section notes/description
        char *                        // buffer to hold notes
        ) = 0;                        // returns func bool 0=OK
    virtual bval Get_Name(            // get section name
        char *                        // buffer to hold name
        (max_sname)
```

```
            ) = 0;                    // returns func bool 0=OK
    virtual ID Get_SID(               // get section id
            ) = 0;                    // returns section id
    virtual void Set_Type(            // set the section type
            STYPE                     // section type
            ) = 0;
    virtual void Set_Subtype(         // set the section type
            STYPE                     // section subtype
            ) = 0;
    virtual bval Set_Notes(           // set the notes/description
            const char *              // buffer containing notes
            ) = 0;
    virtual int Get_Error(            // get the last error
            ) = 0;                    // return error code
};
```

The class defines methods supporting blob management, thereby providing processing of actual user data. Again, the class is defined to support an abstract interface. Implementation steps for the individual methods are provided based on the particular storage mechanism employed.

3. Server's Dispatcher: Message Processing Loop

The dispatcher is implemented as a switch or case loop within the server for looping on various action tokens. In an exemplary embodiment, this loop may be constructed as follows.

```
switch (action) {
    case ACT_MULTIACTION:
            break;
    case ACT_REGISTER:
            rval = Register(avp, &atok);
            break;
    case ACT_PUBLISH:
            rval = Publish (avp, &atok);
            break;
    case ACT_VERSION:
            {
                DID did;
                VID vid;
                rval = Version (avp,&atok,sl,did,vid);
                if (doreply) {
                        Do_Reply(reply_transport, reply_to,
action, rval);
                }
                if (rval == 0 && vid != 0) {
                        LOG_STATUS("Processing Issue/Notify
. . . \n");
                }
            }
            break;
    case ACT_MNGPUB:
            rval = MngPub(avp,&atok);
            break;
    case ACT_SUBSCRIBE:
            rval = Subscribe(avp,&atok);
            break;
    case ACT_CANCELSUB:
            rval = CancelSub(avp,&atok);
            break;
    case ACT_REQUEST:
            rval = Request (avp,&atok);
            break;
    case ACT_MNGPROF:
            rval = MngProf(avp,&atok);
            break;
    case ACT_MNGGROUP:
            rval = MngGroup(avp,&atok);
            break;
    case ACT_MNGROLE:
            rval = MngRole(avp,&atok);
            break;
    case ACT_NEWGROUP:
            rval = New Role(avp,&atok);
            break;
    case ACT_NEWROLE:
            rval = NewRole(avp,&atok);
            break;
    case ACT_DELPUB:
            rval = DelPub(avp,&atok);
            break;
    case ACT_DELPROF:
            rval = DelProf)avp,&atok);
            break;
    case ACT_DELGROUP:
            rval = DelGroup(avp,&atok);
            break;
    case ACT_DELROLE:
            rval = DelRole(avp,&atok);
            break;
    case ACT_MNGSYS:
            rval = MngSys(avp,&atok);
            break;
    // Handle gets (these require replies)
    case ACT_GETPROF:
            rval = GetProf(avp,&atok,rSl);
            isrepdata = 1;
            break;
    case ACT_GETGRI:
            rval = GetGRI(avp,&atok,rSl);
            isrepdata = 1;
            break;
    case ACT_GETGROUP:
            rval = GetGroup(avp,&atok,rSl);
            isrepdata = 1;
            break;
    case ACT_GETROLE:
            rval = GetRole(avp,&atok,rSl);
            break;
    case ACT_GETDIST:
            rval = Getdist(avp,&atok,rSl);
            isrepdata = 1;
            break;
    case ACT_GETSUBS:
            rval = GetSubs(avp,&atok,rSl);
            isrepdata = 1;
            break;
    case ACT_GETASUBS:
            rval = GetASubs(avp,&atok,rSl);
            isrepdata = 1;
            break;
    case ACT_GETREPORT:
            rval = GetReport(avp,&atok);
            isrepdata = 0;     // This is delivered
            break;
    case ACT_GETVERSION:
            rval = GetVersion(avp,&atok,rS1);
            isrepdata = 1;
            break;
    case ACT_GETSYS:
            rval = GetSys(avp,&atok,rS1);
            isrepdata = 1;
            break;
    case ACT_GETPUB:
            rval = GetPub(avp,&atok,rS1);
            isrepdata = 1;
            break;
    default:
            LOG_ERROR("Unknown action: %d
<%s>\n",action,actionstr);
            rval = ERR_INVALID_PARAM;
            break;
}
```

The base class of the server (Diff) provides a main routine for processing incoming forms. Depending on what action is switched on, a particular manager or handler of the server is selected for processing the incoming form. Each manager is itself a C++ object. A new group action (ACT_NEWGROUP) invokes a NewGroup manager.

4. Exemplary Manager: Publish Manager

Construction of the Publish manager or handler is exemplary in this regard. The handler may be constructed as follows.

```
Dif::Publish(AVList *avp,Authtok *ptok)
{
    // validate base
    // validate rights
    // validate form
    const char *dname = avp->FindTrunc(MTA_DNAME,
    DBA_MAX_DNAME);
    const char *dnotes = avp->FindTrunc(MTA_DNOTES,
    DBA_MAX_NOTES);
    const char *vdep = avp->Find(MTA_VDEPTH);
    const char *dtype = avp->Find(MTA_DTYPE);
    const char *uname = ptok->Get_Uname( );
    PROFTYPE ptype = ptok->Get_Ptype( );
    UID uid = ptok->Get_UID( );
    int rval;
    if (dname == 0 || *dname == 0) {
        LOG_ERROR("Invalid Publish form missing dist name\n");
        return(ERR_INVALID_PARAM);
    }
    if (rval = Publish_Rights*uid,ptype)) {
        LOG_ERROR("Publish: no right to publish <%s>\n",uname);
        return (rval);
    }
    // Create DAP
    long did = Gen_LongID( );
    DAP *pDAP = pAdb->Create_DAP(uid,dname,did);
    if (pDAP == 0) {
        LOG_ERROR("Error creating DAP <%s>\n",Datafile);
        return(ERR_INVALID_PARAM);
    }
    if (dnotes == 0 || *dnotes == 0)
        dnotes = "No description provided";
    pDAP->Set_Notes(dnotes);
    // check the document type
    long dftype = DBA_DTYPE_DOC;
    if (dtype && *dtype) {
        if (stricmp(dtype,MTA_DTYPE_APP) == 0)
            dftype = DBA_DTYPE_APP;
        else if (stricmp(dtype,MTA_DTYPE_TOPIC) == 0)
            dftype = DBA_DTYPE_TOPIC;
    }
    pDAP->Set_Flags(dftype);
    // check report type
    MngPub_Report_When(pDAP,uid,avp);
    // add formats to the DAP
    MngPub_Add_Format(pDAP,avp);
    MngPub_Default_Format(pDAP,avp);
    // add contact info
    if ( MngPub_Add_Contact(pDAP,avp) )
        pDAP->Set_Contact("");
    pAdb->Save_DAP(pDAP);
    pAdb->Close_DAP(pDAP);
    // create doc
    DOC *pDoc = pDdb->Create_Document(uid,dname,did,
    Gen_Date( ));
    if (pDOC == 0) {
        LOG_ERROR("Error creating DOC <%s>\n",Datafile);
        pAdb->Delete_DAP(did);
        return(ERR_UNVALID_PARAM);
    }
    if (vdep) {
        int val = atoi(vdep);
        if (val < 0)
            val = 0;
        pDoc->Set_Vdepth(val);
    }
    pDdb->Save_Document(pDoc);
    pDdb->Close_Document(pDoc);
    return(0);
}
```

As shown, the handler is invoked with an AVList (pointer to) data member. Note additionally that the handler or manager is invoked with an authorization token specifying who the client is; this information is employed to check the rights for the user throughout the operation. The initial steps of the handler serve to extract property information of interest (e.g., name, version depth, type, and the like). These properties are ultimately stored by the database agent.

After validating the request, such as checking that the user has sufficient rights to publish, the handler proceeds to create the document and policies for the distribution. Now, the handler is ready to build up the DAP (document access and policies) object—an object instantiated from a DAP class. Information is added to the DAP object, including document type, report type, default format, contact information, and the like. After this information has been added to the DAP object, the handler proceeds to store the DAP object in its administrative database (ADB).

This is followed by steps within the handler for creating the document, a specific instance created from the Doc class. If the initial Doc object is successfully created, its version depth is initialized to zero (i.e., no versions yet stored) and the document object is saved in the document database (DBD). After storing both the DAP and Doc objects, the handler is done and may return control back to the dispatcher loop (i.e., for processing either forms and their action tokens).

In a manner similar to that shown for the Publish handler, a Manage Publication (MngPub) handler or manager may be constructed as follows.

```
Dif::MngPub(AVList *avp,Authtok *ptok)
{
    const char *dname = avp->Find(MTA_DNAME);
    const char *duname = avp->Find(MTA_DUNAME);
    const char *uname = ptok->Get_Uname( );
    PROFTYPE ptype = ptok->Get_Ptype( );
    UID uid = ptok->Get_UID( );
    int rval;
    if (duname == 0 || *duname == 0) {
        duname = uname;
    }
    DPA *pDAP;
    if (rval = OwnerRights(ptok,dname,duname,pDAP)) {
        LOG_ERROR("MngPub: No rights or invalid dist <%s>\n",
        uname;
        return (rval);
    }
    // handle global changes TODO
    // cycle through adds, removes, and modifies
    MngPub_Remove(pDAP, avp);
    MngPub_Add(pDAP, avp);
    MngPub_Modify(pDAP, avp);
    // use start w/current logic
    Notify_Current(pDAP);
    Issue_Current(pDAP);
    // check version depth update
    const char *val = avp->Find(MTA_VDEPTH);
    if (val) {
        int vdepth = atoi(val);
        if (val >= 0) {
            Doc *pDoc = pDdb->Open_Document(pDAP->
            GetDID( ));
            if (pDoc) {
                pDoc->Set_Vdepth(vdepth);
                pDdb->Save_Document(pDoc);
                pDdb->Close_Document(pDoc);
            }
        }
    }
    // check for re-assign of owner (change doc as well TODO)
    if ((ptype == admin_type) &&
    (val = avp->Find(MTA_SET_OWNER))) {
        UID nuid;
        if (pAdb->Get_UID(val,nuid) == 0)
            if (pDAP->Set_Owner(nuid) == 0) {
                pAdb->Save_DAP(pDAP);
                // make sure new owner has access rights
                pDAP->Add_ACL(nuid,uid_type,0,0);
                // send out dist info for new owner TODO
                Publish_User(pDAP,nuid);
            }
    }
}
```

-continued

```
//check for notes change
const char *notes = avp->Find(MTA_SET_NOTES);
if (notes) {
    char newnotes[DBA_MAX_NOTES+1];
    StrTrunc(newnotes,notes,DBA_MAX_NOTES);
    pDAP->Set_Notes)newnotes);
    pAdb->Save_DAP)pDAP);
}
// check for contact info
MngPub_Add_Contact(pDAP,avp);
// check for add formats to the DAP
MngPub_Add_Format(pDAP,avp);
MngPub_Remove_Format(pDAP,avp);
MngPub_Default_Format(pDAP,avp);
// check report type
if ( MngPub_Report_When(pDAP,pDAP->Get_Owner( ),
    avp) == 0)
    pAdb->Save_DAP(pDAP);
pAdb->Close_DAP(pDAP);
return(0);
}
```

This handler adopts a similar approach: getting the properties that it needs (from the form) and making the appropriate interface calls into the ADB and DDB databases. Of particular interest, the MngPub handler promulgates the adaptive behavior of the system—intelligently determining who should be added or removed from a distribution (based on changing characteristics of an organization). Recall the task of the distributor user specifying the "who" part of completing the wizard-driven template. This information is processed by the MngPub handler. Therefore, the handler has the task of checking rights and profiles of users for determining appropriate mapping of a final set of addresses for the distribution. If a group is added, for instance, the handler must expand that group and determine whether individual users in that group are already receiving the publication (including, for instance, receiving it with greater access rights). Based on how information is available to individual users, the system intelligently determines the appropriate delivery for the user for effecting the publication for that user. This handler is invoked both upon creation of a distribution and upon editing a distribution (template).

Since the system intelligently determines the mapping of users and their profiles into appropriate distribution addresses, the distributor user need not worry about a particular recipient getting multiple copies of a distribution, or getting a distribution with an incorrect access level. In a currently-preferred embodiment, conflicts are resolved along the following order of precedence:

individual>role>group

Based on this order of precedence, the system can automatically manage delivery of information to a person in a manner most appropriate for that person's access rights (even when multiple access rights are available).

Summary

The system of the present invention provides a complete co-active information delivery system. The Distributor, subscriber and organizational profiles ensure that all targeted and eligible parties can participate in the negotiation, thereby providing co-active push/pull negotiation. The Adaptive Technology module ensures that changing profiles for the distributor, subscriber, and organization all maintain the integrity and security of the targeted information, thereby providing adaptive distribution. The open architecture of the server and the built-in support for negotiated use of delivery and notification (including anytime access fully support all delivery and posting options) achieves multiple delivery media. The versioned distribution repository provides historical access for eligible authorized recipients, allowing such recipients to retrieve information on demand through any available delivery medium. Finally, tracking and feedback is provided by the system as it distributes reports to distributors, recipients, and coordinators on-demand and by configurable schedule. These reports track all distributions individual profiles, and active subscriber status on a distribution-by-distribution basis.

Appended herewith are Appendix A and Appendix B including additional technical disclosure and design documents providing further description of the present invention.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

68
Diffuser
Task List
and
Product Specification Overview
This document contains an overview of the engineering product specification for the initial *Diffuser* product offering. The document is composed of the product architecture, the engineering task list, and the component descriptions.
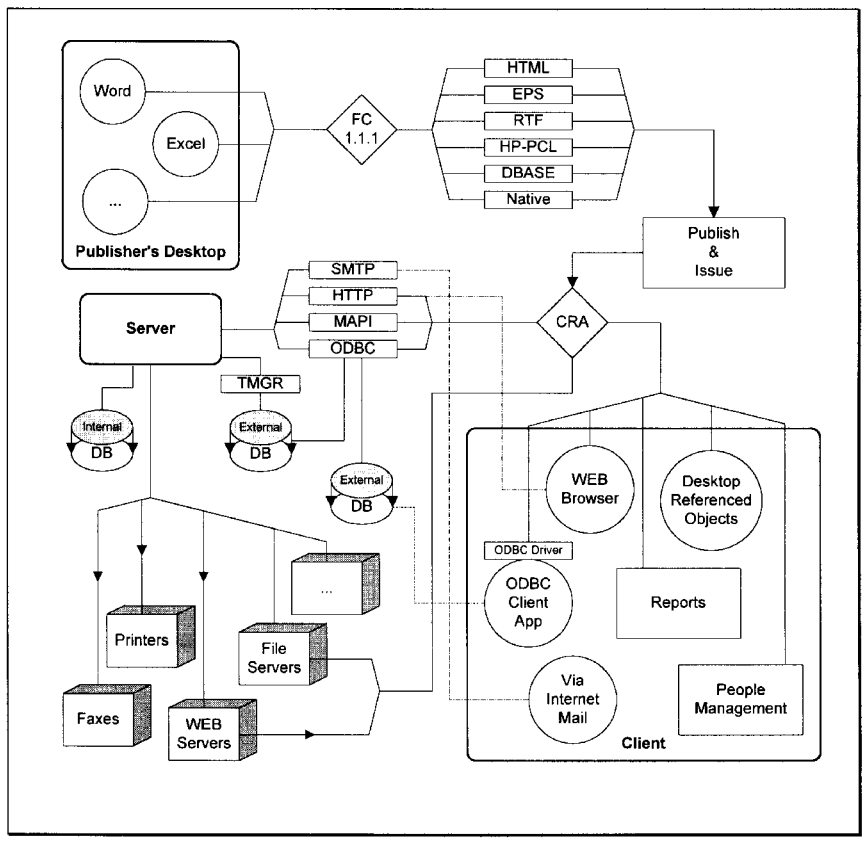
Figure 1 - Diffuser Architecture Overview
*Appendix A*                  Diffusion, Inc.

The overall product architecture is depicted in figure 1. Following is an outline of the engineering tasks, the task descriptions, and the component specifications. The tasks are scheduled and tracked separately within the engineering project schedule.

Microsoft Project
4.1 Project

Task and Component Descriptions

- Client Side

- Format Conversion
    The format conversion filters are responsible for rendering native application formats to more common data formats. These include EPS (Encapsulated Post Script), RTF (Rich Text Format), HTML (Hyper Text Markup Language), and HP-PCL, (Hewlett Packard Printer Command Language).

The rendering process should be as invisible as possible to the document owner (publisher). The results of the process are used by the Publish/Issue component tool and are submitted to the server along with the native application format as desired. The additional formats allow for broader distribution to the clients (subscriber base) of the server.

- Publish and Issue component
    The Publish and Issue component simplifies and automates the process of creating and updating publication documents on the server. This exists in two styles: the OLE desktop document, and the Java enhanced browser component. These components call upon the Client Resolver Agent (CRA) to communicate with the server.

The OLE desktop document (ODD) provides a container for collecting and storing information about a particular publication. It resides independently on the desktop. The container is created once per new publication and contains references to the individual pieces of the publication (usually a collection of file references). The container provides a easy mechanism for issuing a new version of the document to the server.

The Java enhanced browser (JEB) component is functionally equivalent its OLE counterpart. It provides the publish and issue functionality within a WEB browser using Java.

- Client Resolver Agent (CRA)

The Client Resolver Agent (CRA) provides the underlying support mechanisms for coordinating and communicating with the distribution server, the desktop components, and other remote document data and data references. The CRA is responsible for submitting instructions and documents to the distribution server, retrieving information, instructions and documents from the distributions server, and resolving (following instructions or references to data) links to information or data that may reside on the server or other systems. The CRA performs these tasks in a background manner. It should be virtually unnoticed by the user since it is a mechanism not a GUI application.

The CRA will normally be installed as part of a bootstrap installation on the client machine.

- Report Component

The Report Component provides two sets of services. First it reports on information that is useful to publishers and users of the system. Secondly, it provides a way to manage that information. A report is always a snapshot of the current state of information as it exists within the server at the time the report is generated.

A report is generated and sent to the document owner for each published document that resides on the distribution server. The report contains information about the state of publication. This includes the access lists, policies, and rights associated with the publication, information on the history of its versions, and the current subscription information. This information can also be managed (modified and updated) from within the report component.

For each user of the system a second type of report is generated. This report contains information particular to an individual. Information includes rights, preferences, addresses, and a list current subscriptions and available subscriptions. The report is also used to update user information, manage subscriptions, and request items from the distribution server.

The report UI component has two modes, a static mode, and a live mode. The static mode displays the information as a snapshot from the server. The live mode continually refreshes the report by requesting updates from the server.
Information is updated and replaced with the latest state from the server. The original state of the report is preserved and only overwritten if explicitly saved by the user. For publication reports a mechanism for locating and launching the associated ODD exists within the report component.

- People Management

The People Management component allows management of individuals, roles, and groups within the server. The sever maintains profile information for each user or individual that has access to the server (as stated in the report section). Individuals can be assigned to roles. There is a one to one mapping between roles and individuals. Groups within the server are made up of roles and individuals. Groups are not nested.

The management of this information along with local MAPI address book integration is handled by this component.

- Server Side

- DBA (Data Base Agent)
    The DBA is responsible for the implementation of the API between the Object Management layer and the underlying storage model (typically a RDBMS). There is one agent for each database interface that is supported; ODBC, SYBASE, Oracle, and a private self-contained database (perhaps CodeBase).

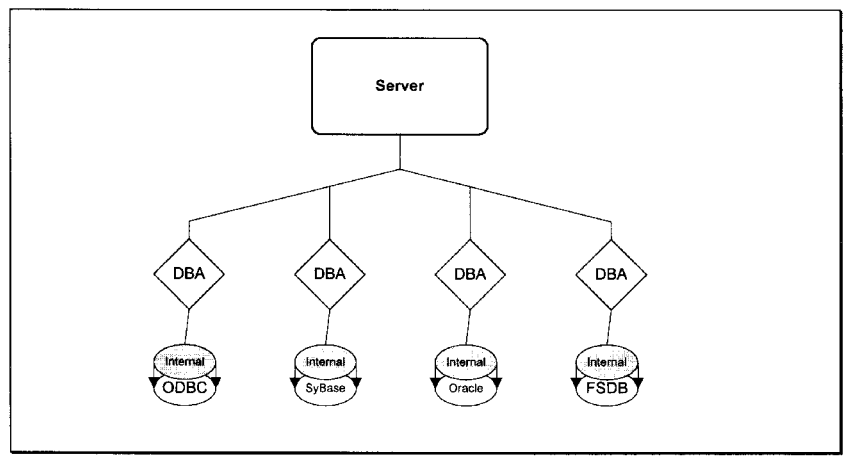

Figure 2 - Server Internal Storage (DBA)

- ADB (Administrative and Addressing Data Base)
    The ADB component of the DBA is responsible for Individuals, Roles, and Groups. It also maintains the access rights and policies for documents stored within the server.

- DDB (Document Data Base)

The DDB component of the DBA is responsible for document storage and access. Documents within the server consist of *Versions*. The number of versions that are maintained within the server for a given document is configurable by the document owner. Versions can consist of several different formats or content types for representing a documents data. This data is contained or grouped within *Sections* of a particular the version. Sections are stored as blobs within the database.

- Object Management

The object management layer connects and coordinates the DBA and the MTAs (Message Transfer Agents). This layer implements the semantics of the objects (i.e. documents, profiles, groups, ...) as they flow through the distribution server.

*Appendix A*

DBA API

The DBA Interface, database agent interface, is the API that links the Object Management layer and the DBA. The implementation of this API class links to the underlying database driver layer. The API is both defined and described by its classes. The DBA API consists of 2 sub-components, the document database (DDB), and the administration database (ADB).

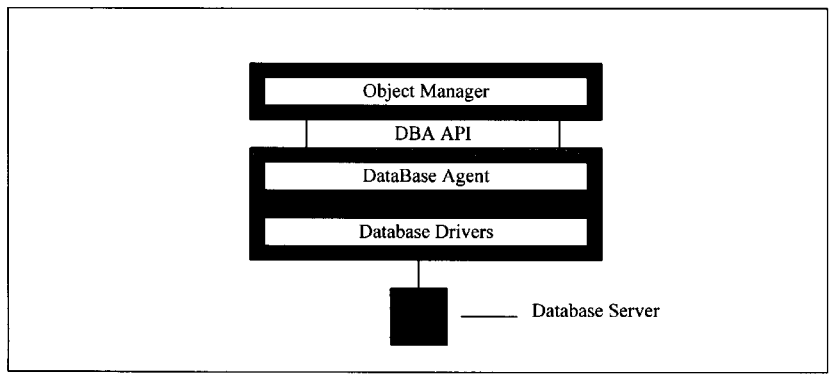

Both sub-components have a top level entry point which connects to the underlying database and returns a reference to API base class.

pDDB = DDB_Connect( credentials, database storage area)
  pADB = ADB_Connect( credentials, database storage area)

The DDB class consists of Documents, Versions, and Sections. Documents contain versions and versions contain sections. The API design allows access to documents using a file access model (e.g. open, create, close, save, etc. methods). The API will be used by the Object Manager to load and store memory (core) based objects from and to the underlying persistent storage model (typically a database).

DDB class

| RetVal | Method | Description |
|---|---|---|
| | DDB class | |
| pDoc | Create_Document(owner, key) | create a new document |
| pDoc | Open_Document(owner, key || did) | open existing document |
| bool | Save_Document(pDoc) | save document to database |
| bool | Delete_Document(owner, key || did) | delete document from database |
| bool | Close_Document(pDoc) | close (cleanup, free storage) |

| | Doc sub-class | |
|---|---|---|
| | set_vdepth( vdepth )<br>set_flags ( flags )<br>...<br><br>vdepth = get_vdepth()<br>flags = get_flags()<br>... | |

Appendix B

74

| pVer | create_version(owner,key) | create a new empty version |
| pVer | open_version(owner, key \|\| vid) | open an existing version |
| bval | delete_version(owner,key \|\| vid) | delete a version |
| bval | save_version(pVer) | save version to database |
| bval | close_version(pVer) | close version (cleanup, free storage) |

Version sub-class

| int | select_section(type, name) | start an iteration based on selection criteria |
| bval | bval = next_section(&type, &name, &size, &sid) | iterate to next section, return section info |
| | deselect_section() | stop the iteration (cleanup, etc.) |
| sid | open_section(type, name \|\| sid) | open an existing section |
| sid | create_section(type, name) | create a new section |
| bval | save_section(sid) | save section (commit) |
| bval | close_section(sid) | close section (cleanup, free storage) |
| count | read_section(sid, buf, count) | read data from an open section |
| count | write_section(sid, buf, count) | write data to an open section |
| bval | delete_section(type, name \|\| sid) | delete section from database |

Following is a scenario using the DDB API to store a new version of a document:

| pDoc = | pDDB -> Open_Document("joe user", "sales report") | Open existing document |
| pVer = | pDoc -> Create_Version("joe user", "June Report") | Create a new version |
| sid = | pVer -> Create_Section(EXCEL_7, "Monthly Totals") | Create a new section |
| | while (data to write) | |
| count = | pVer -> Write_Section(sid, data, count) | Write to the "blob" |
| | end while | |
| | pVer -> Save_Section(sid) | |
| | pVer -> Close_Section(sid) | |
| sid = | pVer -> Create_Section(EXCEL_7, "Cumulative Totals") | Create another section |
| | while (data to write) | |
| count = | pVer -> Write_Section(sid, data, count) | Write to the "blob" |
| | end while | |
| | pVer -> Save_Section(sid) | |
| | pVer -> Close_Section(sid) | |
| | pDoc -> Save_Version(pVer) | Save version to database |
| | pDoc -> Close_Version(pVer) | Close version |
| | pDDB->Save_Document(pDoc) | Save document to database |
| | pDDB->Close_Document(pDoc) | Close document |

The ADB class supports and interfaces to document access information and user administrative information. Each document in the system contains a set of properties that define the access rights and policies for the document. These are managed by the ADB class and subclasses. Individual users, aliases for users (also known as roles), and groups containing users are also managed by the ADB class. Each user of the server is registered with the server. User information is stored in a profile. A separate profile is maintained for each user. The profile contains general user information such as name, password, addresses, Appendix B 

rights, etc. The profile also contains user preferences. These preferences are used as defaults for both transport type and content type.

The ADB class consists of three major components or subclasses: DAP, PROF, and GRP. The DAP (Document Access and Policies) class manages document access and policies. The PROF (user Profile) class manages user profiles. The GRP (Group) class manages groups. Support for aliases is directly handled by the ADB class. Subclass support for property lists (database rows) uses the select/deselect iteration model.

| RetVal | Method | Description |
|---|---|---|
| | ADB class | |
| pDAP | Create_DAP(did, pProps) | create a new DAP |
| pDAP | Open_DAP(owner, key ‖ did) | open existing DAP |
| bool | Save_DAP(pDAP) | save DAP to database |
| bool | Delete_DAP(did) | delete DAP from database |
| bool | Close_DAP(pDAP) | close DAP (cleanup, free storage) |
| | | |
| pProf | Create_Profile(uname, pProps) | Create a new profile (new user) |
| pProf | Open_Profile(uname \| uid) | Open existing profile |
| bool | Save_Profile(pProf) | save profile to database |
| bool | Delete_Profile(uname \| uid) | delete profile (delete user) |
| bool | Close_Profile(pProf) | |
| | | |
| pGRP | Create_Group(gname) | create a new group |
| pGRP | Open_Group(gname \| gid) | open existing group |
| bool | Save_Group(pGRP) | |
| bool | Delete_Group(gname \| gid) | |
| bool | Close_Group(pGRP) | |
| | | |
| bool | New_Alias(aname, uname \| uid) | add a new alias |
| bool | Delete_Alias(aname \| aid) | |
| | | |
| bool | In_Group(uid, gid) | check for group membership |
| bool | Is_Alias(uid, aid) | check for role alias |

| | DAP sub-class | |
|---|---|---|
| | set_owner( uname \| uid ) | |
| | set_policy ( flags ) | |
| | ... | |
| | get_owner(&uname \| &uid) | |
| | get_policy(&flags) | |
| | ... | |
| | | |
| | Add_InitList(gname\|gid\|aname\|aid) | add item to list |
| | Remove_InitList(gname\|gid\|aname\|aid) | remove item from list |
| | Reset_InitList() | clear entire list |
| int | Select_InitList(type, value) | no args = ALL |
| bool | Next_InitList(&type, &value) | |
| bool | Deselect_InitList() | |

Appendix B

76

|      |                                            |                      |
|------|--------------------------------------------|----------------------|
|      | Add_AccessList(gname\|gid\|aname\|aid)     | add item to list     |
|      | Remove_AccessList(gname\|gid\|aname\|aid)  | remove item from list|
|      | Reset_AccessList()                         | clear entire list    |
| int  | Select_AccessList(type, value)             | no args = ALL        |
| bool | Next_AccessList(&type, &value)             |                      |
| bool | Deselect_AccessList()                      |                      |
|      |                                            |                      |
|      | Add_ActiveList(uid,as)                     | add item to list     |
|      | Remove_ActiveList(uid,as)                  | remove item from list|
|      | Reset_ActiveList()                         | clear entire list    |
| int  | Select_ActiveList(uid, value)              | no args = ALL        |
| bool | Next_ActiveList(&uid, &value)              |                      |
| bool | Deselect_ActiveList()                      |                      |

PROF sub-class

|   |                                  |                      |
|---|----------------------------------|----------------------|
|   | get_uname(&uname)                | Get user name        |
|   | get_uid(&uid)                    | Get user id          |
|   | get_rights(&flags)               | Get user rights      |
|   | set_rights(flags)                | Set user rights      |
|   |                                  |                      |
|   | get_def_addr(&type,&value)       | get default address  |
|   | get_sec_addr(&type,&value)       | get secure address   |
|   | get_pri_addr(&type,&value)       | get priority address |
|   | set_def_addr(type,value)         | set default address  |
|   | set_sec_addr(type,value)         | set secure address   |
|   | set_pri_addr(type,value)         | set priority address |
|   |                                  |                      |
|   | add_addr(type,value)             | add new address      |
|   | remove_addr(type,value)          | remove address       |
|   | reset_addr()                     | remove all addresses |
|   |                                  |                      |
|   | select_addr(type,value)          | select addresses     |
|   | next_addr(&type,&value)          |                      |
|   | deselect_addr()                  |                      |

GRP sub-class

|      |                      |                       |
|------|----------------------|-----------------------|
|      | Add(uid\|aid)        | add item to list      |
|      | Remove(uid\|aid)     | remove item from list |
|      | Reset()              | clear entire list     |
| int  | Select(type, value)  | no args = ALL         |
| bool | Next(&type, &value)  |                       |
| bool | Deselect()           |                       |

Appendix B

```
***************************
Publish Form
*************************** action: publish
user_name: login_name
user_pass: password
document_name: short title
document_notes: longer description
document_depth: 5
add_format(n): Particular Application Format here
format_ext (n): <extn>; <source format>; <Text formats REAL format>
report_type : "owner","recipient","system"
report_when : "never" | "daily","weekly" or "monthly"
```

Notes:

The above form is sent by a client to establish a new DISTRIBUTION with the server. Typically, at least one format is specified; document_name is up to 64 chars and document_notes is up to 256 chars. document_depth is optional (default of 0 - infinite version depth)

format_ext includes the following:
    <extn> = the file extension of this format
    <source format> = name of format used to convert from to create this
    <Text format REAL format>= REAL format name of "Text" mapped format

What is claimed is:

1. In a computer system, a method for distributing information among members of an organization, the method comprising:

defining a logical set of recipients, said logical set including at least some of the members of the organization on a basis other than a member's identify as an individual;

defining a distribution specifying information which is to be distributed to the logical group of recipients; and based on the defined distribution, distributing the information to recipients of the organization by:

(i) determining a target distribution list by identifying those individuals of the organization currently within the logical set of recipients, and (ii) transmitting the information to those individuals identified on the target distribution list.

2. The method of claim 1, wherein said logical set of recipients includes individuals, groups, and roles.

3. The method of claim 2, wherein a given individual is a particular member of the group identified by that member's name.

4. The method of claim 3, wherein a member's name is based, at least in part, on the member's given name.

5. The method of claim 2, wherein a given group is a particular collection of individuals, the given group being collectively identified by a user-provided group name.

6. The method of claim 5, wherein a given group name is based, at least in part, on a descriptive purpose for the group.

7. The method of claim 2, wherein a given group is a particular collection of individuals, roles, or other groups, the given group being collectively identified by a user-provided group name.

8. The method of claim 2, further comprising:

modifying a selected group, so that at least one individual is automatically removed from the target distribution list when the information is distributed.

9. The method of claim 2, further comprising:

modifying a selected group, so that at least one individual is automatically added to the target distribution list when the information is distributed.

10. The method of claim 2, further comprising:

modifying a particular group so that at least one individual is no longer a member of the particular group for the distribution, yet said at least one individual continuing as an individual within the logical set of recipients and thereby remaining on the target distribution list when the information is distributed.

11. The method of claim 2, further comprising:

modifying a particular group so that at least one individual is no longer a member of the particular group for the distribution, yet said at least one individual continuing as an individual fulfilling a role within the logical set of recipients and thereby remaining on the target distribution list when the information is distributed.

12. The method of claim 2, wherein a given role is a particular function fulfilled by at least one individual of the organization, the given role being identified by a role name descriptive of what functions said at least one individual performs for the organization in that given role.

13. The method of claim 12, wherein a given role name is based, at least in part, on an organizational title for the role within the organization.

14. The method of claim 2, further comprising:

modifying a selected role, so that at least one individual is automatically removed from the target distribution list when the information is distributed.

15. The method of claim 2, further comprising:

modifying a selected role, so that at least one individual is automatically added to the target distribution list when the information is distributed.

16. The method of claim 2, further comprising:

modifying a particular role so that at least one individual is no longer a member of the particular role for the distribution, yet said at least one individual continuing as an individual within the logical set of recipients and thereby remaining on the target distribution list when the information is distributed.

17. The method of claim 2, further comprising:

modifying a particular role so that at least one individual is no longer a member of the particular role for the distribution, yet said at least one individual continuing as an individual fulfilling another role within the logical set of recipients and thereby remaining on the target distribution list when the information is distributed.

18. The method of claim 2, further comprising:

modifying a particular role so that at least one individual is no longer a member of the particular role for the distribution, yet said at least one individual continuing as an individual fulfilling another role within the logical set of recipients and thereby remaining on the target distribution list when the information is distributed.

19. The method of claim 2, further comprising:

modifying a particular role so that at least one individual is no longer a member of the particular role for the distribution, yet said at least one individual continuing as an individual who is a member of a group within the logical set of recipients and thereby remaining on the target distribution list when the information is distributed.

20. The method of claim 1, further comprising:

selecting a default format for distributing the information.

21. The method of claim 1, further comprising:

additionally selecting an alternate format for distributing the information.

22. The method of claim 1, further comprising:

selecting for each recipient, a preferred format for distributing the information.

23. The method of claim 1, further comprising:

selecting for each recipient, a preferred delivery address for sending the information.

24. The method of claim 23, wherein said delivery address is a selected one of an e-mail address, a facsimile device destination, and a pager destination.

25. The method of claim 1, further comprising:

when defining the logical set of recipients, also defining a policy for each recipient specifying how the recipient is to receive the information.

26. The method of claim 25, wherein a given policy specifies that a recipient is to be notified when information of a distribution is made available.

27. The method of claim 25, wherein a given policy specifies that a recipient is to immediately receive information of a distribution when such information is made available.

28. The method of claim 25, wherein a given policy specifies that information of a distribution is to be made available to a recipient, without sending the information to the recipient and without notifying the recipient that the information is available.

29. The method of claim 25, wherein a given individual has multiple memberships in the logical set of recipients and wherein the system distributes information to the given individual based on that individual's greatest access policy.

30. The method of claim 29, wherein the system resolves a given recipient's access policy when the given recipient has multiple memberships in the logical set of recipients according to a precedence order of individual>role>group.

31. An adaptive information delivery system for distributing information among members of an organization comprising:

a plurality of client computers in communication with a server computer;

a transport layer for transmitting requests from the client computers to the server computer and for transmitting information from the server computer to the client computers;

means for defining a logical set of recipients, said logical set including at least some of the members of the organization on a basis other than a member's identify as an individual;

means for defining at one of said client computer a distribution specifying information which is to be distributed to the logical group of recipients present at other client computers and transmitting the defined distribution to the server computer; and means for distributing, based on the defined distribution, the information to recipients of the organization, said means including;

adaptive means for determining at the server computer a target distribution list by identifying those individuals of the organization currently within the logical set of recipients, said system adapting the distribution in response to any new individuals added to the logical set of recipients and any existing individuals removed from lo the logical set of recipients, and means for transmitting from the server computer the information to the client computers of those individuals identified on the target distribution list.

32. The system of claim 31, wherein said logical set of recipients includes individuals, groups, and roles.

33. The system of claim 32, wherein a given group is a particular collection of individuals, roles, or other groups, the given group being collectively identified by a user-provided group name.

34. The system of claim 31, wherein said adaptive means includes:

removal means for automatically removing from the target distribution list any individual who is no longer within the logical set of recipients.

35. The system of claim 34, wherein said removal means includes:

means for automatically removing from the target distribution list any individual who is no longer an individual, a group, or a role within the logical set of recipients.

36. The system of claim 31, wherein said definition means includes:

means for issuing new versions of the information.

37. The system of claim 36, wherein said issuing means includes:

means for setting a version depth of the information, for establishing how many prior versions of the information the server computer is to retain.

38. The system of claim 32, further comprising:

means for modifying a selected role, so that at least one individual is automatically removed from the target distribution list when the information is distributed.

39. The system of claim 32, further comprising:

means for modifying a particular role so that at least one individual is no longer a member of the particular role for the distribution, yet said at least one individual continuing as an individual within the logical set of recipients and thereby remaining on the target distribution list when the information is distributed.

40. The system of claim 32, wherein said adaptive means includes:

means for mapping, prior to each distribution, said individuals, groups, and roles into a final set of individuals who are to receive the distribution.

* * * * *